(12) United States Patent
Huston, III et al.

(10) Patent No.: US 11,888,863 B2
(45) Date of Patent: *Jan. 30, 2024

(54) MAINTAINING USER PRIVACY VIA A DISTRIBUTED FRAMEWORK FOR SECURITY ANALYTICS

(71) Applicant: Forcepoint, LLC, Austin, TX (US)

(72) Inventors: Lawrence Bruce Huston, III, Ann Arbor, MI (US); David Coffey, Austin, TX (US)

(73) Assignee: Forcepoint LLC, Austin, TX (US)

( * ) Notice: Subject to any disclaimer, the term of this patent is extended or adjusted under 35 U.S.C. 154(b) by 621 days.

This patent is subject to a terminal disclaimer.

(21) Appl. No.: 17/131,015

(22) Filed: Dec. 22, 2020

(65) Prior Publication Data
US 2021/0112077 A1    Apr. 15, 2021

Related U.S. Application Data

(63) Continuation of application No. 16/557,560, filed on Aug. 30, 2019, now Pat. No. 10,999,296, which is a
(Continued)

(51) Int. Cl.
*H04L 9/40* (2022.01)
*G06F 21/56* (2013.01)
(Continued)

(52) U.S. Cl.
CPC .......... *H04L 63/04* (2013.01); *G06F 21/566* (2013.01); *G06F 21/577* (2013.01);
(Continued)

(58) Field of Classification Search
CPC ... H04L 63/14; H04L 63/102; H04L 63/1416; H04L 63/1425; H04L 63/1433;
(Continued)

(56) References Cited

U.S. PATENT DOCUMENTS 6,072,875 A    6/2000  Tsudik
6,678,693 B1   1/2004  Shiraishi
(Continued)

FOREIGN PATENT DOCUMENTS

WO    2019153581 A1    8/2019

OTHER PUBLICATIONS

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).
(Continued)

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium are disclosed for performing a security operation. The security operation includes: monitoring a plurality of actions of an entity, the plurality of actions of the entity corresponding to a plurality of events enacted by the entity; maintaining information relating to the monitoring within a user edge component; identifying an event of analytic utility; analyzing the event of analytic utility at the user edge component, the analyzing generating a security risk assessment; and, providing the security risk assessment to a network edge component.

14 Claims, 22 Drawing Sheets

Related U.S. Application Data continuation-in-part of application No. 16/415,726, filed on May 17, 2019, now Pat. No. 10,834,097, which is a continuation-in-part of application No. 16/162,655, filed on Oct. 17, 2018, now Pat. No. 10,530,786, which is a continuation of application No. 15/963,729, filed on Apr. 26, 2018, now Pat. No. 10,129,269, which is a continuation-in-part of application No. 15/878,898, filed on Jan. 24, 2018, now Pat. No. 10,063,568, which is a continuation of application No. 15/720,788, filed on Sep. 29, 2017, now Pat. No. 9,882,918.

(60) Provisional application No. 63/119,116, filed on Nov. 30, 2020, provisional application No. 63/017,400, filed on Apr. 29, 2020, provisional application No. 62/964,372, filed on Jan. 22, 2020, provisional application No. 62/839,060, filed on Apr. 26, 2019, provisional application No. 62/506,300, filed on May 15, 2017.

(51) Int. Cl.
*G06F 21/57* (2013.01)
*H04L 67/306* (2022.01)

(52) U.S. Cl.
CPC ........ *H04L 63/102* (2013.01); *H04L 63/1416* (2013.01); *H04L 63/1425* (2013.01); *H04L 63/1433* (2013.01); *H04L 63/205* (2013.01); *H04L 67/306* (2013.01); *G06F 2221/034* (2013.01)

(58) Field of Classification Search
CPC ..... H04L 63/205; H04L 67/306; H04L 63/20; G06F 21/566; G06F 21/577; G06F 2221/034
See application file for complete search history.

(56) References Cited

U.S. PATENT DOCUMENTS

| | | |
|---|---|---|
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,746,567 B1* | 8/2020 | Bernau .............. G01D 4/002 |
| 10,769,908 B1 | 9/2020 | Burris et al. |
| 10,803,201 B1* | 10/2020 | Nicholls ............ G06F 21/6227 |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0265788 A1* | 10/2009 | Ehrenschwender ....................... G06F 21/6254 380/282 |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0077006 A1* | 3/2010 | El Emam .............. G06F 16/284 707/E17.032 |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |

(56) References Cited

U.S. PATENT DOCUMENTS

| | | |
|---|---|---|
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0007249 A1* | 1/2015 | Bezzi .................. G06F 21/6227 726/1 |
| 2015/0082430 A1 | 3/2015 | Sridhara et al. |
| 2015/0113646 A1 | 4/2015 | Lee et al. |
| 2015/0149208 A1* | 5/2015 | Lynch .................... G16H 10/60 705/3 |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0339496 A1* | 11/2015 | El Emam ............ G06F 21/6227 726/26 |
| 2015/0350902 A1 | 12/2015 | Baxley et al. |
| 2015/0356488 A1 | 12/2015 | Den et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0258824 A1* | 8/2019 | Gkoulalas-Divanis ..................... G06F 21/6254 |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |

(56) References Cited

U.S. PATENT DOCUMENTS

2020/0117546 A1  4/2020  Wong et al.
2020/0334025 A1  10/2020  Wang et al.

OTHER PUBLICATIONS

Singh et al., Container-Based Microservice Architecture for Cloud Applications, International Conference on Computing, Communication and Automation (ICCCA2017), 2017.
Sean Barnum, Standardized Cyber Threat Intelligence Information with the Structured Threat Information expression (STIX) Whitepaper v1.1 (Feb. 20, 2014).
Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.
Mesaros et al., Latent Semantic Analysis in Sound Event Detection, 19th European Signal Processing Conference (EUSIPCO 2011), pp. 1307-1311, 2011.
Crandall et al., Inferring Social Ties from Geographic Coincidences, PNAS, vol. 107, No. 52, 2010, pp. 22436-22441, 2010.
Ross et al., Bully Prevention in Positive Behavior Support, Journal of Applied Behavior Analysis, 42(4), pp. 747-759, 2009.
Matt Klein, How to Erase Your iOS Device After Too Many Failed Passcode Attempts, https://www.howtogeek.com/264369/how-to-erase-your-ios-device-after-too-many-failed-passcode-attempts/, Jul. 28, 2016.
Github, The Z3 Theorem Prover, retrieved from internet May 19, 2020, https://github.com/Z3Prover/z3.
John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.
Barrere et al., Vulnerability Assessment in Autonomic Networks and Services: A Survey, IEEE, Aug. 30, 2013. vol. 16, issue. 2, pp. 988-1004.
Burns et al., Automatic Management of Network Security Policy, IEEE, Jun. 14, 2001, pp. 12-26.
L. F. Lafuerza et al., Exact Solution of a Stochastic Protein Dynamics Model with Delayed Degradation, Phys. Rev. E 84, May 11, 2021, Nov. 18, 2011, pp. 1-8.
Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.
Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.
Varun Chandola et al., Anomaly Detection: A Survey, ACM Computing Surveys, vol. 41, No. 3, Article 15, Jul. 2009, pp. 15.1-58.1.
Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.
Yueh-Hsuan Chiang, Towards Large-Scale Temporal Entity Matching, Dissertation Abstract, University of Wisconsin-Madison, 2013.
Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.
Peter Christen et al., Adaptive Temporal Entity Resolution on Dynamic Databases, Apr. 2013, http://users.cecs.anu.edu.au/~Peter.Christen/publications/christen2013pakdd-slides.pdf.
Wikipedia, Categorical Distribution, edited Jul. 28, 2018, https://en.wikipedia.org/wiki/Categorical_distribution.
Wikipedia, One-Hot, edited May 22, 2018, https://en.wikipedia.org/wiki/One-hot.
S. Chambi et al., Better bitmap performance with Roaring bitmaps, arXiv:1402.6407v10 [cs.DB] (Mar. 15, 2016).
Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

\* cited by examiner

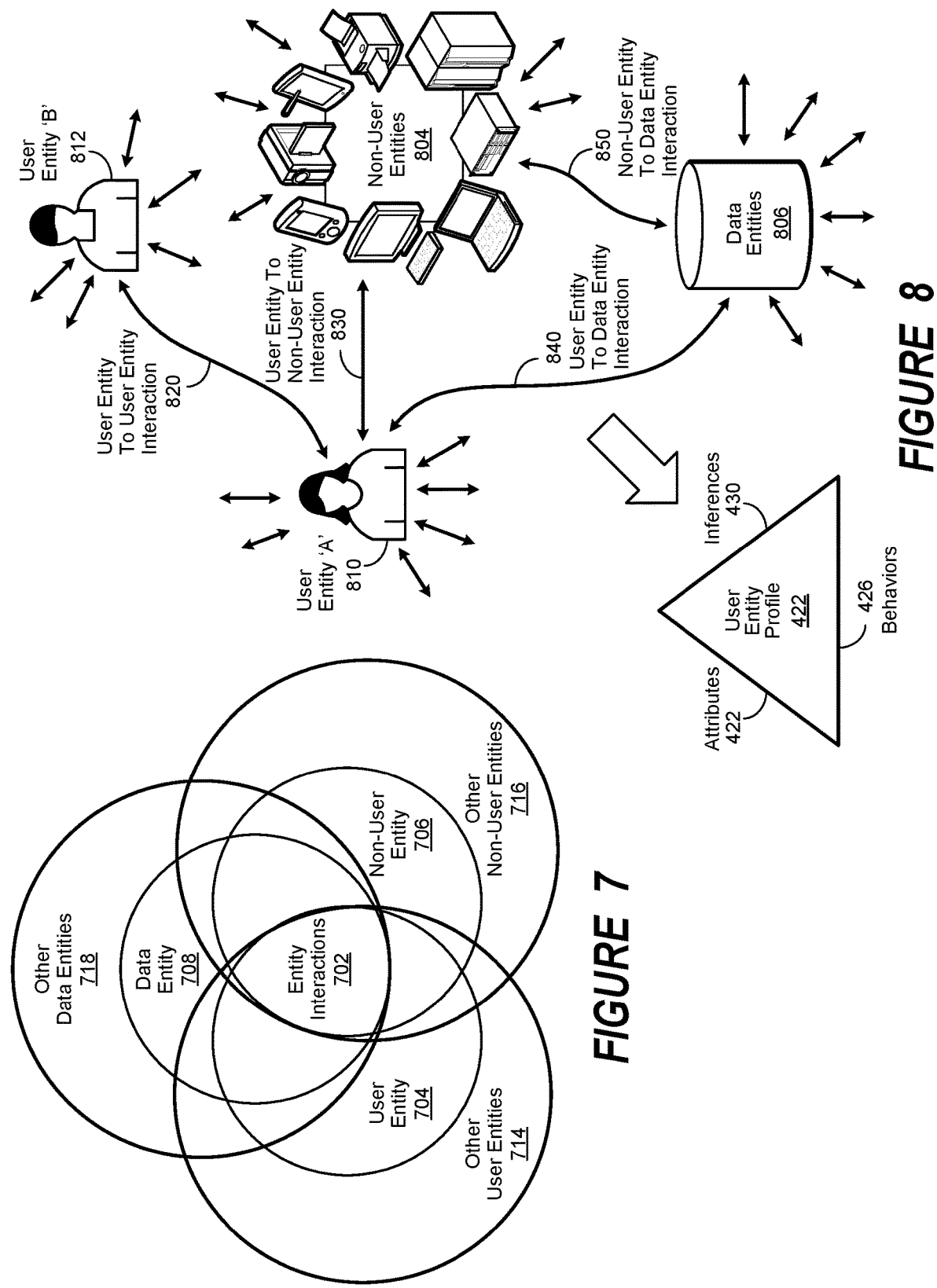

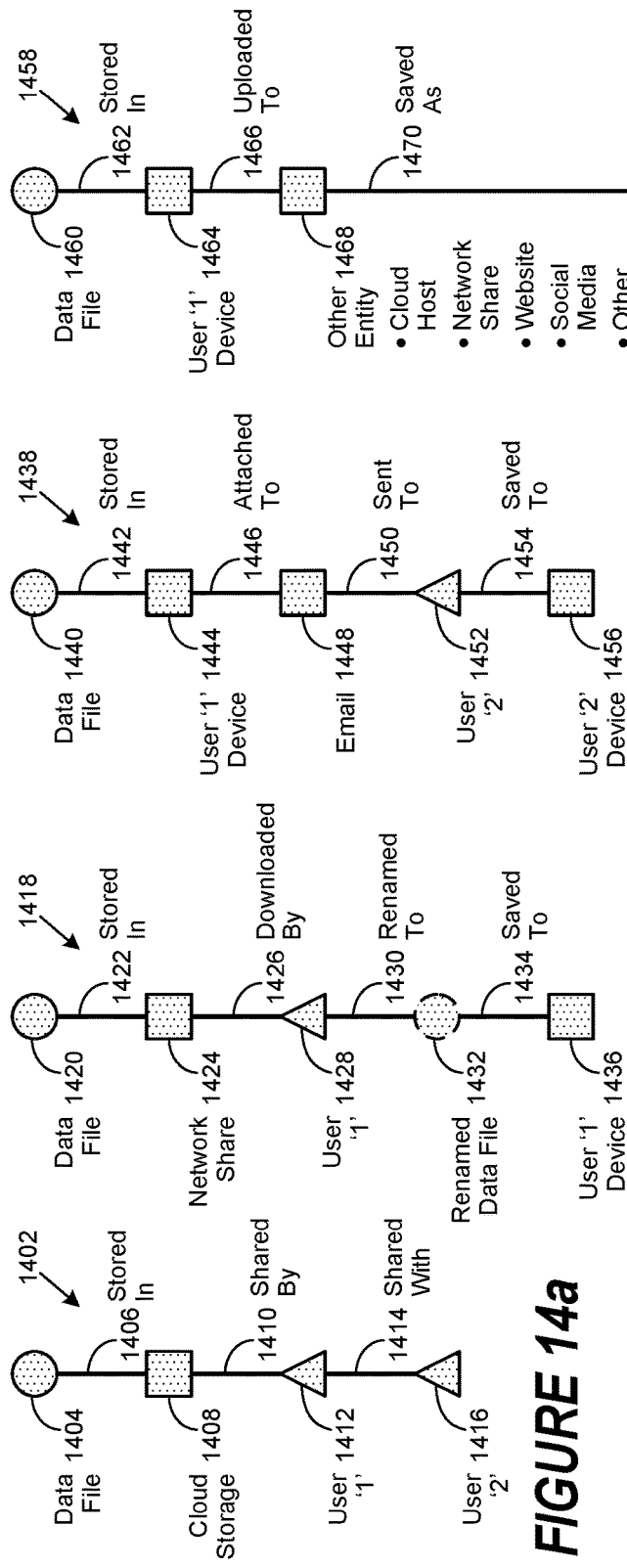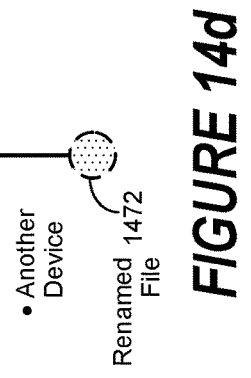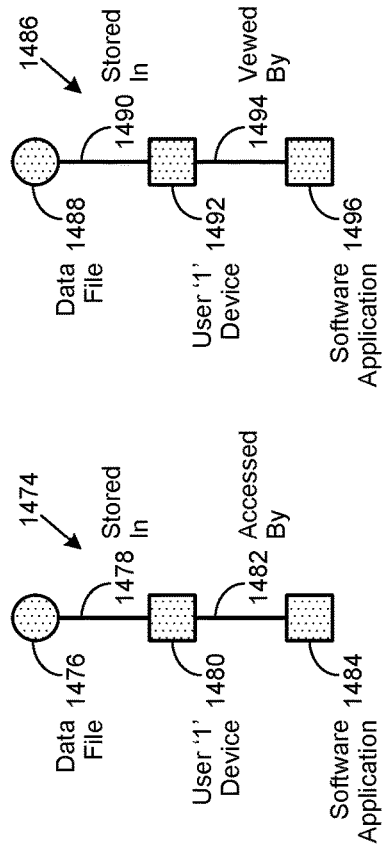

US 11,888,863 B2

MAINTAINING USER PRIVACY VIA A DISTRIBUTED FRAMEWORK FOR SECURITY ANALYTICS

BACKGROUND OF THE INVENTION

Field of the Invention

The present invention relates in general to the field of computers and similar technologies, and in particular to software utilized in this field. Still more particularly, it relates to a method, system and computer-usable medium for performing a security operation.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a computer-implementable method for performing a security operation comprising: monitoring a plurality of actions of an entity, the plurality of actions of the entity corresponding to a plurality of events enacted by the entity; maintaining information relating to the monitoring within a user edge component; identifying an event of analytic utility; analyzing the event of analytic utility at the user edge component, the analyzing generating a security risk assessment; and, providing the security risk assessment to a network edge component.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring a plurality of actions of an entity, the plurality of actions of the entity corresponding to a plurality of events enacted by the entity; maintaining information relating to the monitoring within a user edge component; identifying an event of analytic utility; analyzing the event of analytic utility at the user edge component, the analyzing generating a security risk assessment; and, providing the security risk assessment to a network edge component.

In another embodiment the invention relates to a computer-readable storage medium embodying computer program code, the computer program code comprising computer executable instructions configured for: monitoring a plurality of actions of an entity, the plurality of actions of the entity corresponding to a plurality of events enacted by the entity; maintaining information relating to the monitoring within a user edge component; identifying an event of analytic utility; analyzing the event of analytic utility at the user edge component, the analyzing generating a security risk assessment; and, providing the security risk assessment to a network edge component.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 is a simplified Venn diagram showing entity interactions between a user entity, a non-user entity, and a data entity;

FIG. 8 shows the enactment of entity interactions between user entities, non-user entities, and data entities;

FIGS. 14a through 14f show examples of entity interaction maps resulting from the performance of one or more security analytics mapping operations;

DETAILED DESCRIPTION

Figure 1:
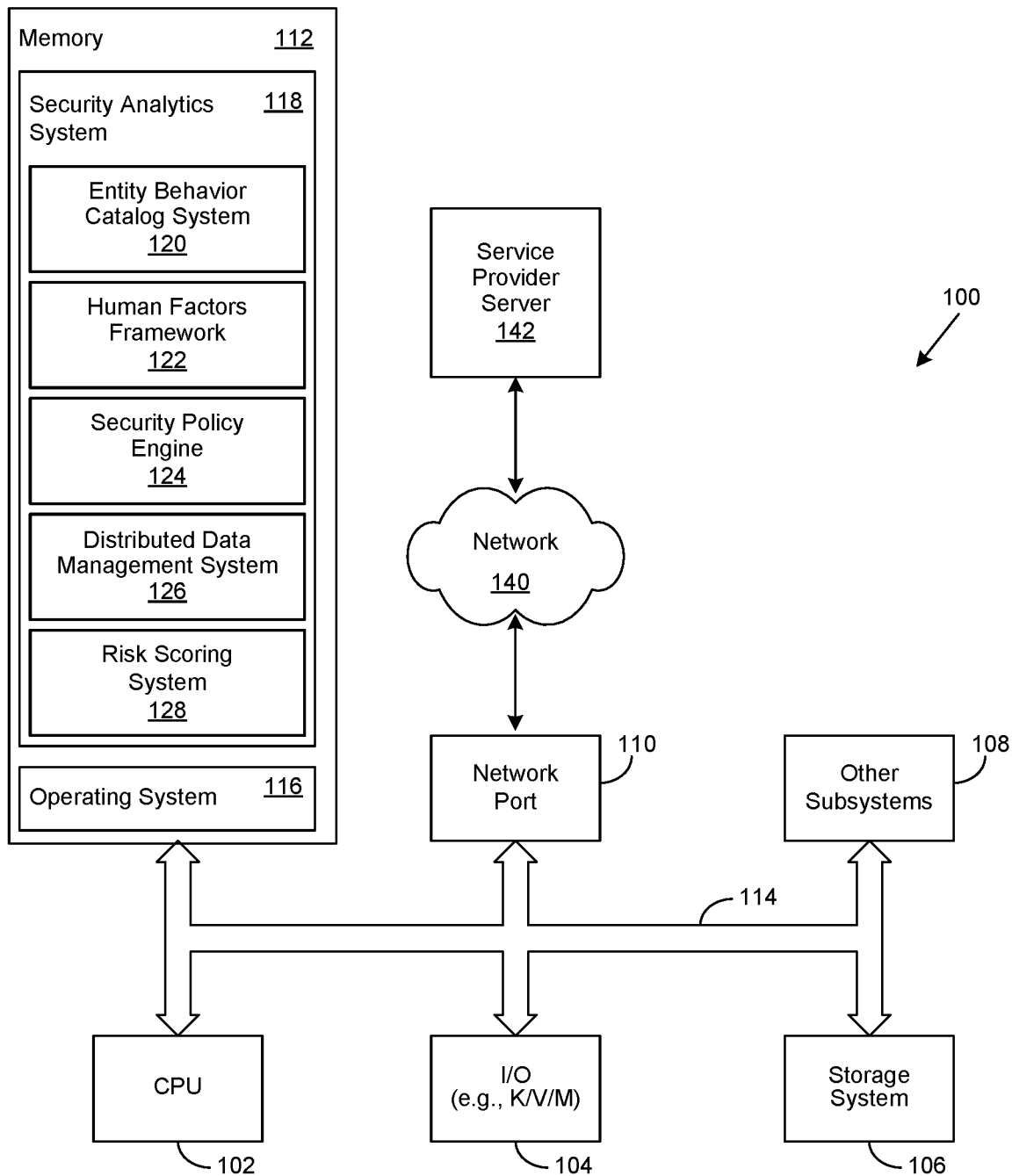
FIG. 1 depicts an exemplary client computer in which the present invention may be implemented.

A method, system and computer-usable medium are disclosed for performing a security operation. Certain aspects of the invention reflect an appreciation that the existence of any entity, whether it is an individual user, a group of users, an organization, a device, a system, a network, an account, a domain, an operation, a process, a software application, or a service, represents some degree of security risk. Certain aspects of the invention likewise reflect an appreciation that observation and analysis of one or more events, described in greater detail herein, may provide an indication of possible anomalous, abnormal, unexpected, or malicious behavior, any or all of which may represent a security risk.

Certain aspects of the invention likewise reflect an appreciation that malicious behavior by an entity, such as a user, may be difficult to detect when anomalous events associated with the entity take place over an extended period of time. For an example, an employee may believe they become a potential security risk only after they give their notice, and only thereafter will their activities will be tracked. As a result, the employee may begin stockpiling and exfiltrating data long before an actual resignation occurs (e.g., 60 days) in an attempt to reduce suspicion. Furthermore, such activities may be performed intermittently in an attempt to further reduce suspicion.

Certain aspects of the invention reflect an appreciation that a user may use two or more endpoint devices, either directly or indirectly, concurrently or at different times, as described in greater detail herein, to further mask malicious behavior. Certain aspects of the invention likewise reflect an appreciation that it is generally difficult to assess the security risk of such distributed entity activities, whether such behavior occurs concurrently or over time. Likewise, certain aspects of the invention reflect an appreciation that it can also be difficult to maintain a historical indicator of risk corresponding to past anomalous events associated with a particular entity.

Likewise, certain aspects of the invention reflect an appreciation that detection of malicious behavior is further hampered by the sheer volume of data generated as a result of various entity interactions. Furthermore, the challenges of tracking the movement of such volumes of data across endpoints, servers, and applications, whether on-premise or in the cloud, increases the possibility of critical data being placed at risk. Other challenges include the velocity and acceleration at which new data of all kinds is being created, the way it is shared and dispersed, often in real-time, using a multitude of applications, both sanctioned and unsanctioned. Additional challenges include the existence of multiple copies of the same data sets distributed across different systems and platforms with an increasing number of users and other entities having access to it. Certain aspects of the invention likewise reflect an appreciation that even when the movement of data may be tracked, it often lacks context, and by extension, creates impediments to identifying non-obvious malicious behavior.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 may be implemented to perform a security analytics operation, described in greater detail herein. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, a human factors framework 122, a security policy engine 124, a distributed data management system 126, and a risk scoring system 128, or a combination thereof. In certain embodiments, the EBC system 120 may be implemented to catalog entity behavior, as described in greater detail herein. In certain embodiments, the human factors framework 122 may be implemented to perform a human factors risk operation, as likewise described in greater detail herein.

Likewise, as described in greater detail herein, the security policy engine 124 may be implemented in various embodiments to perform a security policy management operation. In various embodiments, the distributed data management system 126 may be implemented, as described in greater detail herein, to perform a distributed data management operation. In certain embodiments, as likewise described in greater detail herein, the security risk scoring system 128 may be implemented in various embodiments to perform certain security risk scoring operations.

Figure 2:
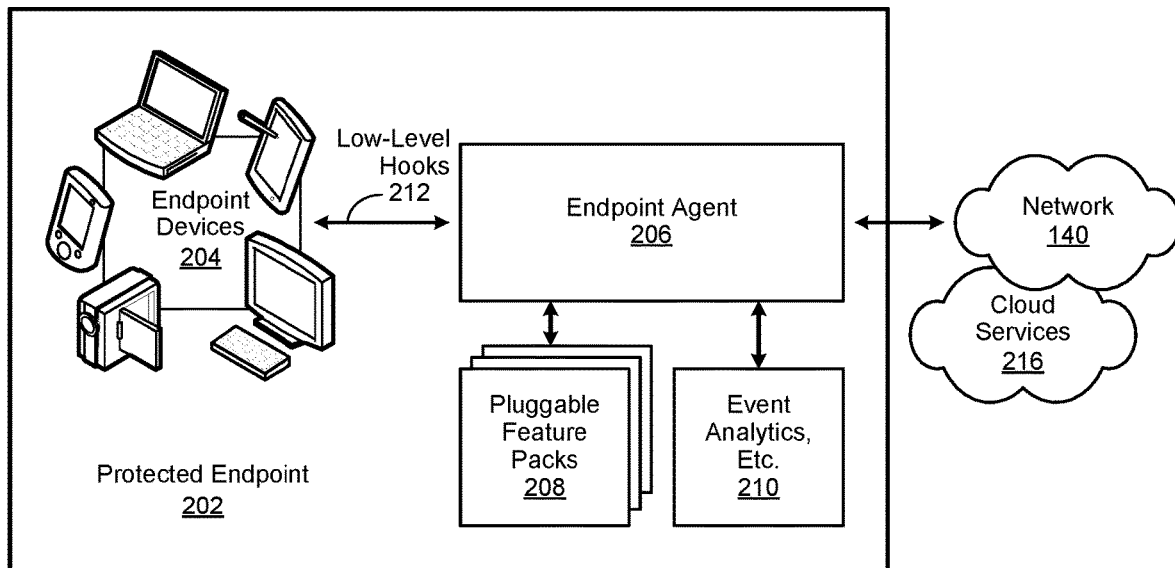
FIG. 2 is a simplified block diagram of a protected endpoint.

FIG. 2 is a simplified block diagram of a protected endpoint implemented in accordance with an embodiment of the invention. A protected endpoint 202, as used herein, broadly refers to a policy-based approach to network security that typically requires an endpoint device 204 to comply with particular criteria before it is granted access to network resources. As an example, an endpoint device 204 may be required to have a particular operating system (OS), or version thereof, a Virtual Private Network (VPN) client, anti-virus software with current updates, and so forth.

In certain embodiments, a protected endpoint 202 may be established through the implementation of an endpoint agent 206. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of an entity. As likewise used herein, an entity broadly refers to something that exists as itself, whether physically or abstractly.

In certain embodiments, the identity of a particular entity may be known or unknown. In certain embodiments, an entity may be a user entity, a non-user entity, a data entity, or a combination thereof. As used herein, a user entity broadly refers to an animate entity whose identity can be described by certain attributes and is capable of exhibiting or enacting certain user entity behaviors, as described in greater detail herein, but is incapable of exhibiting or enacting a non-user entity or data entity behavior. Examples of a user entity include an individual person, a group of people, an organization, or a government.

As likewise used herein, a non-user entity broadly refers to an inanimate entity whose identity can be described by certain attributes and is capable of exhibiting or enacting certain non-user entity behaviors, as described in greater detail herein, but is incapable of exhibiting or enacting a user entity or data entity behavior. In certain embodiments, a non-user entity may embody a physical form. Examples of a non-user entity include an item, a device, such as endpoint 204 and edge devices, a network, a system, an operation, and a process. Other examples of a non-user entity include a resource, such as a geographical location or formation, a physical facility, a venue, a software application, and a service, such as a service operating in a cloud environment.

A data entity, as used herein, broadly refers to an inanimate entity that is a collection of information that can be described by certain attributes and is capable of exhibiting or enacting certain data entity behaviors, as described in greater detail herein, but is incapable of enacting a user entity or non-user entity behavior. In certain embodiments, a data entity may include some form of a digital instantiation of information. Examples of a data entity include an account, a user identifier (ID), a cryptographic key, a computer file, a text or email message, an audio or video recording, a network address, and a domain.

Another example of a data entity is a blockchain. Skilled practitioners of the art will be familiar with a blockchain, which as typically implemented, is a decentralized, distributed data structure whose contents are replicated across a number of systems. These contents are stored in a chain of fixed structures commonly referred to as "blocks." Each of these blocks typically contains certain information about itself, such as a unique identifier, a reference to its previous block, and a hash value generated from the data it contains.

Those of skill in the art will be aware that blockchains may be implemented in different ways and for different purposes. However, these different implementations typically have certain common characteristics. For example, in certain instantiations, blockchains are generally distributed across various systems, each of which maintains a copy of the blockchain. Updates to one copy of the blockchain, such as the addition of a particular block to the copy of the blockchain, results in corresponding updates to the other copies. Accordingly, the contents of the blockchain, including its most recent updates, are available to all participating users of the blockchain, who in turn use their own systems to authenticate and verify each new block. This process of authentication and verification ensures that the same transaction does not occur more than once. Furthermore, with distributed types of blockchains, the legitimacy of a given block, and its associated contents, is only certified once a majority of participants agree to its validity.

In general, the distributed and replicated nature of a blockchain makes it difficult to modify historical records without invalidating any subsequent blocks added thereafter. Consequently, the data within a given blockchain is essentially immutable and tamper-evident. However, this immutability and tamper-evidence does not necessarily ensure that the data recorded in a blockchain can be accepted as an incontrovertible truth. Instead, it simply means that what was originally recorded was agreed upon by a majority of the blockchain's participants.

Certain embodiments of the invention reflect an appreciation that every transaction in a blockchain is serialized (i.e., stored in a sequence). Additionally, in certain embodiments, every transaction in a blockchain is time-stamped, providing temporal information, described in greater detail herein, which is useful for tracking interactions between participants and verifying various information contained in, or related to, a particular blockchain. Furthermore, instructions may be embedded within individual blocks of a blockchain. These instructions, in the form of computer-executable code, allow transactions or other operations to be initiated if certain conditions are met.

Certain embodiments of the invention likewise reflect an appreciation that while blockchains are typically implemented as a decentralized, distributed data structure whose contents are replicated across a number of systems, they may also be implemented in other ways. Accordingly, a blockchain may be implemented in certain embodiments to be stored as a single instance on a system, whether physical or virtual, at a single address. In certain embodiments, individual blockchain blocks may be centrally stored at different addresses on the same system. In certain embodiments, a single instance of a blockchain block may be stored individually on two or more systems, each with a corresponding, unique address. Accordingly, a blockchain, as typically implemented, may exhibit one or more associated data entity behaviors.

An entity behavior, as used herein, broadly refers to any behavior exhibited or enacted by an entity that can be electronically observed during the occurrence of an entity interaction. Accordingly, a user entity behavior, as used herein, broadly refers to the enactment of an entity behavior by an associated user entity. Likewise, as used herein, a non-user entity behavior broadly refers to the enactment of an entity behavior by an associated non-user entity. As likewise used herein, a data entity behavior broadly refers to the enactment of an entity behavior by an associated data entity.

As used herein, an entity interaction broadly refers to the occurrence of an action associated with a first entity being influenced by another action associated with a second entity. In certain embodiments, an entity interaction may include the occurrence of at least one event enacted by one entity when interacting with another. In certain embodiments, an event associated with an entity interaction may include at least one entity attribute, described in greater detail herein, and at least one entity behavior, likewise described in greater detail herein. As an example, a user entity may perform an action, such as sending a text message to some other user entity who in turn replies with a response. In this example, the other user entity's action of responding is influenced by the user entity's action of sending the text message.

As another example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable.

In various approaches, a software agent may be autonomous or work in concert with another agent, or an entity, or a combination of the two, as described in greater detail herein. In certain of these approaches, the software agent may be implemented to autonomously decide if a particular action is appropriate for a particular event, or an observed entity behavior, or a combination of the two, as likewise described in greater detail herein. As used herein, an event broadly refers to the occurrence of at least one action performed by an entity. In certain embodiments, the action may be directly, or indirectly, associated with an entity behavior, described in greater detail herein. In certain embodiments, the entity behavior may include an entity's physical behavior, cyber behavior, or a combination thereof, as likewise described in greater detail herein.

As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

An endpoint device 204, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, such an endpoint device 204 may be implemented as a non-user entity. In certain embodiments, the communication of the data may take place in real-time or near-real-time. As used herein, real-time broadly refers to processing and providing information within a time interval brief enough to not be discernable by a user entity, described in greater detail herein. As an example, a cellular phone conversation may be used to communicate information in real-time, while an instant message (IM) exchange may be used to communicate information in near real-time.

In certain embodiments, the communication of the information may take place asynchronously. For example, an email message may be stored on an endpoint device 204 when it is offline. In this example, the information may be communicated to its intended recipient once the endpoint device 204 gains access to a network 140. In certain embodiments, the network 140 may be a private network (e.g., an enterprise network), a semi-public network (e.g., a service provider core network), or a public network (e.g., the Internet).

In certain embodiments, the protected endpoint 202 may be implemented to perform operations associated with providing real-time resolution of the identity of an entity at a particular point in time, as described in greater detail herein. In certain embodiments, the protected endpoint 202 may be implemented to provide temporal information associated with such operations. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence of an action enacted by, or associated with, an entity at a particular point in time.

Examples of such temporal events include making a phone call, sending a text or an email, using a device, such as an endpoint device 204, accessing a system, and entering a physical facility. Other examples of temporal events include uploading, transferring, downloading, modifying, or deleting data, such as data stored in a datastore, or accessing a service. Yet other examples of temporal events include entity interactions between two or more users, entity interactions between a user and a device, entity interactions between a user and a network, and entity interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the temporal event information may include metadata. In various embodiments, the metadata may include temporal event attributes, which in turn may include certain entity identifier types or classifications, described in greater detail herein.

In certain embodiments, the real-time resolution of the identity of an entity at a particular point in time may be based upon contextual information associated with a particular entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

Cyber behavior, as used herein, broadly refers to any behavior occurring in cyberspace, whether enacted by an individual entity, a group of entities, or a system acting at the behest of an individual entity, a group of entities, or other entity described in greater detail herein. More particularly, cyber behavior may include physical, social, or mental actions enacted by a user entity that can be objectively observed, or indirectly inferred, within cyberspace. As an example, a user may use an endpoint device 204 to access and browse a particular website on the Internet. In this example, the individual actions performed by the user to access and browse the website constitute a cyber behavior.

As another example, a user may use an endpoint device 204 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 204, or various resources, described in greater detail herein. In certain embodiments, the entities may include various endpoint devices 204 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, a user entity's role or position in an organization, their associated access rights, and certain user gestures employed by a user in the enactment of a user entity behavior. Other contextual information may likewise include various user entity interactions, whether the interactions are with a non-user entity, a data entity, or another user entity. In certain embodiments, user entity behaviors, and their related contextual information, may be collected at particular points of observation, and at particular points in time, described in greater detail herein. In certain embodiments, a protected endpoint 202 may be implemented as a point of observation for the collection of entity behavior and contextual information.

In certain embodiments, the endpoint agent 206 may be implemented to universally support a variety of operating systems, such as Apple Macintosh®, Microsoft Windows®, Linux®, Android® and so forth. In certain embodiments, the endpoint agent 206 may be implemented to interact with the endpoint device 204 through the use of low-level hooks 212 at the operating system level. It will be appreciated that the use of low-level hooks 212 allows the endpoint agent 206 to subscribe to multiple events through a single hook. Consequently, multiple functionalities provided by the endpoint agent 206 can share a single data stream, using only those portions of the data stream they may individually need. Accordingly, system efficiency can be improved and operational overhead reduced.

In certain embodiments, the endpoint agent 206 may be implemented to provide a common infrastructure for pluggable feature packs 208. In various embodiments, the pluggable feature packs 208 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 208 may be invoked as needed by the endpoint agent 206 to provide a given functionality. In certain embodiments, individual features of a particular pluggable feature pack 208 are invoked as needed. In certain embodiments, the individual features of a pluggable feature pack 208 may be invoked by the endpoint agent 206 according to the occurrence of a particular entity behavior. In certain embodiments, the individual features of a pluggable feature pack 208 may be invoked by the endpoint agent 206 according to the occurrence of a particular temporal event, described in greater detail herein. In certain embodiments, the individual features of a pluggable feature pack 208 may be invoked by the endpoint agent 206 at a particular point in time. In these embodiments, the method by which a particular entity behavior, temporal event, or point in time is selected is a matter of design choice.

In certain embodiments, the individual features of a pluggable feature pack 208 may be invoked by the endpoint agent 206 according to the context of a particular entity behavior. As an example, the context may be a user enacting a particular user entity behavior, their associated risk classification, which resource they may be requesting, the point in time the user entity behavior is enacted, and so forth. In certain embodiments, the pluggable feature packs 208 may be sourced from various cloud services 216. In certain embodiments, the pluggable feature packs 208 may be dynamically sourced from various cloud services 216 by the endpoint agent 206 on an as-needed basis.

In certain embodiments, the endpoint agent 206 may be implemented with additional functionalities, such as event analytics 210. In various embodiments, the event analytics 210 functionality may include analysis of certain entity behaviors, described in greater detail herein. Those of skill in the art will recognize that many such embodiments and examples are possible. Accordingly, the foregoing is not intended to limit the spirit, scope or intent of the invention.

Figure 3:
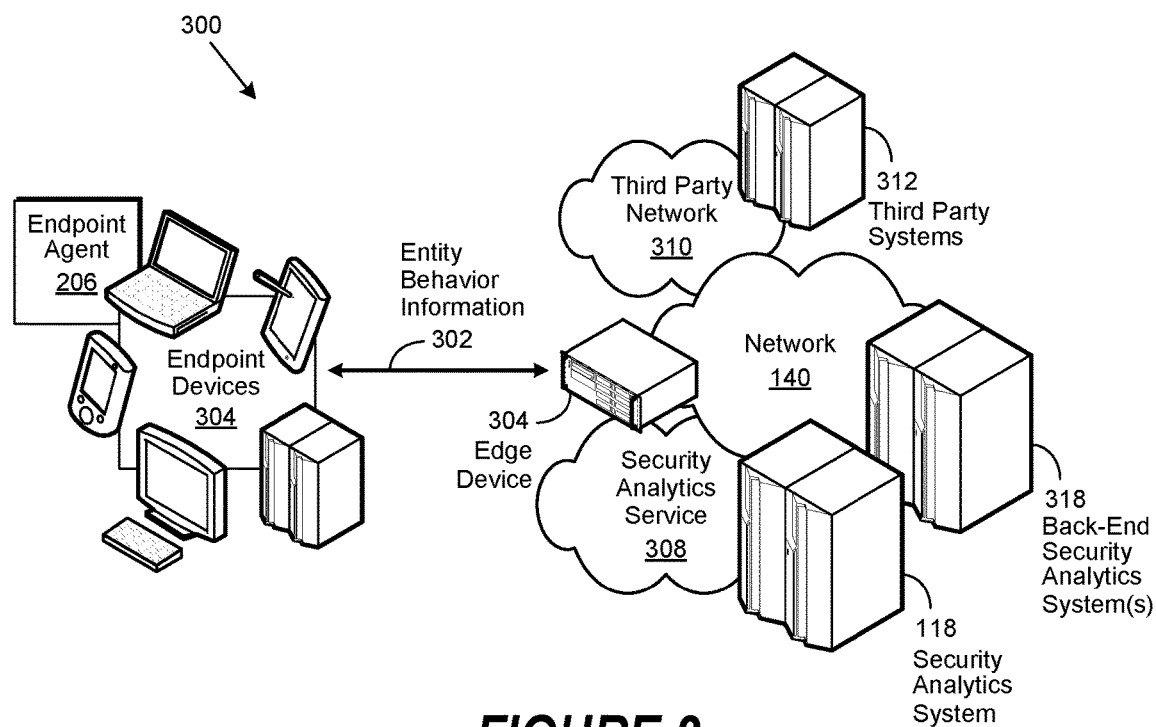
FIG. 3 is a simplified block diagram showing reference architecture components of a security analytics environment.

FIG. 3 is a simplified block diagram showing reference architecture components of a security analytics environment. In certain embodiments, the security analytics environment 300 may be implemented to include a security analytics system 118, one or more back-end security analytics systems 318, a network 140, one or more endpoint devices 204, and one or more edge devices 304. In various embodiments, the security analytics system 118 and the one or more back-end security analytics systems 318 may be implemented to perform certain security analytics operations. As used herein, a security analytics operation broadly refers to any operation performed to determine a security risk corresponding to a particular event, or an entity behavior enacted by an associated entity, or a combination thereof.

In certain embodiments, the security analytics system 118 may be implemented as both a source and a sink of entity behavior information 302. As used herein, entity behavior information 302 broadly refers to any information related to the enactment of a behavior by an associated entity. In various embodiments, the security analytics system 118 may be implemented to serve requests for certain entity behavior information 302.

In various embodiments, one or more back-end security analytics systems 318, individually or in combination, may be implemented to perform certain back-end security analytics operations. As used herein, a back-end security analytics operation broadly refers to a security analytics operation, described in greater detail herein, whose performance is oriented towards one or more thematically-associated events, entity attributes, or entity behaviors, or a combination thereof. As likewise used herein, thematically-associated broadly refers to having something in common. Likewise, as used herein, having something in common broadly refers to a shared attribute of an event, or entity, or entity behavior, or a combination thereof. Accordingly, as likewise used herein, a thematically-associated entity behavior broadly refers to an entity behavior whose enactment by multiple entities transcends its enactment by any single associated entity. In various embodiments, one or more back-end security operations may be oriented towards the analysis of thematically-oriented events, entity attributes, entity behaviors, or a combination thereof.

As an example, certain employees may access a corporate datastore to download a particular data file containing proprietary information. In this example, each download of the data file are individual events, which are thematically-associated due to the fact that the same data file is downloaded from the same datastore. Likewise, each employee may have the same title, job responsibilities, and data file access rights, or a combination thereof, which are thematically-associated due to the fact they are shared user entity attributes. To continue the example, each employee may likewise download the data file to a company-owned computer during normal business hours while working at a corporate office, all of which are thematically-associated user entity behaviors due to their commonality.

In certain embodiments, the performance of a back-end security analytics operation may result in a security risk assessment for an entity behavior whose enactment by multiple entities transcends its enactment by any single associated entity. As used herein, a security risk assessment broadly refers to an evaluation, estimation, characterization, or a combination thereof, of the security risk corresponding to a particular entity behavior. In certain embodiments, the results of a security risk assessment may be expressed as an entity security risk score.

In certain embodiments, the security risk score may be implemented as a qualitative value (e.g., low, medium, high), or a quantitative value (e.g. '25' on a scale of '1' to '100,' with '100' being the highest risk), or a combination of the two. In various embodiments, certain statistical approaches familiar to skilled practitioners of the art may be used to establish such a baseline security risk assessment. As an example, a particular entity behavior enacted by three user entities, each of which may share substantively similar entity attributes, may respectively have an entity security risk score of '18,' '22,' and '20.' In this example, the three entity security risk scores may be averaged to produce an average entity security risk score of '20,' which in turn may be used as a baseline entity security risk assessment. Those of skill in the art will recognize that many such statistical approaches for establishing a baseline security risk assessment are possible, such as standard deviation calculations, various regression models, multivariate analysis, and so forth. Accordingly, the foregoing is not intended to limit the spirit, scope or intent of the invention.

In certain embodiments, a back-end security analytics operation may be performed to establish a baseline security risk assessment for a particular entity behavior respectively enacted by two or more different entities that share certain substantively similar entity attributes and are associated with the same organization. As an example, an organization may currently employ three Senior Engineering Directors, each of which possess substantively similar user entity attributes. In this example, a back-end security analytics operation may have been performed to establish a baseline security risk assessment corresponding to a particular user entity behavior commonly enacted by the three Senior Engineering Directors.

To continue the example, the organization may hire an additional Senior Engineering Director, whose trustworthiness may not yet be established due to insufficient monitoring of their user entity behavior. However, the newly-hired employee may share certain entity attributes that are substantively similar with other Senior Engineering Directors within the organization. Accordingly, a security risk assessment may be performed for a particular user entity behavior enacted by the new employee, which can then be compared to the baseline security risk assessment corresponding to the same entity behavior enacted by the other Senior Engineering Directors. If the two assessments are proximate to one another, then the user entity behavior enacted by the new employee is likely acceptable. If they are not, then the user entity behavior enacted by the new employee may justify investigation and review.

In certain embodiments, a back-end security analytics operation may be performed to establish a baseline security risk assessment for a particular entity behavior respectively enacted by two or more different entities that share certain substantively similar entity attributes, but are associated with different organizations. For example, five different organizations may employ a total of thirty seven Payroll Administrators, each of which possess substantively similar user entity attributes. In this example, a back-end security analytics operation may have been performed to establish a baseline security risk assessment corresponding to a particular user entity behavior commonly enacted by all thirty seven Payroll Administrators.

To continue the example, one of the organizations may hire an additional Payroll Administrator, whose trustworthiness may not yet be established due to insufficient monitoring of their user entity behavior. However, the newly-hired employee may share certain entity attributes that are substantively similar with other Payroll Administrators within their respective organizations. Accordingly, as in the previous example, a security risk assessment may be performed for a particular user entity behavior enacted by the new employee, which can then be compared to the baseline security risk assessment corresponding to the same entity behavior enacted by the other Payroll Administrators. If the two assessments are proximate to one another, then the user entity behavior enacted by the new employee is likely acceptable. If they are not, then the user entity behavior enacted by the new employee may justify investigation and review.

In certain embodiments, a back-end security analytics operation performed by a particular back-end security analytics system 318 may be the same security analytics operations performed by the security analytics system 118. For example, one or more back-end security analytics systems 318 may be implemented in certain embodiments to maintain performance levels for certain security analytics operations by providing additional computing resources. As another example, one or more back-end security analytics systems 318 may be implemented in various embodiments to distribute the processing load associated with certain security analytics operations.

In various embodiments, certain security back-end analytics operations may be assigned, or otherwise allocated, between two or more back-end security analytics systems 318. Certain embodiments of the invention reflect an appreciation that the ability to assign a particular security analytics operation to a particular back-end security analytics system 318 not only provides operational flexibility, but allows optimal use of available computing resources. In various embodiments, one or more back-end security analytics systems 318 may be implemented to perform certain operations that may be directly, or indirectly, associated with the performance of a particular security analytics operation. As an example, certain entity behavior information may be anonymized, aggregated, and processed to produce a model of typical, or expected, entity behavior. In this example, the resulting model of expected entity behavior may then be used by the security analytics system 118 as a reference to determine whether a particular entity behavior may be anomalous, abnormal, unexpected, or suspicious.

In certain embodiments, the back-end security analytics system(s) 318 may be co-located with the security analytics system 118. In certain embodiments, one or more back-end security analytics system(s) 318 may execute on a partition, such as a virtual machine (VM), of the security analytics system 118. In certain embodiments, the one or more back-end security analytic system(s) 318 may be implemented to operate independently, cooperatively, or a combination thereof, in a distributed security analytics framework.

As used herein, a distributed security analytics framework broadly refers to a distributed system implemented to perform a distributed security analytics operation, in whole or in part. Skilled practitioners of the art will be familiar with the concept of a distributed system, which generally refers to a system whose various components are implemented on two or more networked computers. These networked computers coordinate their actions by passing messages to between themselves such that their respective components can interact with one another to achieve a common goal. Another aspect of a distributed system is the distribution of data, which may be used by the networked computer that hosts it, or provided to another networked computer for processing.

Accordingly, as likewise used herein, a distributed security analytics operation broadly refers to a security analytics operation, described in greater detail herein, performed by certain components of a distributed security analytics framework, individually or in combination with one another. A component of a distributed security analytics framework, as likewise used herein, broadly refers to a device, apparatus, system, process, or operation, capable of being implemented, individually or in combination, to perform a security analytics operation, or a portion thereof. Those of skill in the art will recognize that many such embodiments of the implementation of a back-end security analytics system 318 are possible. Accordingly, the foregoing is not intended to limit the spirit, scope, or intent of the invention.

In certain embodiments, the edge device 304 and the endpoint agent 206, individually or in combination, may provide certain entity behavior information 302 to the security analytics system 118, respectively using push or pull approaches familiar to skilled practitioners of the art. As used herein, an edge device 304 broadly refers to a device providing an entry point into a network, such as the network 140 shown in FIG. 3. Examples of such edge devices 304 include routers, routing switches, integrated access devices (IADs), multiplexers, wide-area network (WAN) access devices, network security appliances, and so forth. In certain embodiments, the edge device 304 may be implemented in a bridge, a firewall, or a passive monitoring configuration. In certain embodiments, the edge device 304 may be implemented as software running on an information processing system.

In certain embodiments, the edge device 304 may be implemented to provide access to the security analytics system 118 via the network 140. In certain embodiments, the edge device 304 may be implemented to provide access to and from the network 140, a third party network 310, and a security analytics service 308, or a combination thereof. In certain embodiments, the network 140 and third party networks 310 may respectively be a private network (e.g., an enterprise network), a semi-public network (e.g., a service provider core network), or a public network (e.g., the Internet). In certain embodiments, the edge device 304 may be implemented to provide access to a third party system 312 via the third party network 310.

In certain embodiments, the edge device 304 may be implemented to provide support for a variety of generic services, such as directory integration, logging interfaces, update services, and bidirectional risk/context flows associated with various security analytics operations, described in greater detail herein. In certain embodiments, the edge device 304 may be implemented to provide temporal information, likewise described in greater detail herein, associated with the provision of such services. In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the edge device 304 may be implemented to receive network requests and context-sensitive entity behavior information 302, described in greater detail herein, from an endpoint agent 206. The edge device 304 may be implemented in certain embodiments to receive enriched entity behavior information 302 from the endpoint agent 206. In various embodiments, certain entity behavior information 302 may be enriched by an associated endpoint agent 206 attaching contextual information to a request.

In various embodiments, the contextual information may be embedded within a network request, which is then provided as enriched entity behavior information 302. In various embodiments, the contextual information may be concatenated, or appended, to a request, which in turn is provided as enriched entity behavior information 302. In certain of these embodiments, the enriched entity behavior information 302 may be unpacked upon receipt by the edge device 304 and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on the network 140 or third party network 310.

In various embodiments, new flow requests may be accompanied by a contextual information packet sent to the edge device 304. In certain of these embodiments, the new flow requests may be provided as enriched entity behavior information 302. In certain embodiments, the endpoint agent 206 may also send updated contextual information to the edge device 304 once it becomes available. As an example, an endpoint agent 206 may share a list of files that have been read by a current process at any point in time once the information has been collected. To continue the example, such a list of files may be used to determine which data the endpoint agent 206 may be attempting to exfiltrate.

In certain embodiments, such service requests may be associated with temporal event information, described in greater detail herein. Consequently, such requests can be enriched by the addition of contextual entity information (e.g., UserAccount, interactive/automated, data-touched, etc.). Accordingly, the edge device 304 can then use this information to manage the appropriate response to submitted requests. In certain embodiments, such requests may be associated with providing real-time resolution of the identity of an entity at a particular point in time.

In certain embodiments, point analytics processes executing on the edge device 304 may request a particular service. As an example, risk scores on a per-entity basis may be requested. In certain embodiments, the service may be requested from the security analytics system 118. In certain embodiments, the service may be requested from a security analytics service 308. In certain embodiments, the security analytics system 118 may be implemented to provide the security analytics service 308. In certain embodiments, hosting of the security analytics service 308 may be provided by a cloud infrastructure familiar to those of skill in the art.

In certain embodiments, the endpoint agent 206 may be implemented to update the security analytics system 118 with entity behavior information 302 and associated contextual information, thereby allowing an offload of certain analytics processing overhead. In various embodiments, this approach may be implemented to provide longitudinal risk scoring, which assesses security risk associated with certain entity behavior during a particular interval of time. In certain embodiments, the security analytics system 118 may be implemented to perform risk-adaptive operations to access risk scores associated with the same user entity, but accrued on different endpoint devices 204. Certain embodiments of the invention reflect an appreciation that such an approach may prove advantageous when an adversary is "moving sideways" through a network environment, using different endpoint devices 204 to collect information.

Certain embodiments of the invention reflect an appreciation that enriched entity behavior information 302 will likely not be available for provision to the edge device 304 if an endpoint agent 206 is not implemented for a corresponding endpoint device 204. However, the lack of such enriched entity behavior information 302 may be accommodated in various embodiments, albeit with reduced functionality associated with certain security analytics operations.

In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the security analytics system 118 may be implemented in different operational configurations. In various embodiments, the security analytics system 118 may be implemented for use by the endpoint agent 206. In various embodiments, the security analytics system 118 may be implemented for use by the endpoint agent 206 and the edge device 304 in combination. In various embodiments, the security analytics service 308 may likewise be implemented for use by the endpoint agent 206, the edge device 304, and the security analytics system 118, individually or in combination. In certain of these embodiments, the security analytics system 118 may be primarily oriented to performing security risk assessment operations related to one or more entity's associated entity behaviors.

In certain embodiments, the security analytics system 118 may be primarily oriented to applying risk mitigations in a way that maximizes security effort return-on-investment (ROI). In certain embodiments, such approaches may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 304 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user entity's actions, at a particular time.

In certain embodiments, the security analytics system 118 may be primarily oriented to maximally leverage contextual information associated with various entity behaviors within the system. In certain embodiments, data flow tracking is performed by one or more endpoint agents 206, which allows the quantity and type of information associated with particular entities to be measured. In turn, this information may be used to determine how a particular edge device 304 handles requests. Skilled practitioners of the art will recognize that many such embodiments and examples are possible. Accordingly, the foregoing is not intended to limit the spirit, scope or intent of the invention.

Figure 4:
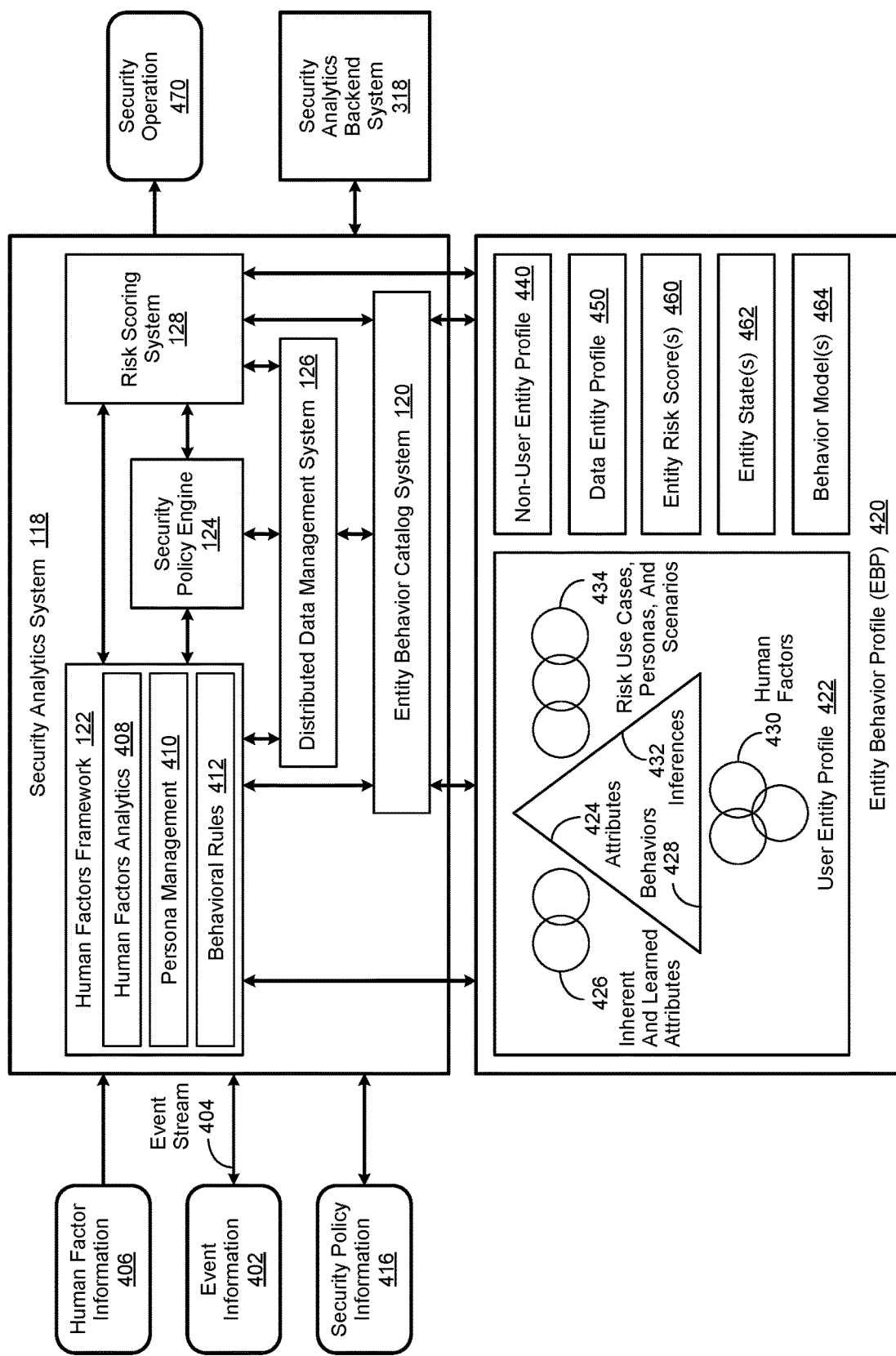
FIG. 4 is a simplified block diagram of the operation of a security analytics system used to process information stored in an entity behavior profile (EBP).

FIG. 4 is a simplified block diagram of the operation of a security analytics system implemented in accordance with an embodiment of the invention to process information stored in an entity behavior profile (EBP). In various embodiments, a security analytics system 118 may be implemented to use certain information stored in an EBP 420 to perform a security analytics operation, described in greater detail herein. As used herein, an entity behavior profile 420 broadly refers to a collection of information that uniquely describes a particular entity's identity and their associated behavior, whether the behavior occurs within a physical realm or cyberspace. In certain embodiments, the security analytics system 118 may be implemented to use certain event 402 and human factor 406 information in the performance of a particular security analytics operation.

In certain embodiments, the security analytics system 118 may be implemented with an entity behavior catalog (EBC) system 120, a human factors framework 122, a security policy engine 124, a distributed data management system 126, and a risk scoring system 128, or a combination thereof. In various embodiments, the EBC system 120 may be implemented to perform certain EBC operations, described in greater detail herein. In certain embodiments, the human factors framework 122 may be implemented to perform a human factors risk operation, likewise described in greater detail herein.

In various embodiments, the security policy engine 124 may likewise be implemented to perform certain security policy management operations. As used herein, a security policy management operation broadly refers to any operation associated with managing security policy information 416 corresponding to a particular entity. In certain embodiments, such security policy information 416 may be implemented as a security policy rule familiar to skilled practitioners of the art. In certain embodiments, the security policy rule may be implemented to determine whether a particular event is of analytic utility, anomalous, or both. In certain embodiments, the security policy information 416 may be received by the security analytics system 118 and then provided to the security policy engine 124.

In various embodiments, the distributed data management system 126 may be implemented to perform certain distributed data management operations. As used herein, a distributed data management operation broadly refers to any operation associated with the exchange of security-related information between certain components of a distributed security analytics framework. In various embodiments, the distributed data management operations may variously include the receipt, provision, or management, or a combination thereof, of certain event information 402, as described in greater detail herein. In various embodiments, certain event information 402 may be exchanged with another component of a distributed security analytics framework, such as a back-end security analytics system 318, as likewise described in greater detail herein. In various embodiments, the distributed data management system 126 may be implemented to provide certain results of one or more security policy management operations performed by the security policy engine 124 to another component of a distributed security analytics framework.

In various embodiments, the human factors framework 122 may be implemented to receive and process certain human factor 406 information to generate one or more human factors 430. As used herein, human factors 430 broadly refer to certain cardinal traits, emotional stressors, and organizational dynamics that individually, or in combination, may influence, one way or another, the entity behavior of an associated user entity. In certain embodiments, such human factors 430 broadly may include a circumstance, aspect, dynamic, attribute, or other consideration used to clarify, mitigate, exacerbate, or otherwise affect the perception, meaning, understanding, or assessment of a security risk associated with a particular entity behavior.

As an example, an employee experiencing financial stress may attempt to exfiltrate proprietary data in exchange for compensation from a competitor. As used herein, cardinal traits broadly refers to a user entity's consistent and enduring observed entity behavioral patterns. As likewise used herein, an emotional stressor broadly refers to any event involving an end user entity such that it may have an emotional influence upon, or otherwise affect, a user entity's behavior. An organizational dynamic, as likewise used herein, broadly refers to any event that occurs within an organization, or large group, that may have an operational influence upon, or otherwise affect, a user entity's behavior.

In various embodiments, the human factors framework 122 may likewise be implemented to provide certain human factors 430 to the EBC system 120, the security policy engine 124, the distributed data management system 126, the risk scoring system 128, or a combination thereof. In various embodiments, the security policy engine 124 may be implemented to use certain human factors 430 generated by the human factors framework 122 to determine whether a particular entity is adhering to an associated security policy. In various embodiments, the distributed data management system 126 may be implemented to provide certain human factors 430 generated by the human factors framework 122 to another component of a distributed security analytics framework. In various embodiments, as described in greater detail herein, the risk scoring system 128 may be implemented to use certain human factors 430 generated by the human factors framework 122 to generate a security risk score. In various embodiments, the EBC system 120 may be implemented to store certain human factors 430 generated by the human factors framework 122 in a user entity profile 422, described in greater detail herein.

In various embodiments, the human factors framework 122 may be implemented with a human factors analytics 408 module, a contextual security risk persona management 410 module, and certain user entity behavioral rules 412, or a combination thereof. In certain embodiments, the human factors analytics 408 module may be implemented to perform a human factors analytics operation. As used herein, a human factors analytics operation broadly refers to any operation performed to analyze the effect that certain human factors, individually or in combination, may have on the security risk corresponding to an entity behavior enacted by an associated user entity. In certain embodiments, the security risk persona management 410 module may be implemented to create, revise, update, or otherwise manage a particular security risk persona, described in greater detail herein, associated with a particular user entity.

In various embodiments, the human factors framework 122 may be implemented to create, revise, update, or otherwise manage certain user behavioral rules 412 associated with a particular user entity. In certain embodiments, the user behavioral rules 412 may be implemented to determine whether a particular user entity behavior is anomalous, abnormal, unexpected, suspicious, or some combination thereof. In certain embodiments, the human factors framework 122 may be implemented to use the user behavioral rules 412 to determine whether certain user entity behaviors that are determined to be anomalous, abnormal, unexpected, suspicious, or some combination thereof, may likewise be considered to be a concerning behavior within a particular context.

In various embodiments, the EBC system 120 may be implemented to process a stream 404 of event 402 information to generate, revise, and otherwise manage certain information contained in an EBP 420. In certain embodiments, the EBP 420 may be implemented to include a user entity profile 422, a non-user entity profile 440, a data entity profile 450, one or more entity risk scores 460, one or more entity states 462, and one or more entity models, or a combination thereof. As used herein, a user entity profile 422 broadly refers to a collection of information that uniquely identifies and describes a particular user entity identity and their associated entity behavior, whether the behavior occurs within a physical realm or cyberspace. As likewise used herein, a non-user entity profile 440 broadly refers to a collection of information that uniquely identifies and describes a particular non-user entity identity and its associated entity behavior, whether the behavior occurs within a physical realm or cyberspace. A data entity profile 450, as likewise used herein, broadly refers to a collection of information that uniquely identifies and describes a particular data entity, described in greater detail herein, and its associated entity behavior, whether the behavior occurs within a physical realm or cyberspace.

In various embodiments, the user entity profile 422 may be implemented to contain certain attribute 424, behavior 426, and inference 430 data related to a particular user entity. In certain embodiments, the attribute 424 data may include information associated with a particular user entity's inherent and learned 426 attributes. In certain embodiments, the attribute 424 data may be used by the human factors framework 122 to gain knowledge or insights about a particular user entity and their associated user entity behavior.

In certain embodiments, a user entity's inherent and learned attributes 426 may include known facts, such as their location and contact information, their job title and responsibilities, their peers and manager, and so forth. In certain embodiments, a user entity's inherent and learned attributes 426 may be derived through observation, as described in greater detail herein. Examples of such derived inherent and learned attributes 426 include which devices a user entity may typically use, their usual work hours and habits, their interactions with other entities, and so forth.

In certain embodiments, the behavior 428 data may include information associated with a particular user entity's human factors 430, described in greater detail herein. In certain embodiments, the behavior 428 data may include information associated with a particular user entity's interactions with other entities, likewise described in greater detail herein. In certain embodiments, the inference 432 data may include information associated with certain security risk use cases, security risk personas, and security vulnerability scenarios 434, or a combination thereof, related to a particular user entity.

As used herein, a security risk use case broadly refers to a set of indicators of behavior that create a security risk narrative that can be used to adaptively draw inferences, described in greater detail herein, from entity behavior enacted by a particular entity. As used herein, an indicator of behavior (IOB) broadly refers to an abstracted description of the inferred intent of the enactment of one or more entity behaviors, described in greater detail herein, by an associated entity. In certain embodiments, information related to the enactment of a particular entity behavior may be stored in the form of an observable. As used herein, an observable broadly refers to certain event information corresponding to an electronically-observable behavior enacted by an entity. In certain embodiments, an IOB is derived from a group of associated observables corresponding to the enactment of a particular entity behavior.

As an example, a user entity may enact certain entity behavior that results in the occurrence of one or more operating system (OS) events, a cloud access security broker (CASB) event, a firewall access event, and a data file download event. In this example, the events are observables. To continue the example, an IOB of "user downloaded document" can be inferred from the observables.

Skilled practitioners of the art will be familiar with the concept of an indicator of compromise (IOC), which is an artifact on a system or network that indicate a malicious activity has occurred. Known examples of IOCs include file hashes, network addresses, domain names, and so forth. As such, IOCs are useful in identifying and preventing adversary attacks based upon unique signatures of malware or other tools used by an attacker. However, IOCs are less effective against insider threats, such as data exfiltration. Accordingly, certain embodiments of the invention reflect an appreciation that IOBs can provide a description of the approach an attack is taking as it is occurring, unlike an IOC, which provides evidence of an attack after it has taken place.

As likewise used herein, a security risk persona broadly refers to a descriptor characterizing an entity behavioral pattern exhibited by a user entity during the enactment of certain user entity behaviors. In certain embodiments, the security risk persona may directly or indirectly characterize, or otherwise reference, one or more user entity behaviors. As an example, a user entity may exhibit user entity behaviors typically associated with data stockpiling. In this example, the security risk persona for the user entity might be "Data Stockpiler," or "Stockpiler." Likewise, as used herein, a security vulnerability scenario broadly refers to a grouping of one or more security risk use cases that represent a particular class of security vulnerability.

In various embodiments, the human factors framework 122 may be implemented in combination with the EBC system 122 to store certain human factors information in the EBP 420 and retrieve it therefrom. In certain embodiments, the attribute 424, behavior 428, and inference 432 data stored in the user entity profile 422 may be used individually, or in combination, by the human factors framework 122 to perform a human factors risk operation. As used herein, a human factors risk operation broadly refers to any operation performed to identify a human factor 430, classify it into a corresponding human factor class, or determine the effect it may have on the security risk represented by an associated JOB, or a combination thereof.

In various embodiments, the security analytics system 118 may be implemented to use certain information stored in the EBP 420 to draw inferences 432 regarding the trustworthiness of a particular entity. In certain embodiments, as described in greater detail herein, the drawing of the inferences may involve comparing a new entity behavior to known past behaviors enacted by the entity. In certain embodiments, new entity behavior that is different from known past behaviors may represent entity behavior signifying an associated security risk.

In certain embodiments, the risk scoring system 124 may be implemented to use such inferences 432, and other information stored in the EBP 420 to generate one or more entity risk scores 460. In certain embodiments, the resulting entity risk scores 460 may be quantitative, qualitative, or combination of the two. In certain embodiments, the EBC system 120 may be implemented to manage information associated with such risk scores 460 in the EBP 420.

As used herein, entity state 462 broadly refers to the context of a particular event as it relates to an associated entity behavior. In certain embodiments, the entity state 462 may be a long-term entity state or a short-term entity state. As used herein, a long-term entity state 462 broadly relates to an entity state 462 that persists for an extended interval of time, such as six months or a year. As likewise used herein, a short-term entity state 462 broadly relates to an entity state 462 that occurs for a brief interval of time, such as a few minutes or a day. In various embodiments, the method by which an entity state's 462 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location, whereas the presence of the user at either office corresponds to an entity state 462. To continue the example, the user may consistently work at their primary office Monday through Thursday, but at their company's corporate office on Fridays. To further continue the example, the user's presence at their primary work location may be a long-term entity state 462, while their presence at their secondary work location may be a short-term entity state 462. Consequently, the long-term user entity state 462 on Monday through Thursday will typically be "working at the branch office" and the short-term entity state 462 on Friday will likely be "working at the corporate office."

As used herein, an entity behavior model 464 broadly refers to a collection of information related to an entity's historical entity behavior over a particular period of time. In certain embodiments, an entity behaviour model 464 may be used by the security analytics system 118 to gain insight into how unexpected a set of events may be. As an example, an entity behavior model 464 may include information related to where a particular user entity works, which devices they may use and locations they may login from, who they may communicate with, and so forth. Certain embodiments of the invention reflect an appreciation that such entity behavior models 454 can be useful when comparing currently observed entity behaviors to past observations in order to determine how unusual a particular entity behavior may be.

For example, a user may have multiple entity behavior models 454, each associated with a particular channel, which as used herein broadly refers to a medium capable of supporting the electronic observation of entity behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

In various embodiments, the security analytics system 118 may be implemented to perform a security operation 470. As used herein, a security operation 470 broadly refers to any action performed to mitigate an identified security risk. In certain embodiments, the security analytics system 118 may be implemented to identify the security risk. In various embodiments, the security analytics system 118 may be implemented to use certain information contained in the EBP 420 to either identify the security risk, or perform the security operation 470, or a combination of the two. In certain embodiments, the security system 118 may be implemented to perform the security operation 470 automatically or semi-automatically. Those of skill in the art will recognize that many such embodiments are possible. Accordingly, the foregoing is not intended to limit the spirit, scope, or intent of the invention.

Figure 5:
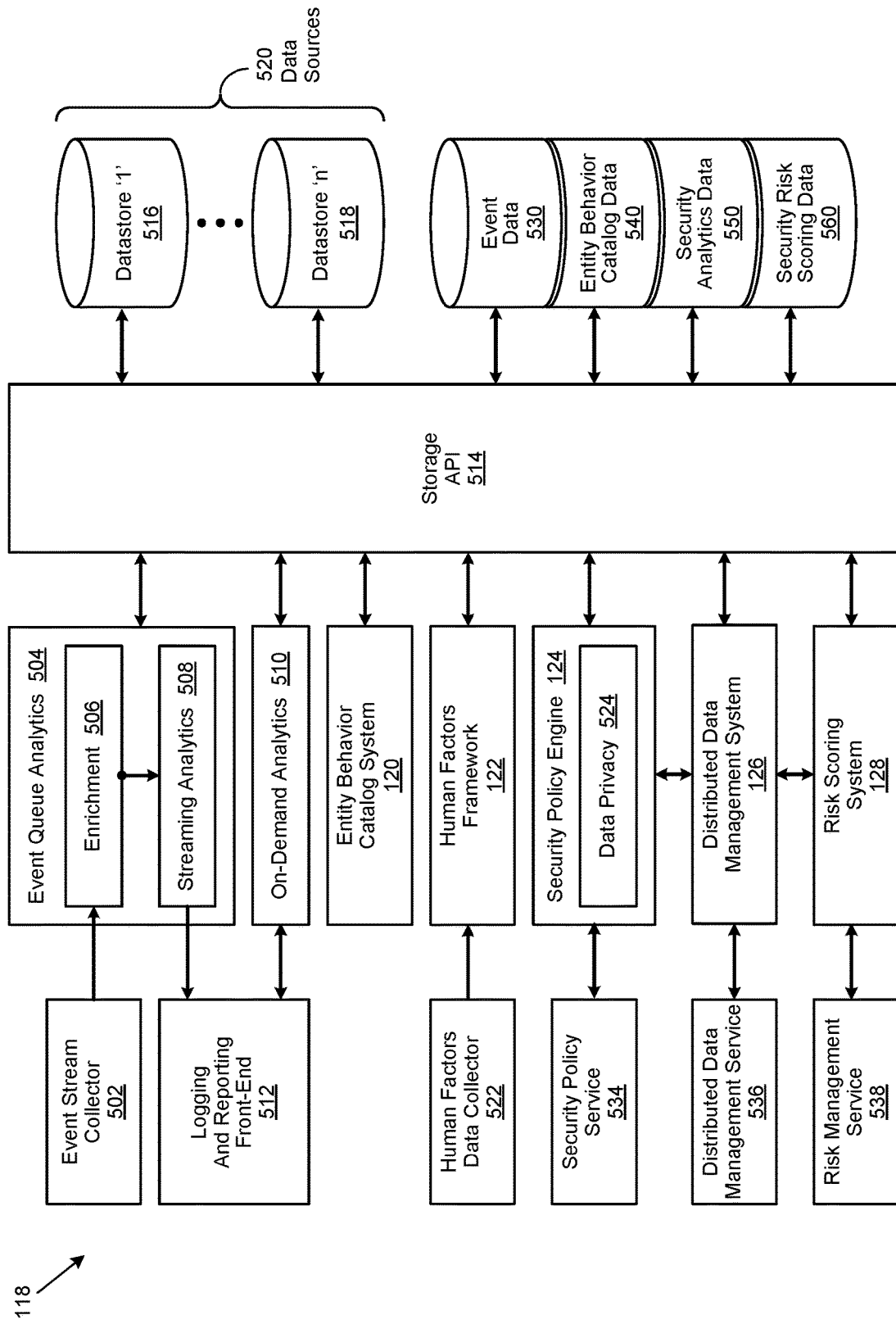
FIG. 5 is a simplified block diagram showing certain components of a security analytics system.

FIG. 5 is a simplified block diagram showing certain components of a security analytics system implemented in accordance with an embodiment of the invention. In certain embodiments, the security analytics system 118 shown in FIG. 5 may include an event queue analytics 504 sub-system. In certain embodiments, the event queue analytics 504 sub-system may be implemented to include an enrichment 506 module and a streaming analytics 508 module. In certain embodiments, the security analytics system 118 may be implemented to provide log storage, reporting, and analytics capable of performing streaming 508 and on-demand 410 analytics operations.

In certain embodiments, such operations may be associated with defining and managing an entity behavior profile (EBP), described in greater detail herein. In certain embodiments, an EBP may be implemented as an adaptive trust profile (ATP). In certain embodiments, as likewise described in greater detail herein, an EBP may be implemented to detect entity behavior that may be anomalous, abnormal, unexpected, or suspicious, or a combination thereof.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user entity behavior enacted by the user is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 502 may be implemented to collect event and related contextual information, described in greater detail herein, associated with various entity behaviors. In these embodiments, the method by which the event and contextual information is selected to be collected by the event stream collector 502 is a matter of design choice. In certain embodiments, the event and contextual information collected by the event stream collector 502 may be processed by an enrichment module 506 to generate enriched entity behavior information. In certain embodiments, the enrichment may include certain contextual information related to a particular entity behavior or event. In various embodiments, the enrichment may include certain temporal information, such as timestamp information, related to a particular entity behavior or event.

In certain embodiments, enriched entity behavior information may be provided by the enrichment module 506 to a streaming 508 analytics module. In turn, the streaming 508 analytics module may provide some or all of the enriched entity behavior information to an on-demand 510 analytics module. As used herein, streaming 408 analytics broadly refers to analytics performed in near real-time on enriched entity behavior information as it is received. Likewise, on-demand 510 analytics broadly refers herein to analytics performed, as they are requested, on enriched entity behavior information after it has been received. In certain embodiments, the enriched entity behavior information may be associated with a particular event. In certain embodiments, the enrichment 506 and streaming analytics 508 modules may be implemented to perform event queue analytics 504 operations, as described in greater detail herein.

In certain embodiments, the on-demand 510 analytics may be performed on enriched entity behavior associated with a particular interval of, or point in, time. In certain embodiments, the streaming 508 or on-demand 510 analytics may be performed on enriched entity behavior associated with a particular user, group of users, one or more non-user entities, or a combination thereof. In certain embodiments, the streaming 408 or on-demand 510 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 508 or on-demand 510 analytics modules may be provided to a storage Application Program Interface (API) 514. In turn, the storage API 512 may be implemented to provide access to certain data sources 520, such as datastores '1' 516 through 'n' 518. In certain embodiments, the datastores '1' 516 through 'n' 518 may variously include a datastore of entity identifiers, temporal events, or a combination thereof. In certain embodiments, the storage API 512 may be implemented to provide access to repositories of event 512, entity behavior catalog (EBC) 540, security analytics 550, and security risk scoring 560 data, or a combination thereof. In various embodiments, the data stores '1' 516 through 'n' 518 may be implemented to store the results of certain security analytics operations.

In certain embodiments, the security analytics system 118 may be implemented with a logging and reporting front-end 512, which is used to receive the results of analytics operations performed by the streaming 508 analytics module. In certain embodiments, the security analytics system 118 may be implemented to include and entity behavior catalog system 120, or a human factors framework 122, or both. In certain embodiments, the human factors framework 122 may be implemented to receive human factors information, described in greater detail herein, from a human factors data collector 522. In various embodiments, the entity behavior catalog system 120 and the human factors framework 122 may respectively be implemented to use the storage API 514 to access certain data stored in the data sources 520, the repositories of event 530, entity behavior catalog (EBC) 540, security analytics 550, and security risk scoring 560 data, or a combination thereof.

In certain embodiments, the security analytics system 118 may be implemented to include a security policy engine 124, described in greater detail herein. In various embodiments, the security policy engine 124 may be implemented to perform certain security policy management operations, as likewise described in greater detail herein. In certain embodiments, the security policy engine 124 may be implemented to include a data privacy module 524. In various embodiments, the data privacy module 124 may be implemented to protect the privacy of certain data associated with a particular entity, described in greater detail herein. In various embodiments, the data privacy module 124 may be implemented to protect the privacy of certain data associated with a particular entity by not providing the data when it is requested, encrypting or anonymizing the data when it is provided, or a combination thereof. In various embodiments, certain functionalities performed by the security policy system 124 may be provided as a security policy service 534.

In certain embodiments, the security analytics system 118 may be implemented to include a distributed data management system 126, described in greater detail herein. In various embodiments, the distributed data management system 126 may be implemented to perform certain distributed data management operations, as likewise described in greater detail herein. In various embodiments the distributed data management system 126 may be implemented, as likewise described in greater detail herein, to respectively provide and receive certain information to and from other components of a distributed security analytics framework. In certain embodiments, such information may be security-related information, described in greater detail herein.

In certain embodiments, the distributed data management system 126 may likewise be implemented to manage such information. In certain embodiments, the distributed data management system 126 may be implemented to use the storage API 514 to store and retrieve such information in the data sources 520, the repositories of event 530, entity behavior catalog (EBC) 540, security analytics 550, and security risk scoring 560 data, or a combination thereof. In various embodiments, certain functionalities performed by the distributed data management system 126 may be provided as a distributed data management service 536.

In certain embodiments, the security analytics system 118 may be implemented to include a risk scoring system 128, described in greater detail herein. In various embodiments, the risk scoring system 128 may be implemented to perform certain risk scoring operations, likewise described in greater detail herein. In various embodiments, certain functionalities of the risk scoring system 124 may be provided in the form of a risk management service 538. In various embodiments, the risk management service 538 may be implemented to perform certain operations associated with defining and managing an entity behavior profile (EBP), as described in greater detail herein. In certain embodiments, the risk management service 538 may be implemented to perform operations associated with detecting entity behavior that may be of analytic utility and adaptively responding to mitigate risk, as described in greater detail herein.

In certain embodiments, the risk management service 538 may be implemented to provide the results of various analytics operations performed by the streaming 506 or on-demand 508 analytics modules. In certain embodiments, the risk management service 538 may be implemented to use the storage API 514 to access various enhanced cyber behavior and analytics information stored on the data sources 520, the repositories of event 530, EBC 540, security analytics 550, and security risk scoring 560 data, or a combination thereof. Skilled practitioners of the art will recognize that many such embodiments are possible. Accordingly, the foregoing is not intended to limit the spirit, scope or intent of the invention.

In various embodiments, the security policy system 124 may be implemented to provide certain security policy information to the distributed data management system 126, or the risk scoring system 128, or both. In various embodiments, the distributed data management system 126 may be implemented to provide certain information received from other components of a distributed security analytics framework to the security policy engine 124, or the risk scoring system 128, or both. Likewise, in various embodiments, the distributed data management system 126 may be implemented to provide certain information received from the security policy engine 124, or the risk scoring system 128, or both, to other components of a distributed security analytics framework. In certain embodiments, such information may be exchanged between the security policy engine 124, the distributed data management system 126, and the risk scoring system 128 via the storage API 514 shown in FIG. 5.

Figure 6:
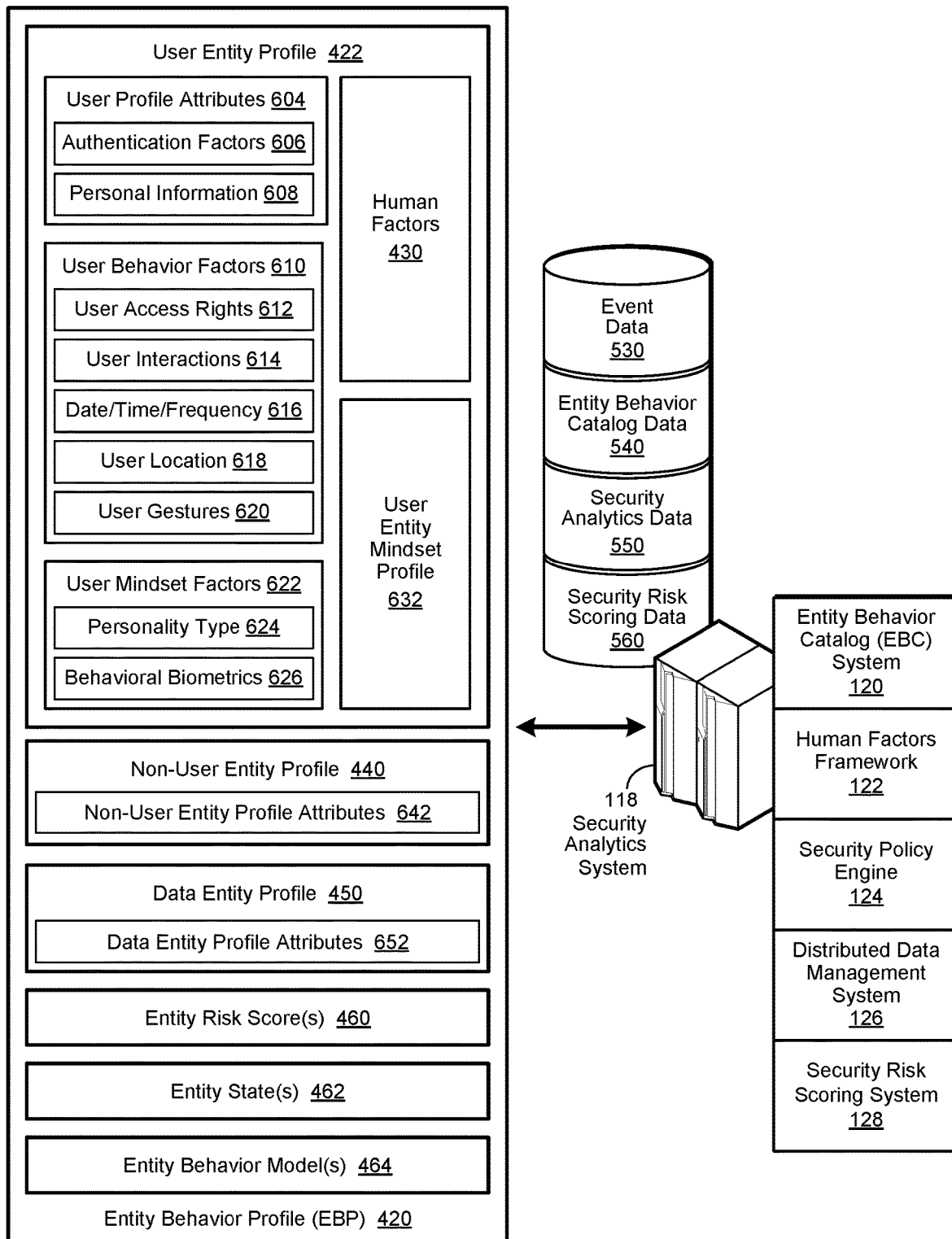
FIG. 6 shows a simplified block diagram of an entity behavior profile (EBP)

FIG. 6 shows a simplified block diagram of an entity behavior profile (EBP) implemented in accordance with an embodiment of the invention. In certain embodiments, a security analytics system 118, described in greater detail herein, may be implemented to include an entity behavior catalog (EBC) system 120, a human factors framework 122, a security policy engine 124, a distributed data management system 126, and a security risk scoring system 128, or a combination thereof. In certain embodiments, the security analytics system 118 may be implemented to access a repository of event 530, EBC 540, security analytics 550, and security risk scoring 560 data, or a combination thereof. In various embodiments, the security analytics system 118 may be implemented to use certain information stored in the repository of event 530, EBC 540, security analytics 550, and security risk scoring 560 data, or a combination thereof, to perform a security analytics operation, described in greater detail herein. In certain embodiments, the results of a particular security analytics operation may be stored in the repository of security analytics 550 data.

In certain embodiments, the EBC system 120 may be implemented to generate, manage, store, or some combination thereof, information related to the behavior of an associated entity. In certain embodiments, the information related to the behavior of a particular entity may be stored in the form of an entity behavior profile (EBP) 420. In certain embodiments, the EBC system 120 may be implemented to store the information related to the behavior of a particular entity in the repository of EBC 540 data. In various embodiments, the EBC system 120 may be implemented to generate certain information related to the behavior of a particular entity from event information associated with the entity, as described in greater detail herein. In certain embodiments, event information associated with a particular entity may be stored in the repository of event 530 data.

In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog may be related to cyber behavior enacted by a user entity, a non-user entity, or a data entity, or a combination thereof.

In various embodiments, the EBC system 120 may be implemented to perform EBP 420 management operations to process certain entity behavior information, described in greater detail herein, and entity attribute information associated, with defining and managing an EBP 420. As used herein, entity attribute information broadly refers to information associated with a particular entity that can be used to uniquely identify the entity, and describe certain associated properties, or a combination thereof. In various embodiments, the entity attribute information may include certain types of content. In certain embodiments, such content may include text, unstructured data, structured data, graphical images, photographs, audio recordings, video recordings, biometric information, and so forth. In certain embodiments, the entity attribute information may include metadata. In certain embodiments, the metadata may include entity attributes, which in turn may include certain entity identifier types or classifications.

In certain embodiments, the entity attribute information may include entity identifier information. In various embodiments, the EBC system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In various embodiments, the entity identifier information may include certain user entity 422, non-user entity 440, and data 450 entity profile attributes, or a combination thereof.

In certain embodiments, the entity identifier information may include temporal information, described in greater detail herein. In various embodiments, the security analytics system 118 may be implemented to use certain aspects of the EBC system 120 and such temporal information to assess the risk associated with a particular entity, at a particular point in time, and respond with a corresponding security operation, likewise described in greater detail herein. In certain embodiments, the security analytics system 118 may be implemented to respond to such assessments in order to reduce operational overhead and improve system efficiency while maintaining associated security and integrity. In certain embodiments, the response to such assessments may be performed by a security administrator. Accordingly, certain embodiments of the invention may be directed towards assessing the risk associated with the affirmative resolution of the identity of an entity at a particular point in time in combination with its behavior and associated contextual information, such as human factors 430 information, described in greater detail herein. Consequently, the EBC system 120 may be more oriented in various embodiments to risk adaptation than to security administration.

In certain embodiments, an EBP 420 may be implemented to include a user entity profile 422, a non-user entity profile 440, a data entity profile 450, one or more entity risk scores 460, one or more entity states 462, and one or more entity behavior models 464, or a combination thereof. In various embodiments, the user entity profile 422 may include user profile attributes 604, user behavior factors 610, user mindset factors 622, certain human factors 430, and a user entity mindset profile 632, or a combination thereof. In various embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities.

In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs). In certain embodiments, the SPI may include information considered by an individual user, a group of users, or an organization (e.g., a company, a government or non-government organization, etc.), to be confidential or proprietary.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In various embodiments, the EBC system 120 may be implemented to use certain human factors 430, described in greater detail herein, in combination with other information contained in the user entity profile 422, and a particular entity state 462, described in greater detail herein, to generate an associated user entity mindset profile 632. As used herein, a user entity mindset profile 632 broadly refers to a collection of information that reflects an inferred mental state of a user entity at a particular time during the occurrence of an event, an enactment of an associated user entity behavior, or a combination of the two. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular user entity.

In certain embodiments, observed user entity behaviors may be used to build a user entity profile 422 for a particular user entity. In addition to creating a model of a user entity's various attributes and observed behaviors, these observations can likewise be used to infer things that are not necessarily explicit. Accordingly, in certain embodiments, observed user entity behaviors may be used in combination with an EBP 420 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry that afternoon.

In various embodiments, the non-user entity profile 440 may be implemented to include certain non-user entity profile attributes 642. As used herein, a non-user profile attribute 642 broadly refers to data or metadata that can be used, individually or in combination with other non-user entity profile attributes 642, to ascertain the identity of a non-user entity. In various embodiments, certain non-user entity profile attributes 642 may be uniquely associated with a particular non-user entity, described in greater detail herein.

In certain embodiments, the non-user profile attributes 642 may be implemented to include certain identity information, such as a non-user entity's associated network, Media Access Control (MAC), physical address, serial number, associated configuration information, and so forth. In various embodiments, the non-user profile attributes 642 may be implemented to include non-user entity behavior information associated with interactions between certain user entities, non-user entities, and data entities, the type of those interactions, the data exchanged during the interactions, the date/time/frequency of such interactions, and certain services accessed or provided.

In various embodiments, the data entity profile 450 may be implemented to include certain data profile attributes 652. As used herein, a data profile attribute broadly refers to data or metadata that can be used, individually or in combination with other data profile attributes 652, to ascertain the identity of a data entity. In various embodiments, certain data profile attributes 652 may be uniquely associated with a particular data entity, described in greater detail herein.

In certain embodiments, the data profile attributes 652 may be implemented to include certain identity information, such as a file name, a hash value, time and date stamps, size and type of the data (e.g., structured, binary, etc.), a digital watermark familiar to those of skill in the art, and so forth. In various embodiments, the data entity profile attributes 652 may be implemented to include data behavior information associated with entity interactions between the data entity and certain user and non-user entities, the type of those interactions, modifications to data during a particular interaction, and the date/time/frequency of such interactions.

In various embodiments, the EBC system 120 may be implemented to use certain data associated with an EBP 420 to provide a probabilistic measure of whether a particular electronically-observable event is of analytic utility. As used herein, an event of analytic utility broadly refers to any information associated with a particular event deemed to be relevant in the performance of a security analytics operation, described in greater detail herein. In certain embodiments, an electronically-observable event that is of analytic utility may be determined to be anomalous, abnormal, unexpected, or suspicious. In certain embodiments, an electronically-observable event determined to be anomalous, abnormal, unexpected, or suspicious may be associated with an operation performed by a particular entity that is likewise considered to be concerning, as described in greater detail herein.

To continue the prior example, a user may typically work out of their company's corporate office on Fridays. Furthermore, various user mindset factors 622 within their associated user entity profile 422 may indicate that the user is typically relaxed and methodical when working with customer data. Moreover, the user's associated user entity profile 422 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 462 of dealing with customer data in general. More particularly, downloading customer data late at night on a day the user is generally not in their primary office results in an entity state 462 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 420 may have a direct bearing on its analytic utility when attempting to determine the trustworthiness of an associated entity and whether or not they represent a security risk. As used herein, the quantity of information contained in a particular EBP 420 broadly refers to the variety and volume of EBP elements it may contain, and the frequency of their respective instances, or occurrences, related to certain aspects of an associated entity's identity and behavior. As likewise used herein, information of analytic utility contained in an EBP 420 broadly refers to any information deemed to be relevant in the performance of a security analytics operation, described in greater detail herein. Likewise, as used herein, an EBP element broadly refers to any data element stored in an EBP 420, as described in greater detail herein. In various embodiments, an EBP element may be used to describe a particular aspect of an EBP, such as certain user profile attributes 604, user behavior factors 610, user mindset factors 622, user entity mindset profile 632, non-user entity profile attributes 642, data entity profile attributes 652, an entity risk score 460, an entity state 462, and an entity behavior model 464.

In certain embodiments, statistical analysis may be performed on the information contained in a particular EBP 420 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 420 broadly refers to the pertinence of the EBP elements it may contain to certain aspects of an associated entity's identity and behavior. To continue the prior example, an EBP 420 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 420 is of sufficient quantity and relevancy is a matter of design choice.

Various embodiments of the invention likewise reflect an appreciation that accumulating sufficient information in an EBP 420 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 420 may result in exposure to certain security vulnerabilities.

In certain embodiments, the human factors framework 122 may be implemented to perform a human factors risk operation, likewise described in greater detail herein. In various embodiments, as likewise described in greater detail herein, the human factors framework 122 may be implemented to use certain event information stored in the repositories of event 530, EBC 540, security analytics 550, and security risk scoring 560 data, or a combination thereof, to perform the human factors risk operation. In certain embodiments, the human factors risk operation may be performed to assess the risk of an event associated with a particular user entity.

FIG. 7 is a simplified Venn diagram showing entity interactions implemented in accordance with an embodiment of the invention between a user entity, a non-user entity, and a data entity. As shown in FIG. 7, entity interactions 702, described in greater detail herein, may occur in certain embodiments between a user entity 704, a non-user entity 706, or a data entity 708. Likewise, entity interactions 702 may respectively occur in certain embodiments between a user entity 704, a non-user entity 706, or a data entity 708 and other user entities 714, other non-user entities 716, or other data entities 718. Skilled practitioners of the art will recognize that many such examples of entity interactions 702 are possible. Accordingly, the foregoing is not intended to limit the spirit, scope, or intent of the invention.

FIG. 8 shows the enactment of entity interactions implemented in accordance with embodiment of the invention between user entities, non-user entities, and data entities. In various embodiments, a user entity-to-user entity 820 interaction may occur between a first user entity, such as user entity 'A' 810, and a second user entity, such as user entity 13' 812. In various embodiments, a user entity-to-non-user entity 830 interaction may occur between a user entity, such as user entity 'A' 810 and certain non-user entities 804, described in greater detail herein. In various embodiments, a user entity-to-data entity 840 interaction may occur between a user entity, such as user entity 'A' 810, and certain data entities 806. In various embodiments, a non-user entity-to-data entity 850 interaction may occur between certain non-user entities 804 and certain data entities 806.

In various embodiments, certain information associated with user entity-to-user entity 820, user entity-to-non-user entity 830, and user entity-to-data entity 840 interactions may be stored within a user entity profile 420, described in greater detail herein. In various embodiments, such information stored in the user entity profile 422 may include certain attribute 422, behavior 426, and inference 430, or a combination thereof, as likewise described in greater detail herein. Those of skill in the art will recognize that many such embodiments are possible. Accordingly, the foregoing is not intended to limit the spirit, scope, or intent of the invention.

Figure 9A:
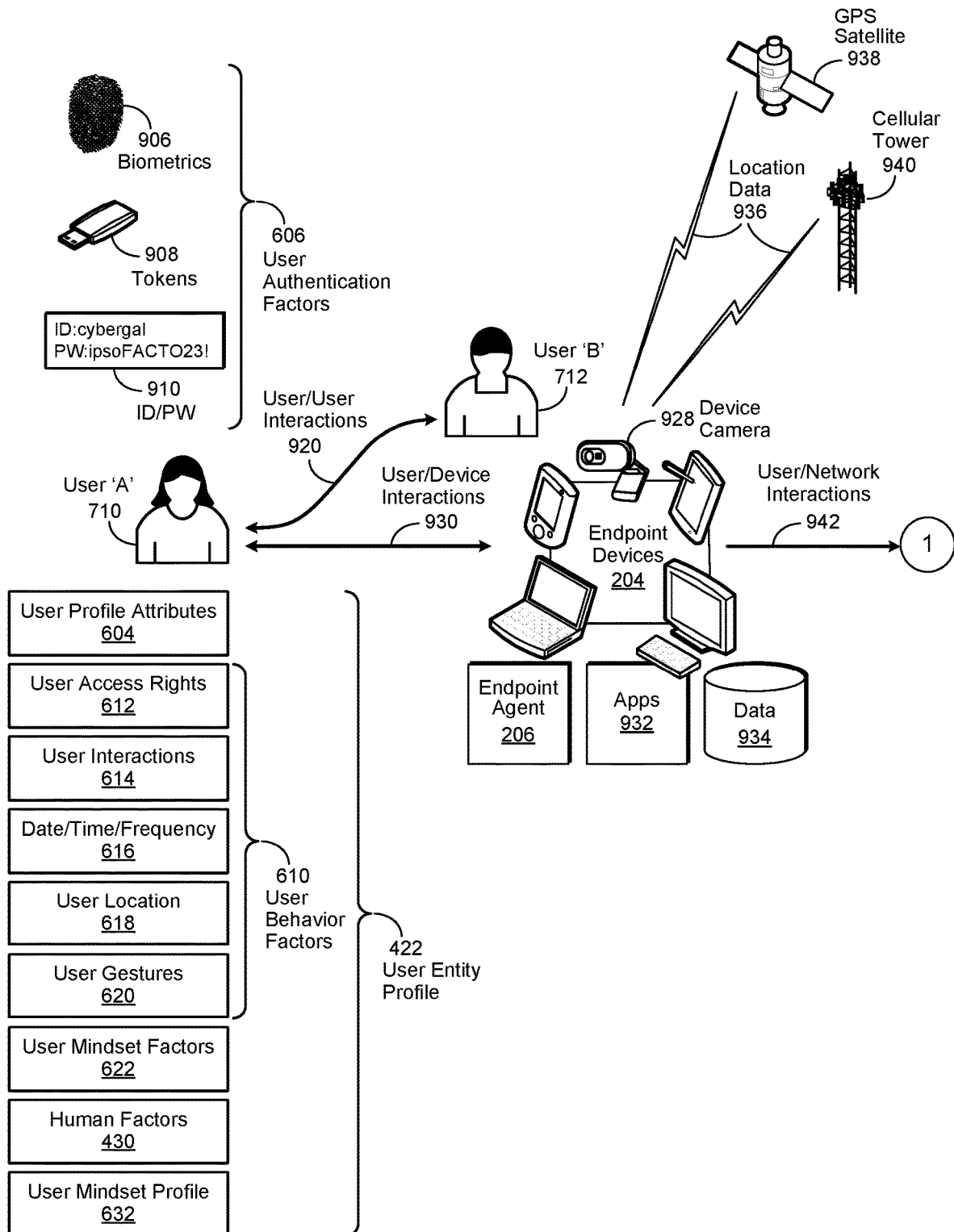
FIGS. 9a and 9b are a simplified block diagram of a security analytics environment.
Figure 9B:
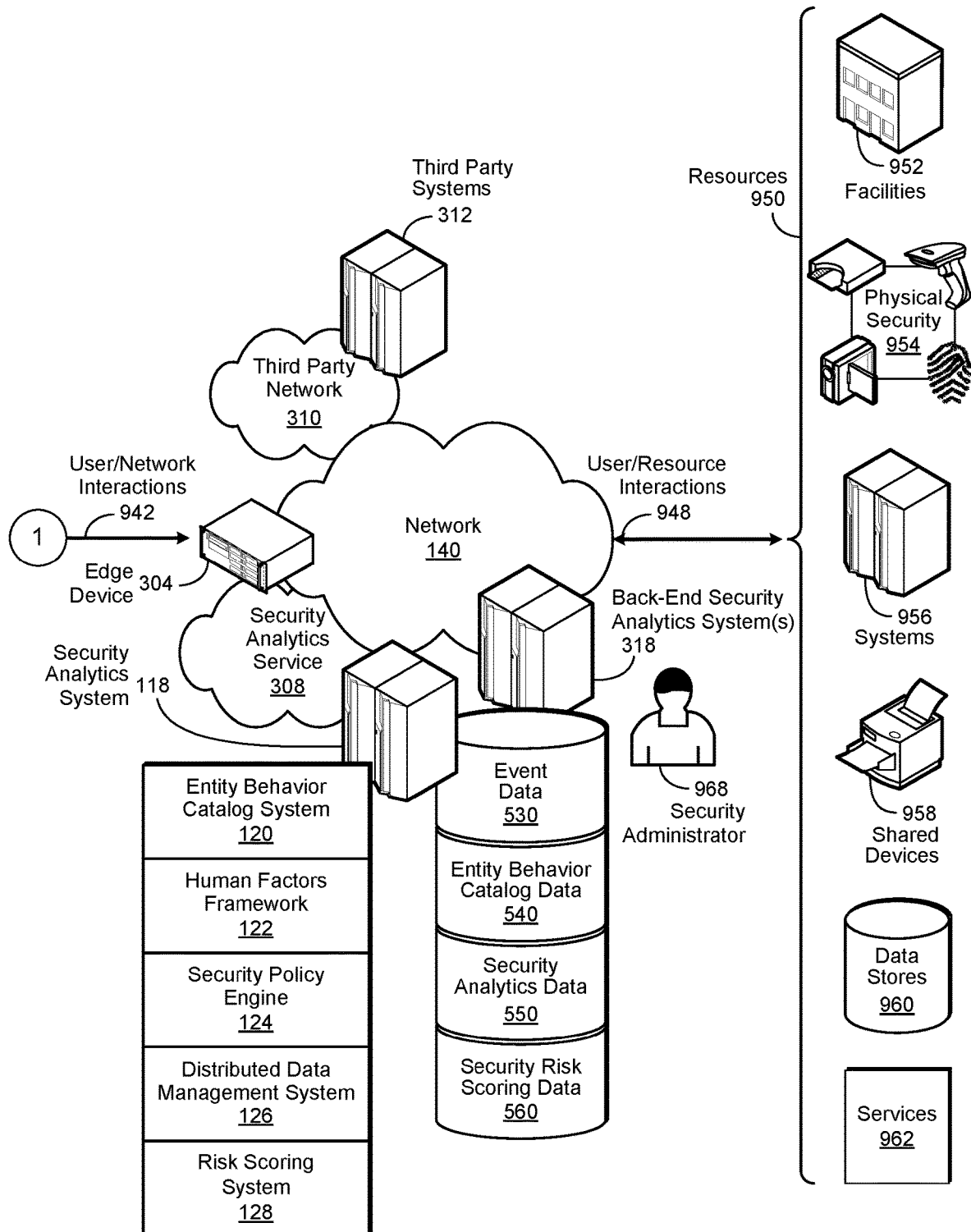

FIGS. 9*a* and 9*b* show a block diagram of a security analytics environment implemented in accordance with an embodiment of the invention. In certain embodiments, a security analytics system 118 may be implemented with an entity behavior catalog (EBC) system 120, a human factors framework 122, a security policy engine 124, a distributed data management system 126, and a security risk scoring system 128, or a combination thereof. In certain embodiments, analyses performed by the security analytics system 118 may be used to identify behavior associated with a particular entity that may be of analytic utility.

In certain embodiments, as likewise described in greater detail herein, the EBC system 120, the human factors framework 122, the security policy engine 124, the distributed data management system 126, and the security risk scoring system 128, or a combination thereof, may be used in combination with the security analytics system 118 to perform such analyses. In various embodiments, certain data stored in repositories of event 530, EBC catalog 540, security analytics 550, and security risk scoring 560 data, or a combination thereof, may be used by the security analytics system 118 to perform the analyses. As likewise described in greater detail herein, the security analytics system 118, the EBC system 120, the human factors framework 122, the security policy engine 124, the distributed data management system 126, and the security risk scoring system 128, or a combination thereof, may be used in combination with one another in certain embodiments to perform a security analytics operation, described in greater detail herein. Likewise, certain data stored in the repositories of event 530, EBC catalog 540, security analytics 550, and security risk scoring 560 data, or a combination thereof, may be used in various embodiments to perform the security analytics operation.

In certain embodiments, a user entity may be an individual user, such as user 'A' 710 or 'B' 712, a group, an organization, or a government. In certain embodiments, a non-user entity may likewise be an item, or a device, such as endpoint 204 and edge 304 devices, or a network, such as a network 140 or third party network 310. In certain embodiments, a non-user entity may be a resource 950, such as a geographical location or formation, a physical facility 952, such as a venue, various physical security devices 954, a system 956, shared devices 958, such as printer, scanner, or copier, a data store 960, or a service 962, such as a service 962 operating in a cloud environment. In various embodiments, the data entity may be certain data 934 stored on an endpoint device 204, such as a data element, a data file, or a data store known to those of skill in the art.

In various embodiments, certain user authentication factors 606 may be used to authenticate the identity of a user entity. In certain embodiments, the user authentication factors 606 may be used to ensure that a particular user entity, such as user 'A' 710 or 'B' 712, is associated with their corresponding user entity profile 422, rather than a user entity profile 422 associated with another user. In certain embodiments, the user authentication factors 606 may include a user's biometrics 906 (e.g., a fingerprint or retinal scan), tokens 908 (e.g., a dongle containing cryptographic keys), user identifiers and passwords (ID/PW) 910, and personal identification numbers (PINs).

In certain embodiments, information associated with such user entity behavior may be stored in a user entity profile 422, described in greater detail herein. In certain embodiments, the user entity profile 422 may be stored in a repository of entity behavior catalog (EBC) data 440. In various embodiments, as likewise described in greater detail herein, the user entity profile 422 may include user profile attributes 604, user behavior factors 610, user mindset factors 622, certain human factors 430, and a user mindset profile 632, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various entity behaviors have been enacted.

As likewise used herein, societal time broadly refers to the correlation of certain user profile attributes 604, user behavior factors 610, user mindset factors 622, or a combination thereof, to one or more instants in time. As an example, user 'A' 710 may access a particular system 956 to download a customer list at 3:47 PM on Nov. 3, 2017. Analysis of their entity behavior profile indicates that it is not unusual for user 'A' 710 to download the customer list on a weekly basis. However, examination of their user behavior profile also indicates that user 'A' 710 forwarded the downloaded customer list in an email message to user 'B' 712 at 3:49 PM that same day. Furthermore, there is no record in their associated entity behavior profile that user 'A' 710 has ever communicated with user 'B' 712 in the past. Moreover, it may be determined that user 'B' 712 is employed by a competitor. Accordingly, the correlation of user 'A' 710 downloading the customer list at one point in time, and then forwarding the customer list to user 'B' 712 at a second point in time shortly thereafter, is an example of societal time.

In a variation of the prior example, user 'A' 710 may download the customer list at 3:47 PM on Nov. 3, 2017. However, instead of immediately forwarding the customer list to user 'B' 712, user 'A' 710 leaves for a two week vacation. Upon their return, they forward the previously-downloaded customer list to user 'B' 712 at 9:14 AM on Nov. 20, 2017. From an ontological time perspective, it has been two weeks since user 'A' 710 accessed the system 956 to download the customer list. However, from a societal time perspective, they have still forwarded the customer list to user 'B' 712, despite two weeks having elapsed since the customer list was originally downloaded.

Accordingly, the correlation of user 'A' 710 downloading the customer list at one point in time, and then forwarding the customer list to user 'B' 712 at a much later point in time, is another example of societal time. More particularly, it may be inferred that the intent of user 'A' 710 did not change during the two weeks they were on vacation. Furthermore, user 'A' 710 may have attempted to mask an intended malicious act by letting some period of time elapse between the time they originally downloaded the customer list and when they eventually forwarded it to user 'B' 712. From the foregoing, those of skill in the art will recognize that the use of societal time may be advantageous in determining whether a particular entity behavior is of analytic utility. As used herein, mindset factors 622 broadly refer to information used to infer the mental state of a user entity at a particular point in time, during the occurrence of an event, an enactment of a user entity behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular action, or operation, in a physical realm, cyberspace, or a combination thereof. In certain embodiments, such entity behavior elements may be associated with a user/device 930, a user/network 942, a user/resource 948, a user/user 920 interaction, or a combination thereof. In certain embodiments, a user/device 930, user/network 942, and user/resource 948 interactions are all examples of a user entity-to-non-user entity interaction, described in greater detail herein. In certain embodiments, a user/user 920 interaction is one example of a user entity-to-user entity interaction, likewise described in greater detail herein.

As an example, user 'A' 710 may use an endpoint device 204 to browse a particular web page on a news site on an external system 976. In this example, the individual actions performed by user 'A' 710 to access the web page are entity behavior elements that constitute an entity behavior, described in greater detail herein. As another example, user 'A' 710 may use an endpoint device 204 to download a data file from a particular system 956. In this example, the individual actions performed by user 'A' 710 to download the data file, including the use of one or more user authentication factors 606 for user authentication, are entity behavior elements that constitute an entity behavior. In certain embodiments, the user/device 930 interactions may include an interaction between a user, such as user 'A' 710 or 'B' 712, and an endpoint device 204.

In certain embodiments, the user/device 930 interaction may include interaction with an endpoint device 204 that is not connected to a network at the time the interaction occurs. As an example, user 'A' 710 or 'B' 712 may interact with an endpoint device 204 that is offline, using applications 932, accessing data 934, or a combination thereof, it may contain. Those user/device 930 interactions, or their result, may be stored on the endpoint device 204 and then be accessed or retrieved at a later time once the endpoint device 204 is connected to the network 140 or third party networks 310. In certain embodiments, an endpoint agent 206 may be implemented to store the user/device 930 interactions when the user device 204 is offline.

In certain embodiments, an endpoint device 24 may be implemented with a device camera 928. In certain embodiments, the device camera 928 may be integrated into the endpoint device 204. In certain embodiments, the device camera 928 may be implemented as a separate device configured to interoperate with the endpoint device 204. As an example, a webcam familiar to those of skill in the art may be implemented receive and communicate various image and audio signals to an endpoint device 204 via a Universal Serial Bus (USB) interface.

In certain embodiments, the device camera 928 may be implemented to capture and provide user/device 930 interaction information to an endpoint agent 206. In various embodiments, the device camera 928 may be implemented to provide surveillance information related to certain user/device 930 or user/user 920 interactions. In certain embodiments, the surveillance information may be used by the security analytics system 118 to detect entity behavior associated with a user entity, such as user 'A' 710 or user 'B' 712, that may be of analytic utility.

In certain embodiments, the endpoint device 204 may be used to communicate data through the use of a network 140, or a third party network 310, or a combination thereof. In certain embodiments, the network 140 and the third party networks 310 may respectively include a public network, such as the Internet, a physical private network, a virtual private network (VPN), or any combination thereof. In certain embodiments, the network 140 and third party networks 310 may likewise include a wireless network, including a personal area network (PAN), based upon technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G, and 5G technologies.

In certain embodiments, the user/user 920 interactions may include interactions between two or more user entities, such as user 'A' 710 and 'B' 712. In certain embodiments, the user/user interactions 920 may be physical, such as a face-to-face meeting, via a user/device 930 interaction, a user/network 942 interaction, a user/resource 948 interaction, or some combination thereof. In certain embodiments, the user/user 920 interaction may include a face-to-face verbal exchange. In certain embodiments, the user/user 920 interaction may include a written exchange, such as text written on a sheet of paper. In certain embodiments, the user/user 920 interaction may include a face-to-face exchange of gestures, such as a sign language exchange.

In certain embodiments, temporal event information associated with various user/device 930, user/network 942, user/resource 948, or user/user 920 interactions may be collected and used to provide real-time resolution of the identity of an entity at a particular point in time. Those of skill in the art will recognize that many such examples of user/device 930, user/network 942, user/resource 948, and user/user 920 interactions are possible. Accordingly, the foregoing is not intended to limit the spirit, scope or intent of the invention.

In various embodiments, the security analytics system 118 may be implemented to process certain contextual information in the performance of a particular security analytic operation. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 204 or edge 304 device, a physical security device 954, a system 956, a shared device 958, etc.), computer instructions (e.g., a software application), or a combination thereof.

In certain embodiments, the contextual information may include location data 936. In certain embodiments, the endpoint device 204 may be configured to receive such location data 936, which is used as a data source for determining the user's location 618. In certain embodiments, the location data 936 may include Global Positioning System (GPS) data provided by a GPS satellite 938. In certain embodiments, the location data 936 may include location data 936 provided by a wireless network, such as from a cellular network tower 940. In certain embodiments (not shown), the location data 936 may include various Internet Protocol (IP) or other network address information assigned to the endpoint 204 or edge 304 device. In certain embodiments (also not shown), the location data 936 may include recognizable structures or physical addresses within a digital image or video recording.

In certain embodiments, the endpoint devices 204 may include an input device (not shown), such as a keypad, magnetic card reader, token interface, biometric sensor, and so forth. In certain embodiments, such endpoint devices 204 may be directly, or indirectly, connected to a particular facility 952, physical security device 954, system 956, or shared device 958. As an example, the endpoint device 204 may be directly connected to an ingress/egress system, such as an electronic lock on a door or an access gate of a parking garage. As another example, the endpoint device 204 may be indirectly connected to a physical security device 954 through a dedicated security network (not shown).

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring individual entity behaviors, assess the corresponding risk they may represent, individually or in combination, and respond with an associated response. In certain embodiments, such responses may be based upon contextual information, described in greater detail herein, associated with a particular entity behavior.

In certain embodiments, certain information associated with a user entity profile 420, likewise described in greater detail herein, may be used to perform the risk-adaptive protection operations. In certain embodiments, the user entity profile 422 may include user profile attributes 604, user behavior factors 610, user mindset factors 622, or a combination thereof. In these embodiments, the information associated with a user entity profile 422 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 308. In certain embodiments, the security analytics service 308 may be implemented in a cloud environment familiar to those of skill in the art. In various embodiments, the security analytics system 118 may use data stored in a repository of event 430, entity behavior catalog 440, security analytics 450, or security risk 460 data, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 10:
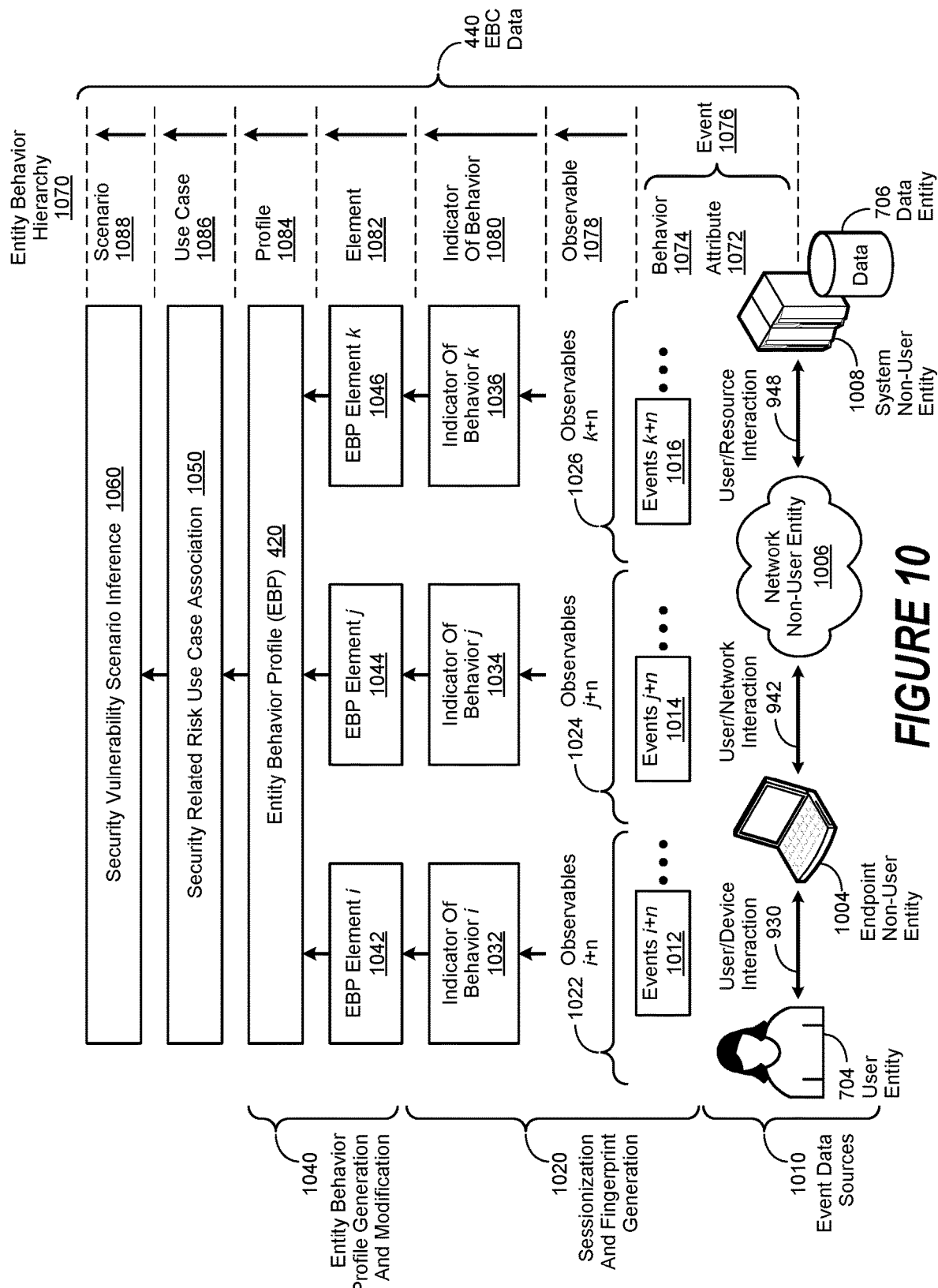
FIG. 10 is a simplified block diagram showing the mapping of an event to a security vulnerability scenario.

FIG. 10 is a simplified block diagram showing the mapping of an event to a security vulnerability scenario implemented in accordance with an embodiment of the invention. In certain embodiments, an entity behavior catalog (EBC) system may be implemented to identify an indicator of behavior (IOB), described in greater detail herein. In certain embodiments, the IOB may be based upon one or more observables, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 1010 shown in FIG. 10.

In certain embodiments, as likewise described in greater detail herein, the EBC system may be implemented to identify a particular event of analytic utility by analyzing an associated IOB. In certain embodiments, the EBC system may be implemented to generate entity behavior catalog data based upon an identified event of analytic utility associated with a particular JOB. In various embodiments, the EBC system may be implemented to associate certain entity behavior data it may generate with a predetermined abstraction level, described in greater detail herein.

In various embodiments, the EBC system 120 may be implemented to use certain EBC data and an associated abstraction level to generate a hierarchical set of entity behaviors 1070, described in greater detail herein. In certain embodiments, the hierarchical set of entity behaviors 1070 generated by the EBC system may represent an associated security risk, likewise described in greater detail herein. Likewise, as described in greater detail herein, the EBC system may be implemented in certain embodiments to store the hierarchical set of entity behaviors 1070 and associated abstraction level information within a repository of EBC data. In certain embodiments, the repository of EBC data 440 may be implemented to provide an inventory of entity behaviors for use when performing a security operation, likewise described in greater detail herein.

Referring now to FIG. 10, the EBC system may be implemented in various embodiments to receive certain event information, described in greater detail herein, corresponding to an event associated with an entity interaction, likewise described in greater detail herein. As used herein, event information broadly refers to any information directly or indirectly related to an event, described in greater detail herein.

In certain embodiments, information associated with an entity attribute, likewise described in greater detail herein, and an entity behavior may be respectively abstracted to an entity attribute 1072 and an entity behavior 1074 abstraction level. In certain embodiments, an entity attribute 1072 and an entity behavior 1074 abstraction level may then be associated with an event 1076 abstraction level. In certain embodiments, the entity attribute 1072, entity behavior 1074, and event 1076 abstraction levels may in turn be associated with a corresponding entity behavior hierarchy 1070, as described in greater detail herein.

In various embodiments, the event information may be received from certain event data sources 1010, such as a user 704 entity, an endpoint 1004 non-user entity, a network 1006 non-user entity, a system 1008 non-user entity, or a data 708 entity. In certain embodiments, one or more events may be associated with a particular entity interaction. As an example, as shown in FIG. 10, one or more events i+n 1012 may be associated with a user/device 930 interaction between a user 704 entity and an endpoint 1004 non-user entity. Likewise, one or more events j+n 1014 may be associated with a user/network 942 interaction between a user 704 entity and a network 1006 non-user entity. As likewise shown in FIG. 10, one or more events k+n 1016 may be associated with a user/resource 948 interaction between a user 704 entity and a system 1008 non-user entity, or a data 708 entity, or a combination of the two.

In certain embodiments, details of an event, such as events i+n 1012, j+n 1014, and k+n 1016, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable.

As an example, the details contained in the event information respectively corresponding to events i+n 1012, j+n 1014, and k+n 1016 may be used to derive observables i+n 1022, j+n 1024, and k+n 1026. In certain embodiments, the resulting observables i+n 1022, j+n 1024, and k+n 1026 may then be respectively associated with a corresponding observable 1078 abstraction level. In certain embodiments, the observable 1078 abstraction level may in turn be associated with a corresponding entity behavior hierarchy 1070, as described in greater detail herein.

In certain embodiments, the resulting observables may in turn be processed to generate an associated IOB. For example, observables i+n 1022, j+n 1024, and k+n 1026 may in turn be processed to generate corresponding IOBs i 1032, j 1034, and k 1036. In certain embodiments, the resulting IOBs, i 1032, j 1034, and k 1036 may then be respectively associated with a corresponding IOB 1080 abstraction level. In certain embodiments, the IOB 1080 abstraction level may in turn be associated with a corresponding entity behavior hierarchy 1070, as described in greater detail herein.

In various embodiments, sessionization and fingerprint generation operations 1020, described in greater detail herein, may be performed to associate certain events, observables, and security related activities, or a combination thereof, with a corresponding session, likewise described in greater detail herein. As an example, events i+n 1012, j+n 1014, k+n 1016, observables i+n 1022, j+n 1024, k+n 1026, and IOBs 1032, j 1034, k 1036 may be associated with corresponding sessions. In certain embodiments, an IOB may be processed with associated contextual information, described in greater detail herein, to generate a corresponding EBP element.

For example, IOBs i 1032, j 1034, and k 1036 may be processed with associated contextual information to generate corresponding EBP elements i 1042, j 1044, and k 1046. In various embodiments, the resulting EBP elements i 1042, j 1044, and k 1046 may then be associated with a corresponding EBP element 1082 abstraction level. In certain embodiments, the EBP element 1082 abstraction level may in turn be associated with a corresponding entity behavior hierarchy 1070, as described in greater detail herein.

In certain embodiments, EBP generation and management 1040 operations may be performed to associate one or more EBP elements with a particular EBP 540. As an example, EBP elements i 1042, j 1044, and k 1046 may be associated with a particular EBP 420, which may likewise be respectively associated with the various entities involved in the user/device 930, user/network 942, or user/resource 948 interactions. In these embodiments, the method by which the resulting EBP elements i 1042, j 1044, and k 1046 are associated with a particular EBP 420 is a matter of design choice. In certain embodiments, the EBP 420 may likewise associated with an EBP 1084 abstraction level. In certain embodiments, the EBP 1084 abstraction level may in turn be associated with a corresponding entity behavior hierarchy 1070, as described in greater detail herein.

In various embodiments, the resulting EBP 420 may be used in the performance of security risk use case association 1050 operations to identify one or more security risk use cases that match certain entity behavior information stored in the EBP 540. In certain of these embodiments, the entity behavior information may be stored within the EBP 420 in the form of an EBP element. In certain embodiments, identified security risk use cases may then be associated with a security risk use case 1086 abstraction level. In certain embodiments, the security risk use case 1086 abstraction level may in turn be associated with a corresponding entity behavior hierarchy 1070, as described in greater detail herein.

In certain embodiments, the results of the security risk use case association 1050 operations may in turn be used to perform security vulnerability scenario inference 1060 operations to associate one or more security risk use cases with one or more security vulnerability scenarios, described in greater detail herein. In certain embodiments, the associated security vulnerability scenarios may then be associated with a security vulnerability scenario 1088 abstraction level. In certain embodiments, the security vulnerability scenario 1088 abstraction level may in turn be associated with a corresponding entity behavior hierarchy 1070, as described in greater detail herein.

In various embodiments, certain event information associated with events i+n 1012, j+n 1014, and k+n 1016 and certain observable information associated with observables i+n 1022, j+n 1024, and k+n 1026 may be stored in a repository of EBC data. In various embodiments, certain IOB information associated with security related activities i 1032, j 1034, and k 1036 and EBP elements i 1042, j 1044, and k 1046 may likewise be stored in the repository of EBC data. Likewise, in various embodiments, certain security risk use case association and security vulnerability scenario association information respectively associated with the performance of security risk use case association 1050 and security vulnerability scenario inference 1060 operations may be stored in the repository of EBC data.

Figure 11:
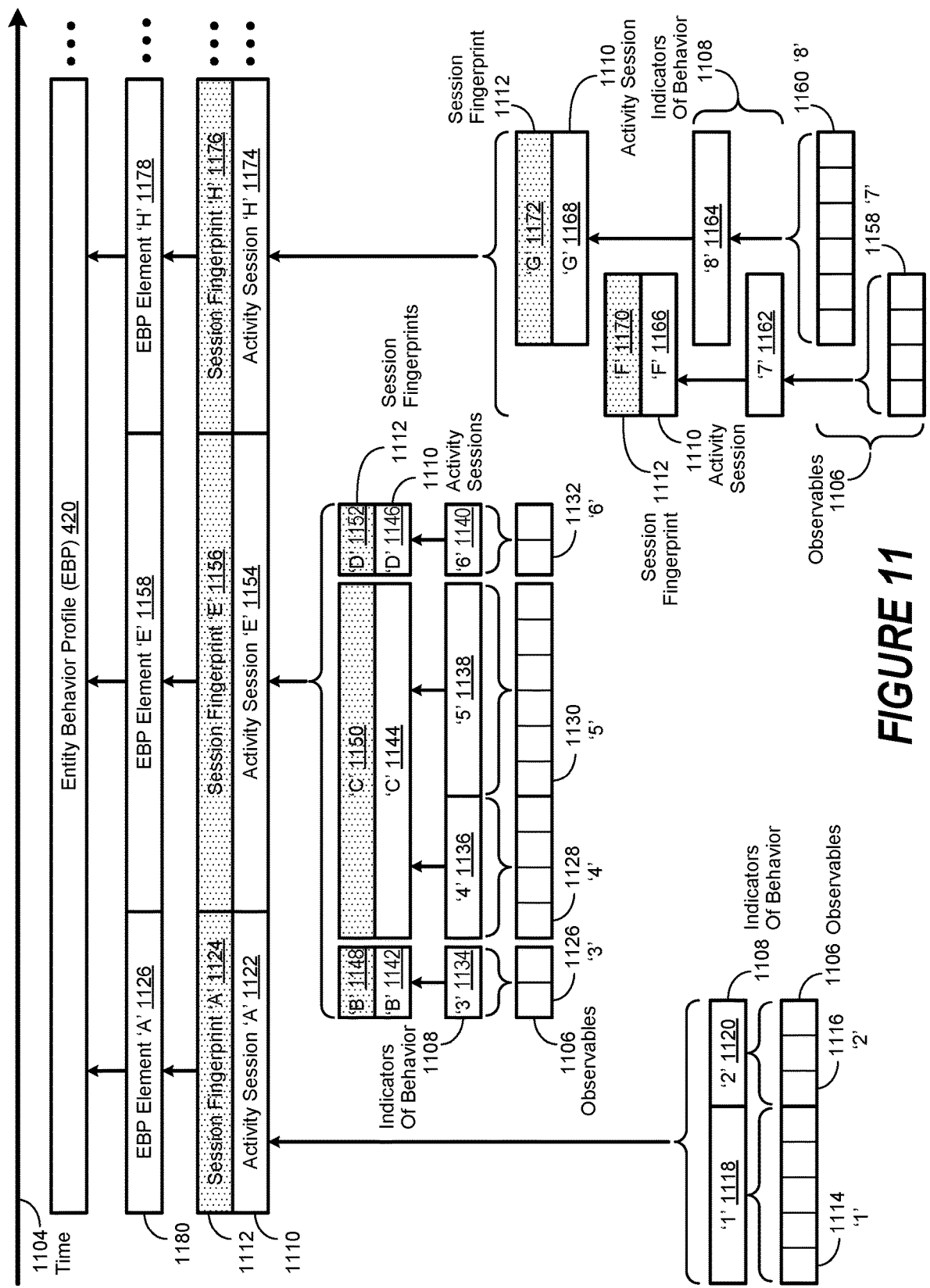
FIG. 11 is a simplified block diagram of the generation of a session and a corresponding session-based fingerprint.

FIG. 11 is a simplified block diagram of the generation of a session and a corresponding session-based fingerprint implemented in accordance with an embodiment of the invention. In certain embodiments, an observable 1106 may be derived from an associated event, as described in greater detail herein. In certain embodiments, one or more observables 11026 may be processed to generate a corresponding indicator of behavior (IOB) 1108, as likewise described in greater detail herein.

In certain embodiments, one or more IOBs 1108 may then be respectively processed to generate a corresponding activity session 1110. In turn, the session 1110 may be processed in certain embodiments to generate a corresponding session fingerprint 1112. In certain embodiments, the resulting activity session 910 and its corresponding session fingerprint 1112, individually or in combination, may then be associated with a particular entity behavior profile (EBP) element 1180. In certain embodiments the EBP element 1180 may in turn be associated with an EBP 420.

In certain embodiments, intervals in time 1104 respectively associated with various IOBs 1108 may be contiguous. For example, as shown in FIG. 11, the intervals in time 1104 associated with observables 1106 '1' 1114 and '2' 1116 may be contiguous. Accordingly, the intervals in time 1104 associated with IOBs 1108 '1' 1118 and '2' 1120 respectively generated from observables 1106 '1' 1114 and '2' 1116 would likewise be contiguous.

As likewise shown in FIG. 11, the resulting IOBs 1108 '1' 1118 and '2' 1120 may be processed to generate an associated activity session 'A' 1122, which then may be processed to generate a corresponding session fingerprint 'A' 1124. In certain embodiments, activity session 'A' 1122 and its corresponding session fingerprint 'A' 1124 may be used to generate a new entity behavior profile (EBP) element 1180 'A' 1126. In certain embodiments, EBP element 1180 'A' 1126 generated from activity session 1110 'A' 1122 and its corresponding session fingerprint 1112 'A' 1125 may be associated with an existing EBP 420.

To provide an example, a user may enact various observables 1106 '1' 1114 to update sales forecast files, followed by the enactment of various observables 1106 '2' 1116 to attach the updated sales forecast files to an email, which is then sent to various co-workers. In this example, the enactment of observables 1106 '1' 1114 and '2' 1116 result in the generation of IOBs 1108 '1' 1118 and '2' 1120, which in turn are used to generate activity session 1110 'A' 1122. In turn, the resulting activity session 1110 'A' 1122 is then used to generate its corresponding session-based fingerprint 1112 'A' 1124. To continue the example, activity session 1110 'A' 1122 is associated with security related activities 1108 '1' 1118 and '2' 1120, whose associated intervals in time 1104 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 1110 associated with such a recurring activity may result in a substantively similar session fingerprint 1112 week-by-week. However, a session fingerprint 1112 for the same session 1110 may be substantively different should the user happen to send an email with an attached sales forecast file to a recipient outside of their organization. Consequently, a session fingerprint 1112 that is inconsistent with session fingerprints 1112 associated with past activity sessions 1110 may indicate anomalous, abnormal, unexpected or suspicious behavior.

In certain embodiments, two or more activity sessions 1110 may be noncontiguous, but associated. In certain embodiments, an activity session 1110 may be associated with two or more sessions 1110. In certain embodiments, an activity session 1110 may be a subset of another activity session 1110. As an example, as shown in FIG. 11, the intervals in time 1104 respectively associated with observables 1106 '3' 1114 and '6' 1132 may be contiguous. Likewise, the intervals in time 1104 associated with observables 1106 '4' 1136 and '5' 1138 may be contiguous.

Accordingly, the intervals in time 904 associated with the IOBs 1108 '4' 1136 and '5' 1138 respectively generated from observables 1106 '4' 1128 and '5' 1130 would likewise be contiguous. However, the intervals in time 1104 associated with IOBs 1108 '4' 1136 and '5' 1138 would not be contiguous with the intervals in time respectively associated with IOBs 1108 '3' 1134 and '6' 1140.

As likewise shown in FIG. 11, the resulting IOBs 1108 '3' 1134 and '6' 1140 may be respectively processed to generate corresponding sessions 'B' 1142 and 'D' 1146, while IOBs 1108 '4' 1136 and '5' 1138 may be processed to generate activity session 1110 'C' 1144. In turn, activity sessions 1110 'B' 1142, 'C' 144, and 'D' 1146 are then respectively processed to generate corresponding session-based fingerprints 1112 'B' 1148, 'C' 1150 and 13' 1152.

Accordingly, the intervals of time 1104 respectively associated with activity sessions 1110 'B' 1142, 'C' 1144, and 'D' 1146, and their corresponding session fingerprints 1112 'B' 1148, 'C' 1150 and 'D' 1152, are not contiguous. Furthermore, in this example activity sessions 1110 'B' 1142, 'C' 1144, and 'D' 1146, and their corresponding session fingerprints 1112 'B' 1148, 'C' 1150 and 'D' 1152, are not associated with the EBP 420. Instead, as shown in FIG. 11, activity sessions 1110 'B' 1142, 'C' 1144, and 'D' 1146 are processed to generate activity session 1110 'E' 1154 and session fingerprints 1112 'B' 1148, 'C' 1150 and 'D' 1152 are processed to generate session fingerprint 1112 'E' 1156. In certain embodiments, activity session 'E' 1154 and its corresponding session fingerprint 'E' 1156 may be used to generate a new EBP element 1180 'E' 1158. In certain embodiments, EBP element 1180 'E' 1158 generated from activity session 1110 'E' 1154 and its corresponding session fingerprint 1112 'E' 1156 may be associated with an existing EBP 420.

Accordingly, activity session 1110 'E' 1154 is associated with activity sessions 1110 'B' 1142, 'C' 1144, and 'D' 1146. Likewise, activity sessions 1110 'B' 1142, 'C' 1144, and 'D' 1146 are subsets of activity session 1110 'E' 1154. Consequently, while the intervals of time respectively associated with activity sessions 1110 'B' 1142, 'C' 1144, and 'D' 1146, and their corresponding session fingerprints 1112 'B' 1148, 'C' 1150 and 'D' 1152 may not be contiguous, they are associated as they are respectively used to generate activity session 1110 'E' 1154 and its corresponding session fingerprint 1112 'E' 1156.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 1106 '3' 1126 may correspond to authenticating themselves with their security badge and gaining access to the facility. As before, observables 1106 '3' 1126 may be used to generate a corresponding IOB 1108 '3' 1134. In turn, the IOB 1108 '3' 1134 may then be used to generate session 1110 'B' 1142, which is likewise used in turn to generate a corresponding session fingerprint 1112 'B' 1148.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 1106 '4' 1128 may be associated with the user downloading and reviewing the project plan and observables 1106 '5' 1130 may be associated with the user making revisions to the project plan and then uploading the revised project plan to a datastore. Accordingly, observables 1106 '4' 1128 and '5' 1130 may be respectively used to generate IOBs 1108 '4' 1136 and '5' 1138. In turn, IOBs 1108 '4' 1136 and '5' 1138 may then be used to generate activity session 1110 'C' 1144, which may likewise be used in turn to generate its corresponding session fingerprint 1112 'C' 1150.

To continue the example, the user may spend the next half hour discussing the revisions to the project plan with a co-worker. Thereafter, the user uses their security badge to exit the facility. In continuance of this example, observable 1106 '6' 1132 may be associated with the user using their security badge to leave the secure facility. Accordingly, observable 1106 '6' 1132 may be used to generate a corresponding IOB 1108 '6' 1140, which in turn may be used to generate a corresponding activity session 1110 'D' 1146, which likewise may be used in turn to generate a corresponding session fingerprint 1112 'D' 1152.

In this example, the intervals of time 1104 respectively associated with activity sessions 1110 'B' 1142, 'C' 1144, and 'D' 1146, and their corresponding session fingerprints 1112 'B' 1148, 'C' 1150, and 'D' 1152, are not contiguous. However they may be considered to be associated as their corresponding observables 1106 '3' 1126, '4' 1128, '5' 1130, and '6' 1132 all have the common attribute of having been enacted within the secure facility. Furthermore, security related activities 1108 '4' 1136 and '5' 1138 may be considered to be associated as their corresponding observables 1106 have the common attribute of being associated with the project plan.

Accordingly, while the intervals of time 1104 respectively associated with activity sessions 1110 'B' 1142, 'C' 1144, and 'D' 1146, and their corresponding session fingerprints 1112 'B' 1148, 'C' 1150, and 'D' 1152, may not be contiguous, they may be considered to be associated. Consequently, activity sessions 1110 'B' 1142, 'C' 1144, and 'D' 1146 may be considered to be a subset of activity session 1110 'E' 1154 and session fingerprints 1112 'B' 1148, 'C' 1150, and 'D' 1152 may be considered to be a subset of session fingerprint 1112 'E' 1156.

In certain embodiments, the interval of time 1104 corresponding to a first activity session 1110 may overlap an interval of time 1104 corresponding to a second activity session 1110. For example, observables 1106 '7' 1158 and '8' 1160 may be respectively processed to generate IOBs 1108 '7' 1162 and '8' 1164. In turn, the resulting IOBs 1108 '7' 1162 and '8' 1164 are respectively processed to generate corresponding activity sessions 1110 'F' 1166 and 'G' 1168. The resulting activity sessions 1110 'F' 1166 and 'G' 1168 are then respectively processed to generate corresponding session fingerprints 1112 'F' 1170 and 'G' 1172.

However, in this example activity sessions 1110 'F' 1166 and 'G' 1168, and their corresponding session fingerprints 1112 'F' 11170 and 'G' 1172, are not associated with the EBP 420. Instead, as shown in FIG. 11, activity sessions 1110 'F' 1166 and 'G' 1168 are processed to generate activity session 1110 'E' 1154 and session fingerprints 1112 'F' 1170 and 'G' 1172 are processed to generate session fingerprint 1112 'H' 1176. In certain embodiments, activity session 'H' 1174 and its corresponding session fingerprint 'H' 1176 may be used to generate a new EBP element 1180 'H' 1178. In certain embodiments, EBP element 1180 'H' 1178 generated from activity session 1110 'E' 1174 and its corresponding session fingerprint 1112 'E' 1176 may be associated with an existing EBP 420.

Accordingly, the time 1104 interval associated with activity session 1110 'F' 1166 and its corresponding session fingerprint 1112 'F' 1170 overlaps with the time interval 1104 associated with activity session 1110 'G' 1168 and its corresponding session fingerprint 1112 'G' 1172. As a result, activity sessions 1110 'F' 1166 and 'G' 1168 are subsets of activity session 1110 'H' 1174. Consequently, while the intervals of time respectively associated with activity sessions 1110 'F' 1166 and 'G' 1168, and their corresponding session fingerprints 1112 'F' 1170 and 'G' 1172 may overlap, they are associated as they are respectively used to generate activity session 1110 'H' 1174 and its corresponding session fingerprint 1112 'H' 1176.

To provide an example, a user may decide to download various images for placement in an online publication. In this example, observables 1106 '7' 1158 may be associated with the user iteratively searching for, and downloading, the images they wish to use in the online publication. However, the user may not begin placing the images into the online publication until they have selected and downloaded the first few images they wish to use.

To continue the example, observables 1106 '8' 1164 may be associated with the user placing the downloaded images in the online publication. Furthermore, the placement of the downloaded images into the online publication may begin a point in time 1104 subsequent to when the user began to download the images. Moreover, the downloading of the images may end at a point in time 1104 sooner than when the user completes the placement of the images in the online publication.

In continuance of the example, observables 1106 '7' 1158 and '8' 1160 may be respectively processed to generate IOBs 1108 '7' 1162 and '8' 1164, whose associated intervals of time 1104 overlap one another. Accordingly, the intervals in time 1104 associated with activity sessions 1110 'F' 1166 and 'G' 1168 will likewise overlap one another as they are respectively generated from IOBs 1108 '7' 1162 and '8' 1164.

Consequently, while the intervals of time 1104 respectively associated with activity sessions 1110 'F' 1166 and 'G' 1168, and their corresponding session fingerprints 1112 'F' 1170 and 'G' 1172, may overlap, they may be considered to be associated as they both relate to the use of images for the online publication. Accordingly, activity sessions 1110 'F' 1166 and 'G' 1168 may be considered to be a subset of activity session 1110 'H' 1174 and session fingerprints 1112 'F' 1170 and 'G' 1172 may be considered to be a subset of session fingerprint 1112 'H' 1176.

Figure 12A:
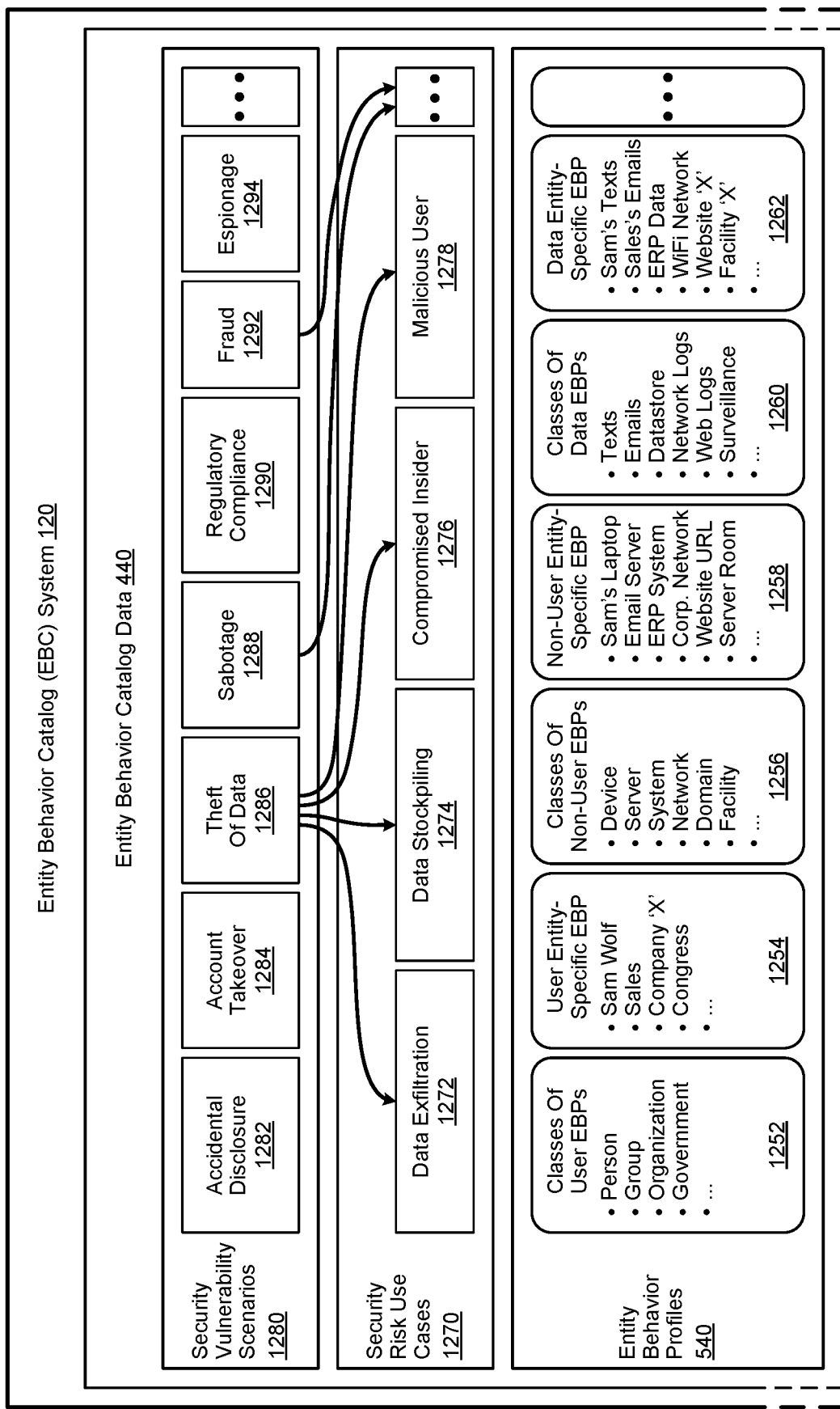
FIGS. 12a and 12b are a simplified block diagram showing reference architecture components of an EBC system.
Figure 12B:
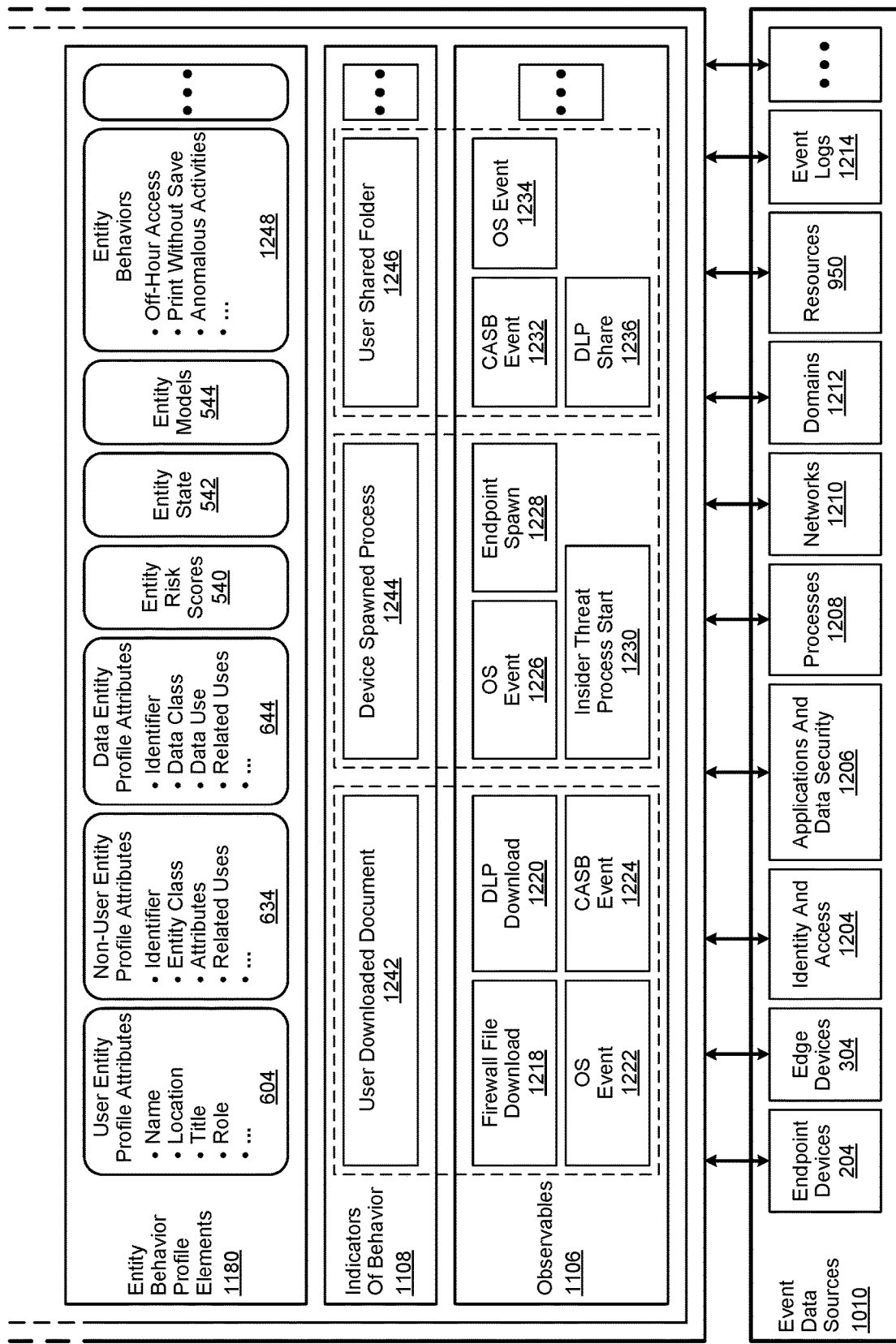

FIGS. 12a and 12b are a simplified block diagram showing reference architecture components of an entity behavior catalog (EBC) system implemented in accordance with an embodiment of the invention for performing certain EBC operations. In various embodiments, the EBC system 120 may be implemented to generate, manage, store, or some combination thereof, information related to the behavior of an associated entity. In certain embodiments, the EBC system 120 may be implemented to provide an inventory of entity behaviors for use when performing a security operation, described in greater detail herein.

In certain embodiments, an EBC system 120 may be implemented to identify an indicator of behavior (IOB), described in greater detail herein. In certain embodiments, the IOB may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 1010 shown in FIGS. 10, 12b, and 13.

In certain embodiments, as likewise described in greater detail herein, the EBC system 120 may be implemented to identify a particular event of analytic utility by analyzing an observable 1106 associated with a particular indicator of behavior (IOB) 1108, described in greater detail herein. In certain embodiments, the EBC system 120 may be implemented to generate entity behavior catalog data based upon an identified event of analytic utility. In certain embodiments, an observable 1106 may be derived, as described in greater detail herein, from an identified event of analytic utility. In various embodiments, the EBC system 120 may be implemented to associate certain entity behavior data it may generate with a predetermined abstraction level, described in greater detail herein.

In various embodiments, the EBC system 120 may be implemented to use certain entity behavior catalog data, and an associated abstraction level, to generate a hierarchical set of entity behaviors, described in greater detail herein. In certain embodiments, the hierarchical set of entity behaviors generated by the EBC system 120 may represent an associated security risk, likewise described in greater detail herein. Likewise, as described in greater detail herein, the EBC system 120 may be implemented in certain embodiments to store the hierarchical set of entity behaviors within a repository of EBC data.

In various embodiments, the EBC system 120 may be implemented to receive certain event information, described in greater detail herein, corresponding to an event associated with an entity interaction, likewise described in greater detail herein. In various embodiments, the event information may be generated by, received from, or a combination thereof, certain event data sources 1010. In certain embodiments, such event data sources 1010 may include endpoint devices 204, edge devices 304, identity and access 1204 systems familiar to those of skill in the art, as well as various software and data security 1206 applications. In various embodiments, event data sources 1010 may likewise include output from certain processes 1208, network 1210 access and traffic logs, domain 1212 registrations and associated entities, certain resources 950, described in greater detail herein, event logs 1214 of all kinds, and so forth.

In certain embodiments, EBC system 120 operations are begun with the receipt of information associated with a particular event. In certain embodiments, information associated with the event may include user entity profile attributes, user behavior factors, user entity mindset factors, entity state information, and contextual information, described in greater detail herein, or a combination thereof. In various embodiments, the event may be associated with certain entity interactions, likewise described in greater detail herein. In various embodiments, certain user entity profile data, user entity mindset profile data, non-user entity profile data, entity state data, contextual information, and temporal information stored in the repository of EBC data may be retrieved and then used to perform event enrichment operations to enrich and contextualize the information associated with the event.

In various embodiments, an observable 1106, described in greater detail herein, may be derived from the resulting enriched, contextualized event. As shown in FIG. 12b, examples of such observables 1106 may include firewall file download 1218, data loss protection (DLP) download 1220, and various operating system (OS) events 1222, 1226, and 1234. As likewise shown in FIG. 12b, other examples of such observables 1106 may include cloud access security broker (CASB) events 1224 and 1232, endpoint spawn 1228, insider threat process start 1230, DLP share 1236, and so forth. In certain embodiments, the resulting observables 1106 may in turn be respectively associated with a corresponding observable abstraction level, described in greater detail herein.

In certain embodiments, IOB abstraction operations, described in greater detail herein, may be performed on the resulting observables 1106 to generate a corresponding IOB 1108. In various embodiments, an IOB 1108 may be expressed in a Subject Action Object format and associated with observables 1106 resulting from event information received from certain event data sources 1010. In certain embodiments, an IOB abstraction operation may be performed to abstract away event data source-specific knowledge and details when expressing an entity behavior. For example, rather than providing the details associated with a "Windows:4624" non-user entity event, the IOB 1108 may be abstracted to a "User Login To Device" OS event 1222, 1226, 1234.

As shown in FIG. 12b, examples of IOBs 1108 may include "user downloaded document" 1222, "device spawned process" 1244, "user shared folder" 1246, and so forth. To provide other examples, the IOB 1108 "user downloaded document" 1222 may be associated with observables 1106 firewall file download 1218, DLP download 1220, OS event 1222, and CASB event 1224. Likewise, the IOB 1108 "device spawned process" 1244, may be associated with observables 1106, OS event 1226, endpoint spawn 1228, and insider threat process start 1230. The IOB 1108 "user shared folder" 1246 may likewise be associated with observables 1106 CASB event 1232, OS event 1234, and DLP share 1236.

In certain embodiments, IOBs 1108 may in turn be respectively associated with a corresponding IOB abstraction level, described in greater detail herein. In various embodiments, activity sessionization operations, likewise described in greater detail herein, may be performed to respectively associate certain events and IOBs 1108 with corresponding activity sessions, likewise described in greater detail herein. Likewise, as described in greater detail herein, the resulting session information may be used in various embodiments to associate certain events of analytic utility, or their corresponding observables 1106, or their corresponding IOBs 1108, or a combination thereof, with a particular activity session.

In certain embodiments, the resulting IOBs 1108 may be processed to generate an associated EBP element 1180, as described in greater detail herein. In various embodiments, the EBP element 1180 may include user entity profile attribute 604, non-user entity profile attribute 634, data entity profile attribute 644, entity risk score 540, entity state 542, entity model 544, entity behavior 1248 information, and so forth. In certain of these embodiments, the actual information included in a particular EBP element 1180, the method by which it is selected, and the method by which it is associated with the EBP element 1180, is a matter of design choice. In certain embodiments, the EBP elements 1180 may in turn be respectively associated with a corresponding EBP element abstraction level, described in greater detail herein.

In various embodiments, certain EBP elements 1180 may in turn be associated with a particular EBP 540. In certain embodiments, the EBP 540 may be implemented as a class of user entity 1252 EBPs, an user entity-specific 1254 EBP, a class of non-user entity 1256 EBPs, a non-user entity-specific 1258 EBP, a class of data entity EBPs 1260, a data entity-specific 1262 EBP, and so forth. In various embodiments, certain entity data associated with EBP elements 1180 associated with the classes of user entity 1252, non-user entity 1256, and data entity 1260 EBPs may be anonymized. In certain embodiments, the EBP 540 may in turn be associated with an EBP abstraction level, described in greater detail herein.

In certain embodiments, security risk use case association operations may be performed to associate an EBP 540 with a particular security risk use case 1270. As shown in FIG. 12*a*, examples of such security risk use cases 1270 include "data exfiltration" 1272, "data stockpiling" 1274, "compromised insider" 1276, "malicious user" 1278, and so forth. In certain embodiments, identified security risk use cases may in turn be associated with a security risk use case abstraction level, described in greater detail herein.

In certain embodiments, the results of the security risk use case association operations may be used to perform security vulnerability scenario association inference operations to associate one or more security risk use cases 1270 to one or more security vulnerability scenario inferences 1280, described in greater detail herein. As shown in FIG. 12*a*, examples of security vulnerability scenario inferences 1280 include "accidental disclosure" 1282, "account takeover" 1284, "theft of data" 1286, "sabotage" 1288, "regulatory compliance" 1290, "fraud" 1292, "espionage" 1294, and so forth. To continue the example, the "theft of data" 1286 security vulnerability scenario inference may be associated with the "data exfiltration" 1272, "data stockpiling" 1274, "compromised insider" 1276, "malicious user" 1278 security risk use cases 1270. Likewise the "sabotage" 1288 and "fraud" 1292 security vulnerability scenario inferences may be respectively associated with some other security risk case 1270. In certain embodiments, the associated security vulnerability scenarios may in turn be associated with a security vulnerability scenario abstraction level, described in greater detail herein.

Figure 13:
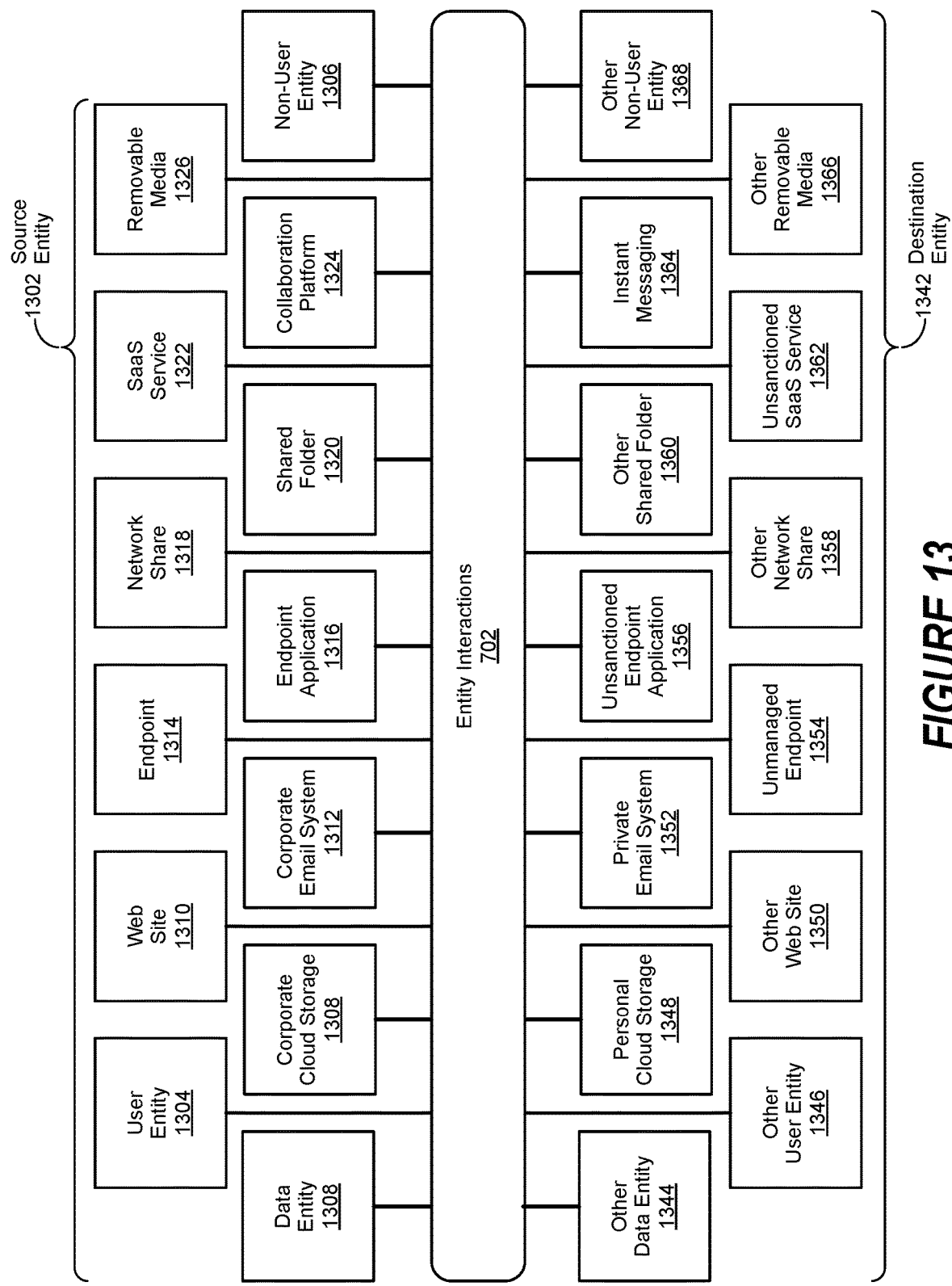
FIG. 13 is a simplified block diagram showing the mapping of entity behaviors to a risk use case scenario.

FIG. 13 shows a simplified block diagram of example source entities and destination entities associated with certain entity interactions performed in accordance with an embodiment of the invention. In certain embodiments, an entity interaction 702 may entail the occurrence of one or more events, as described in greater detail herein. In certain embodiments, the source 1302 entity and destination 1342 entity may be either a user entity, a non-user entity, or a data entity, as likewise described in greater detail herein.

For example, as shown in FIG. 13, the source 1302 entity may be a user entity 1304, a non-user entity 1306, or data entity 1308. Likewise, the source 1302 entity may be a non-user entity such as corporate cloud storage 1308, a web site 1310, a corporate email system 1312, an endpoint 1314 device, an endpoint application 1316, a network share 1318, a shared folder 1320, a Software as a Service (SaaS) service 1322, a collaboration platform 1324, or removable media 1326. To continue the example, the destination 1342 entity may be another data entity 1344, another user entity 1346, or another non-user entity 1368. Likewise, the destination 1342 entity may be a non-user entity such as personal cloud storage 1348, another web site 1350, a private email system 1352, an unmanaged endpoint 1354, an unsanctioned endpoint application 1356, another network share 1358, another shared folder 1360, an unsanctioned SaaS service 1362, an instant messaging system 1364, or another removable media 1366. Skilled practitioners of the art will recognize that many such examples of source 1302 and destination 1342 entities are possible. Accordingly, the foregoing is not intended to limit the spirit, scope, or intent of the invention.

FIGS. 14*a* through 14*f* show examples of entity interaction maps resulting from the performance of one or more security analytics mapping operations implemented in accordance with an embodiment of the invention. In various embodiments, one or more security analytics mapping operations may be performed by certain components of a distributed security analytics framework, described in greater detail herein, to generate an entity interaction map, such as those shown in FIGS. 14*a* through 14*f*. As used herein, an entity interaction map broadly refers to a representation of the concatenation of two or more correlated entity interactions, described in greater detail herein.

In certain embodiments, such entity interactions may be performed in a distributed security analytics environment, as described in greater detail herein. In various embodiments, the correlation of two or more entity interactions, or their associated concatenation, or a combination thereof, may be performed in whole or in part, by one or more components, individually or in combination, of a distributed security analytics environment. In these embodiments, the components of a distributed security analytics environment selected to perform the entity interaction correlation and concatenation is a matter of design choice. In certain embodiments, the entity interaction map may be used in the performance of one or more security analytics operations, or one or more back-end security analytics operations, or a combination thereof, respectively performed by a security analytics system, or one or more back-end security analytics systems, or a combination thereof, to detect an anomalous event.

In certain embodiments, an entity interaction map may be implemented such that each of its associated entity interactions entail interaction with a common data entity, or a derivative thereof. In certain embodiments, an entity interaction map may be implemented such that each of its associated entity interactions include at least one user or non-entity entity associated with the previous user entity interaction of the entity interaction map. In certain embodiments, the representation of correlated entity interactions may be implemented as a data mapping structure. In certain embodiments, the data mapping structure may be implemented as a two-dimensional graph-like structure.

In certain embodiments, an entity interaction map may be implemented to provide a historical mapping of the conveyance of data from one entity to another over a predetermined period of time. In certain embodiments, the historical mapping may show the conveyance of data from a source entity to one or more intermediate entities before it is eventually conveyed to a destination entity. As used herein, conveyance of data broadly refers to the transfer of data, or a derivative thereof, from one entity to another. In certain embodiments, the conveyance of data from one entity to another may take place within a distributed security analytics environment. In certain embodiments, an entity interaction map may be implemented, as described in greater detail herein, to detect the occurrence of one or more anomalous events associated with the conveyance of data from one entity to another.

In certain embodiments, an entity interaction map may be implemented to establish a chain of data custody. As used herein, a chain of data custody broadly refers to a chronological record of the sequence of custody, control, and disposition of data, or a derivative thereof, as it is conveyed from one entity to another over time. As likewise used herein, data custody broadly refers to a state of possession of the data by a user or non-user entity, whether such a state of possession is direct or indirect. As an example, data may be directly stored in a non-user entity, such as a cloud storage facility or removable media, or indirectly stored in a non-user entity, such as the main memory of an endpoint device.

In certain embodiments, an entity interaction map may be implemented to track the conveyance of data from one entity to another as each conveyance occurs. In certain embodiments, an entity interaction map may be implemented to provide a historical mapping of the conveyance of data from one entity to another after such conveyances have occurred. In certain embodiments, data conveyed from a first entity to a second entity during an entity interaction may include associated information, described in greater detail herein, that uniquely identifies the data.

In certain embodiments, the information that uniquely identifies the data may be entity reference information, described in greater detail herein. In certain embodiments, data conveyed from a first entity to a second entity during an entity interaction may not be altered. In certain embodiments, data conveyed from a first entity to a second entity during an entity interaction may be altered by the first entity prior to it being conveyed to the second entity. In certain embodiments, data conveyed from a first entity to a second entity during an entity interaction may be altered by the second entity after it has been conveyed by the first entity.

In various embodiments, data conveyed from a first entity to a second entity during an entity interaction may not be conveyed in its entirety. Instead, only a predetermined portion of the data may be conveyed from the first entity to the second entity. In certain of these embodiments, the portion of data conveyed during an entity interaction may be implemented to include at least one data element of the data available to be conveyed from the first entity to a second entity. In various embodiments, two or more sets of data may be combined by a first entity prior to its conveyance to a second entity during an entity interaction. In certain of these embodiments, the two or more sets of data may individually be a complete set of data, or respectively a portion thereof.

In certain embodiments, data conveyed from a first entity to a second entity during an entity interaction may be renamed by the first entity prior to its conveyance to a second entity. In various embodiments, data received by a second entity from a first entity may be used as input data. In certain of these embodiments, the input data may be processed to generate output data. In certain embodiments, the resulting output data may not include any of the input data. In certain embodiments, the resulting output data may be named differently than the input data.

In various embodiments, certain identifying information associated with one or more data elements of the input data may be included in the output data, even if the resulting output data is named differently than the input data, contain none of the input data, or a combination thereof. Certain embodiments of the invention reflect an appreciation that the ability to include such identifying information in the output data is advantageous when tracking the source of data conveyed, directly or indirectly, from one entity to another, even if the original input data is not present in the output data.

In certain embodiments, the data provided by a first entity to a second entity during an entity interaction may be in the form of structured content, unstructured content, or a combination thereof. In certain embodiments, the data may be parsed to identify associated terms. In certain embodiments, the identified terms may be of analytical utility, described in greater detail herein.

As used herein, a term broadly refers to a word, compound word, phrase expression, numeric value, or alphanumeric string, which in certain contexts is associated with a particular meaning. As likewise used herein, a phrase broadly refers to a sequence of terms, or multi-words, familiar to skilled practitioners of the art. In certain embodiments, a term may be associated with an event, a feature of an event, a classification label, a metadata tag label, or a combination thereof.

As used herein, a feature, as it relates to an event, broadly refers to a property, characteristic, or attribute of a particular event. As an example, features associated with a text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits.

In certain embodiments, such features may be used, individually or in combination, as identifying information associated with one or more data elements of input data. In certain embodiments, such features may likewise be associated with anomalous, abnormal, unexpected or malicious user behavior enacted by a particular entity, as described in greater detail herein. Likewise, such features may be used in certain embodiments to identify one or more entities involved in a particular entity interaction. In certain embodiments, such features may likewise be used, individually or in combination, to generate an entity interaction map, such as those shown in FIGS. 14a through 14f.

In certain embodiments, such entity information may include entity feature information, entity attribute information, or a combination thereof. As used herein, entity feature information broadly refers to information commonly used to perform analysis operations associated with entity models. As likewise used herein, entity attribute information broadly refers to structured information associated with a particular entity. In certain embodiments, entity attribute information may include one or more attribute types. An attribute type, as likewise used herein, broadly refers to a class of attributes, such as a Boolean attribute type, a double attribute type, a string attribute type, a date attribute type, and so forth.

As used herein, a Boolean attribute type broadly refers to a type of Boolean operator, familiar to those of skill in the art, associated with a particular event or associated entity. Known examples of such Boolean operator types include conjunction, disjunction, exclusive disjunction, implication, biconditional, negation, joint denial, and alternative denial. In certain embodiments, a Boolean event attribute type may be implemented to simplify data management operations. As an example, it may be more efficient to associate a biconditional Boolean event attribute having values of "true" and "false" to an event data field named "Privileges," rather than assigning the values "Privileged" and "Nonprivileged."

As used herein, a double attribute type broadly refers to a type of attribute that includes a numeric value associated with a particular entity or event. In certain embodiments, a double attribute type may be implemented for the performance of range searches for values, such as values between 10 and 25. In certain embodiments, a double attribute type may be implemented to configure numeric data field features, such as identifying unusually high or unusually low numeric values. In certain embodiments, a double attribute type may be implemented to create event models that aggregate by the max or sum of various event attribute values.

As used herein, a string attribute type broadly refers to a type of attribute that includes a string of characters associated with an entity or an event. In certain embodiments, a string attribute type may include text characters, numeric values, mathematical operators (e.g., '+', '*', etc.), or a combination thereof. As an example, a string attribute may for an entity data field named "Participants" may include the character string "2 hosts+3 assistants+37 attendees." In certain embodiments, a string attribute type may be implemented to search for partial matches of a particular value, such as a reference to a "java" file.

As used herein, a date attribute type broadly refers to a type of attribute that contains a natural date associated with an entity or an event. In certain embodiments, the representation or format of a particular date (e.g., March 15, 2018, 3/15/2018, etc.), or time (e.g., 1:07 PM, 13:07:23, etc.) is a matter of design choice. In certain embodiments, a date attribute type may be implemented to perform searches for a particular date, a particular time, or a combination thereof. In certain embodiments, a date attribute type may be implemented to perform searches for a range of dates, a range of time, or a combination thereof.

In certain embodiments, the event information may include event content information, event timestamp information, event attachment information, event reference information, or a combination thereof. As used herein, event content information broadly refers to an unstructured body of text associated with a particular event. As an example, the main body of a communication, such as an email, a Short Message Service (SMS) text, a Chat communication, or a Twitter™ Tweet™ contains event content information.

In various embodiments, search operations may be performed on certain event content information to identify particular information. In various embodiments, such search operations may be performed by certain components of a distributed security analytics environment. In these embodiments, the components of a distributed security analytics environment selected to perform such search operations is a matter of design choice.

In certain embodiments, such search operations may include the use of lexicon features familiar to skilled practitioners of the art. In certain embodiments, extraction operations may be performed on the event content information to extract such identified information. In certain embodiments, the event content information may be processed to generate structured data. In certain embodiments, the event content information may be processed to generate an event summary, described in greater detail herein. In these embodiments, the method by which the event content information is processed, and the form of the resulting structured data or event summary is generated, is a matter of design choice.

As used herein, event timestamp information broadly refers to time and date information associated with the time and date a particular event occurred. Examples of such timestamp information include the time and date an email was sent, the time and date a user entity logged-in to a system, the time and date a user entity printed a file, and so forth. Other examples of such timestamp information include the time and date a particular Data Loss Prevention (DLP) alert was generated, as well as the time and date the DLP event occurred. Yet other examples of such timestamp information include the actual time and date of a particular event, and the publically-reported time and date of the occurrence of the event.

As used herein, event attachment information broadly refers to a separate body of content having an explicit association with a particular event. One example of such event attachment information includes a file. In certain embodiments, such a file may be an unstructured text file, a structured data file, an audio file, an image file, a video file, and so forth. Another example of such event attachment information includes a hypertext link, familiar to those of skill in the art, to a separate body of content. In certain embodiments, the linked body of content may include unstructured text, structured data, image content, audio content, video content, additional hypertext links, or a combination thereof.

In certain embodiments, event attachment information may be ingested and processed to identify associated entity and event information, as described in greater detail herein. In various embodiments, the event attachment information may be processed to determine certain metadata, such as the size of an attached file, the creator of the event attachment information, the time and date it was created, and so forth. In certain embodiments, search operations may be performed on the event attachment information to identify certain information associated with a particular event.

As used herein, event reference information broadly refers to information related to commonalities shared between two or more events. As an example, two events may have a parent/child, or chain, relationship, such as that represented by the entity interaction maps shown in FIGS. 14a through 14f. To further the example, the sending of a first email may result in the receipt of a second email. In turn, a third email may be sent from the receiver of the second email to a third party. In this example, the event reference information would include the routing information associated with the first, second and third emails, which form an email chain.

In certain embodiments, event information may be processed to generate an event summary. As used herein, an event summary broadly refers to a brief, unstructured body of text that summarizes certain information associated with a particular event. In certain embodiments, the event summary may be implemented to summarize information associated with an event. As an example, the subject line of an email may include such an event summary. In various embodiments, a group of event summaries may be searched during the performance of certain security analytics operations, described in greater detail herein, to identify associated event information.

In certain embodiments, natural language processing (NLP) operations and other approaches familiar to skilled practitioners of the art may be used to perform the parsing. In various embodiments, such NLP operations, or other approaches for performing the parsing, may be performed by certain components of a distributed security analytics environment. In these embodiments, the components of a distributed security analytics environment selected to perform such NLP operations, or other approaches for such parsing, is a matter of design choice.

As an example, event information associated with a particular training event may include an audio recording of human language being spoken. In this example, the event information may be processed to generate a digital transcript of the recording, which in turn may be parsed to identify certain words it may contain. As another example, the event information may include hand-written text. In this example, image recognition approaches familiar to those of skill in the art may be used to convert the hand-written content into a digital form, which in turn may be parsed to identify certain words it may contain.

As yet another example, the event information may include a segment of unstructured text. In this example, various NLP approaches may be used to process the unstructured text to extract certain words it may contain and then determine synonyms, antonyms, or associated concepts for those words. Skilled practitioners of the art will recognize that many such embodiments are possible. Accordingly, the foregoing is not intended to limit the spirit, scope, or intent of the invention.

For example, the entity interaction map 1402 shown in FIG. 14a depicts a source data file 1404 stored 1406 in cloud storage 1408. In this example, the source data file 1404 is first shared by 1410 the cloud storage 1408 to user '1' 1412, who in turn shares 1414 it with user '2' 1416. To continue the example, the data file 1402 is a data entity, the cloud storage 1406 is a non-user entity, and users '1' 1412 and '2' 1416 are both user entities.

To continue the example further, the event of the data file 1402 being stored 1404 in cloud storage 1406 is a first entity interaction of the entity interaction map 1402. Likewise, the event of the data file 1402 being shared 1410 by the cloud storage 1406 with user '1' 1412 is a second entity interaction of the entity interaction map 1402. To continue the example yet further, the event of user '1' 1412 sharing 1414 the data file 1402 with user entity '2' 1414 is a third entity interaction of the entity interaction map 1402.

As another example, the entity interaction map 1418 shown in FIG. 14b depicts a source data file 1420 stored 1422 in a network share 1424. In this example, the source data file 1420 is first downloaded 1426 by user '1' 1428, who then renames 1430 the source data file 1420 to a renamed data file 1432 prior to saving 1434 it to their user device 1436. To continue the example, the source data file 1420 and the renamed data file 1432 are both data entities, the network share 1424 and user '1' device 1436 are both non-user entities, and user '1' 1428 is a user entity.

To continue the example further, the event of the source data file 1420 being stored 1422 in the network share 1424 is a first entity interaction of the entity interaction map 1418. Likewise, the event of the source data file 1420 being downloaded 1426 by user '1' 1428 from the network share 1424 is a second entity interaction of the entity interaction map 1418. To continue the example yet further, the event of user '1' 1428 renaming 1430 the source data file 1420 to a renamed data file 1432 is a third entity interaction of the entity interaction map 1418. Likewise, the event of user '1' 1428 saving 1434 the renamed data file 1432 to their user device 1436 is a fourth entity interaction of the entity interaction map 1402.

As yet another example, the entity interaction map 1438 shown in FIG. 14c depicts a source data file 1440 stored 1442 in a device 1444 associated with user '1'. In this example, the source data file 1440 is first attached 1446 to an email 1448, which is then sent 1450 to user '2' 1452, who in turn saves 1454 it to an associated device 1456. To continue the example, the data file 1440 is a data entity, the email 1448 and the devices 1444, 1456 respectively associated with user '1' and '2' 1452 are non-user entity, and user '2' 1452 is a user entity.

To continue the example further, the event of the source data file 1440 being stored 1442 in the device 1444 associated with user '1' is a first entity interaction of the entity interaction map 1438. Likewise, the event of the source data file 1440 being attached 1446 to the email 1448 is a second entity interaction of the entity interaction map 1438. To continue the example yet further, the event of the email 1448 being sent 1450 to user '2' 1452 is a third entity interaction of the entity interaction map 1438. Likewise, the event of user '2' 1452 saving 1454 the email 1448 to their associated device 1456 is a fourth entity interaction of the entity interaction map 1438.

As yet still another example, the entity interaction map 1458 shown in FIG. 14d depicts a source data file 1460 stored 1462 in a device 1464 associated with user '1'. In this example, the source data file 1460 is uploaded 1466 to another entity 1468, which in turn saves 1470 the source data file to a renamed file 1472. To continue the example, the source data file 1462 and the renamed data file 1472 are both data entities, while the device 1464 associated with user '1' and the other entity 1468 are both non-user entities. Those of skill in the art will recognize that many examples of the other entity 1468 are possible, such as a cloud host, a network share, a website, a social media platform, other platforms such as those used for collaboration, other devices, and so forth.

To continue the example further, the event of the source data file 1460 being stored 1462 in a device 1464 associated with user '1' is a first entity interaction of the entity interaction map 1458. Likewise, the event of the source data file 1460 being uploaded 1466 to another entity 1468 is a second entity interaction of the entity interaction map 1458. To continue the example yet further, the event of the other entity 1468 saving 1470 the source data file 1460 as a renamed data file 1472 is a third entity interaction of the entity interaction map 1402.

To provide another example, the entity interaction map 1474 shown in FIG. 14e depicts a source data file 1476 stored 1478 in a device 1480 associated with user '1'. In this example, the source data file 1460 is accessed 1482 by a software application 1484. To continue the example, the source data file 1476 is a data entity, while the device 1480 associated with user '1' and the software application 1484 are both non-user entities. To continue the example further, the event of the source data file 1476 being stored 1478 in the device 1480 associated with user '1' is a first entity interaction of the entity interaction map 1474. Likewise, the event of the source data file 1476 being accessed 1482 by the software application 1484 is a second entity interaction of the entity interaction map 1474.

To provide yet another example, the entity interaction map 1486 shown in FIG. 14f depicts a source data file 1488 stored 1490 in a device 1492 associated with user '1'. In this example, the source data file 1488 is viewed 1482 by a software application 1496. To continue the example, the source data file 1488 is a data entity, while the device 1492 associated with user '1' and the software application 1496 are both non-user entities. To continue the example further, the event of the source data file 1488 being stored 1490 in the device 1492 associated with user '1' is a first entity interaction of the entity interaction map 1486. Likewise, the event of the source data file 1476 being viewed 1494 by the software application 1496 is a second entity interaction of the entity interaction map 1486. Skilled practitioners of the art will recognize that many such examples of an entity interaction map are possible. Accordingly, the foregoing is not intended to limit the spirit, scope, or intent of the invention.

Figure 15:
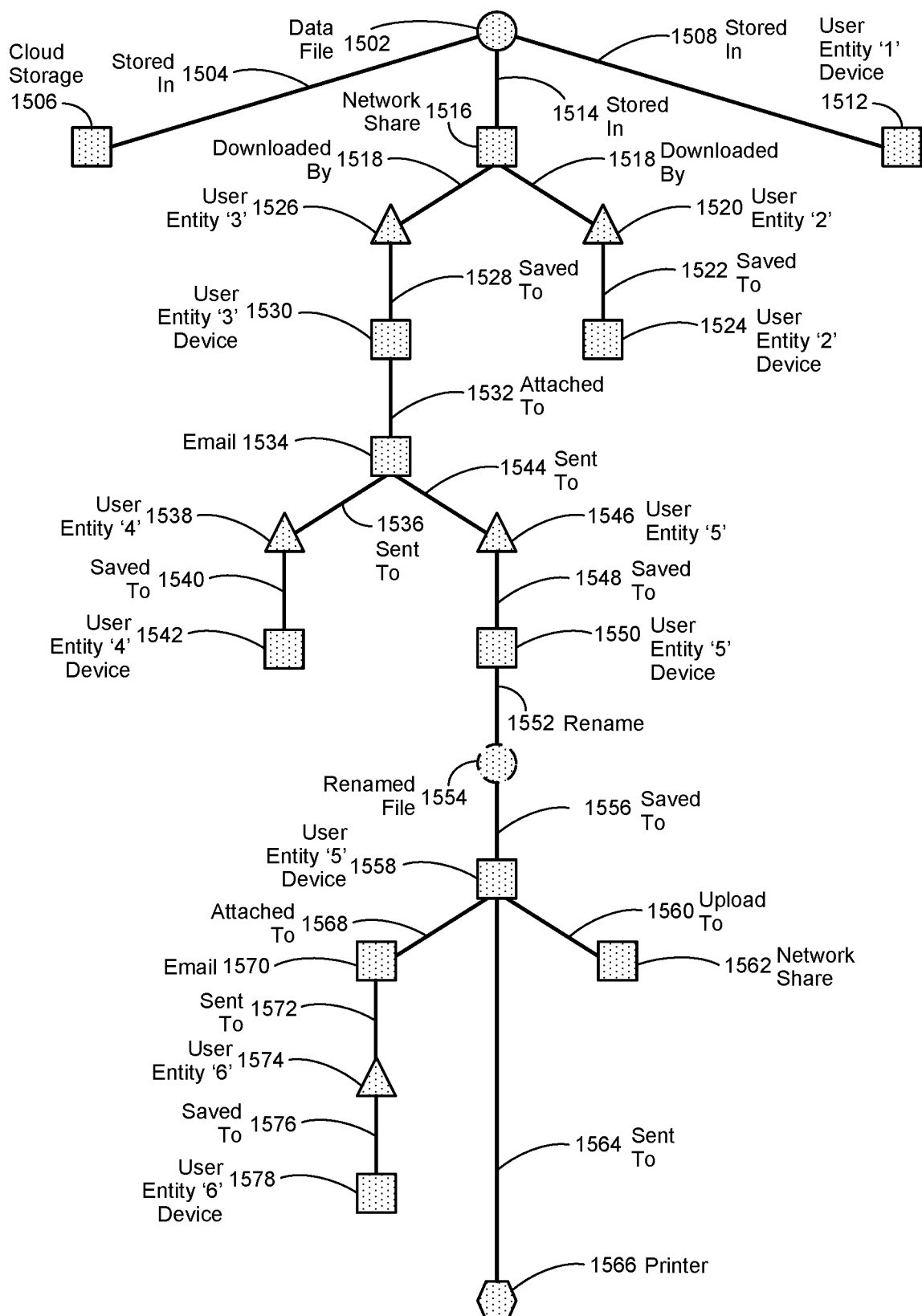
FIG. 15 shows an example entity interaction map generated from associated entity interactions.

FIG. 15 shows an example entity interaction map generated from associated entity interactions implemented in accordance with an embodiment of the invention. As described in greater detail herein, two or more user interactions may be concatenated to generate an associated entity interaction map. In certain embodiments, an entity interaction map may be implemented to show individual user interactions that are not concatenated. For example, as shown in FIG. 15, a first entity interaction may be performed to store 1504 a source data file 1502 in cloud storage 1506. Likewise, a second entity interaction may be performed to store 1508 the same source data file 1502 in a device 1512 associated with user entity '1'. In this example, the first and second user interactions are shown as individual user interactions.

However, as likewise shown in FIG. 15, a third entity interaction may be performed to store 1514 the source data file 1502 in a network share 1516. Likewise, a fourth entity interaction may be performed by user entity '2' to download 1518 the source data file 1502 from the network share 1516. In turn, a fifth entity interaction may be performed by user entity '2' 1520 to save 1522 the source data file 1502 to an associated device 1524. In this example, the fifth entity interaction is concatenated to the fourth entity interaction, which in turn is concatenated to the third entity interaction.

To continue the example, a sixth entity interaction may be performed by user entity '3' 1526 to download 1518 the source data file 1502 from the network share 1516. Likewise, a seventh entity interaction may be performed by user entity '3' 1526 when the save 1528 the source data file 1502 to an associated device 1530. In turn, an eighth entity interaction may be performed when the user entity '3' 1526 attaches 1532 the source data file 1502 to an email. As likewise shown in FIG. 15, the eighth entity interaction is concatenated to the seventh entity interaction, which in turn is concatenated to the fourth entity interaction.

To continue the example further, a ninth entity interaction may be performed when the email 1534 is sent 1536 to user entity '4' 1538. Likewise, a tenth entity interaction may be performed when user entity '4' 1538 saves 1540 the source data file 1502 to an associated device 1542. As shown in FIG. 15, the tenth entity interaction is concatenated to the ninth entity interaction, which in turn is concatenated to the eighth entity interaction.

As likewise shown in FIG. 15, an eleventh entity interaction may be performed when the email 1534 is sent 1544 to user entity '5' 1546. Likewise, a twelfth entity interaction may be performed by user entity '5' 1546 when it saves 1548 the email 1534 to an associated device 1550. To further continue the example, a thirteenth entity interaction may be performed when user entity '5' 1546 renames 1552 the source data file 1502 attached to the email 1534, to generate a renamed data file 1554. Likewise, a fourteenth entity interaction may be performed to save 1556 the renamed data file 1554 a device 1558 associated with user entity '5' 1546. As shown in FIG. 15, the fourteenth entity interaction is concatenated to the thirteenth entity interaction, which is concatenated to the twelfth entity interaction, which in turn is concatenated to the eleventh entity interaction, which is likewise concatenated to the tenth entity interaction.

To continue the example further, a fifteenth entity interaction may be performed when the device 1558 associated with user entity '5' 1546 is used to upload 1560 the renamed data file 1554 to a network share 1562. Likewise, a sixteenth entity interaction may be performed when the same device 1558 is used to send 1564 the renamed data file 1554 to a printer 1566 so it can be printed. As likewise shown in FIG. 15, both the fifteenth and the sixteenth entity interaction is concatenated to the fourteenth entity interaction.

To continue the example even further, a seventeenth entity interaction may be performed when the device 1558 associated with user entity '5' 1546 is used to attach 1568 the renamed data file 1554 to an email 1570. Likewise, an eighteenth entity interaction may be performed when the resulting email 1570 is sent 1572 with its attached renamed data file 1554 to user entity '6' 1574. As before, a nineteenth entity interaction may be performed when user entity '6' 1574 saves 1576 the renamed data file 1554 attached 1568 to the email 1570 to an associated device 1578. As shown in FIG. 15, the nineteenth entity interaction is concatenated to the eighteenth entity interaction, which is concatenated to the seventeenth entity interaction, which in turn is concatenated to the fourteenth entity interaction. Certain embodiments of the invention reflect an appreciation that the concatenation of certain entity interactions to other entity interactions can provide an entity interaction map that depicts which user and non-user entities have interacted with a particular data entity, and in which sequence.

Figure 16:
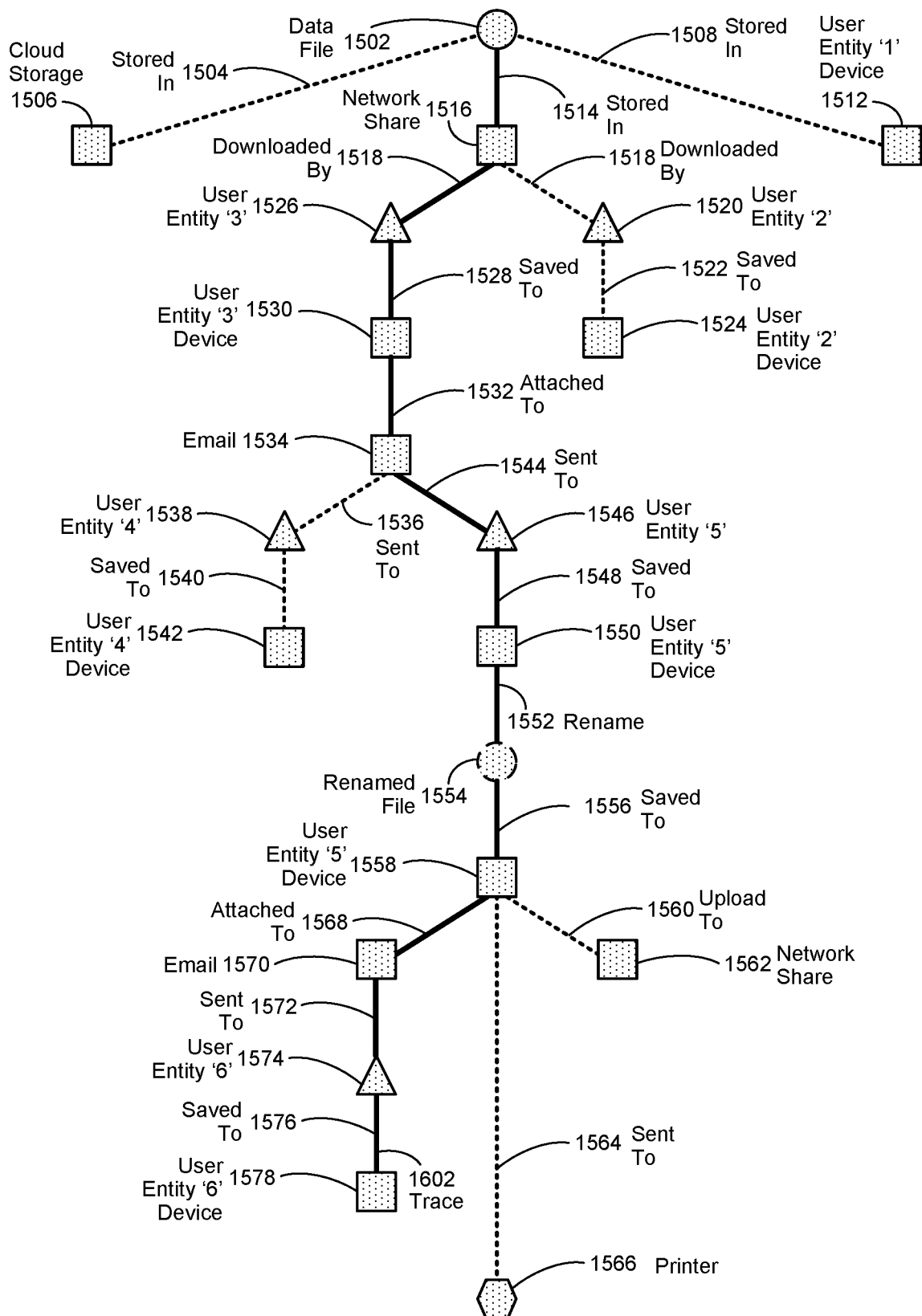
FIG. 16 shows an entity interaction map for tracing which entities have previously interacted with data associated with the occurrence of an anomalous event.

FIG. 16 shows an entity interaction map implemented in accordance with an embodiment of the invention to trace which entities have previously interacted with data associated with the occurrence of an anomalous event. In various embodiments, a security analytics mapping operation may be performed to generate an entity interaction trace 1602. In certain of these embodiments, the resulting entity interaction trace 1602 may be implemented to determine which user and non-user entities have previously interacted with a particular data entity, described in greater detail herein, associated with the occurrence of an anomalous event.

For example, as described in the descriptive text associated with FIG. 15, a nineteenth entity interaction may be performed when user entity '6' 1574 saves 1576 the renamed data file 1554 attached 1568 to the email 1570 to an associated device 1578. In this example, the saving 1576 of the renamed data file 1554 attached 1568 to the email 1570 to an associated device 1578 may be determined to be anomalous. Accordingly, one or more security analytics mapping operations may be performed to generate an entity interaction trace 1602 to determine which other user and non-user entities have previously interacted with the renamed data file 1554.

As shown in FIG. 16, the entity interaction trace 1602 resulting from performance of associated security analytics mapping operations shows that the nineteenth, eighteenth, seventeenth, fourteenth, thirteenth, twelfth, eleventh, eighth, seventh, sixth, and third entity interactions are sequentially concatenated to one another. Accordingly, the entity interaction trace 1602 shown in FIG. 16 shows that entities 1578, 1574,1570,1558, 1554, 1550, 1546, 1534, 1530, 1526, and 1516 have previously interacted with the source data file 1502 prior to the detection of it being associated with the detection of an anomalous event. Likewise, such interaction raises the possibility that those entities that previously interacted with the source data file 1502 may be directly or indirectly involved in the occurrence of the anomalous event.

Figures 17, 18:
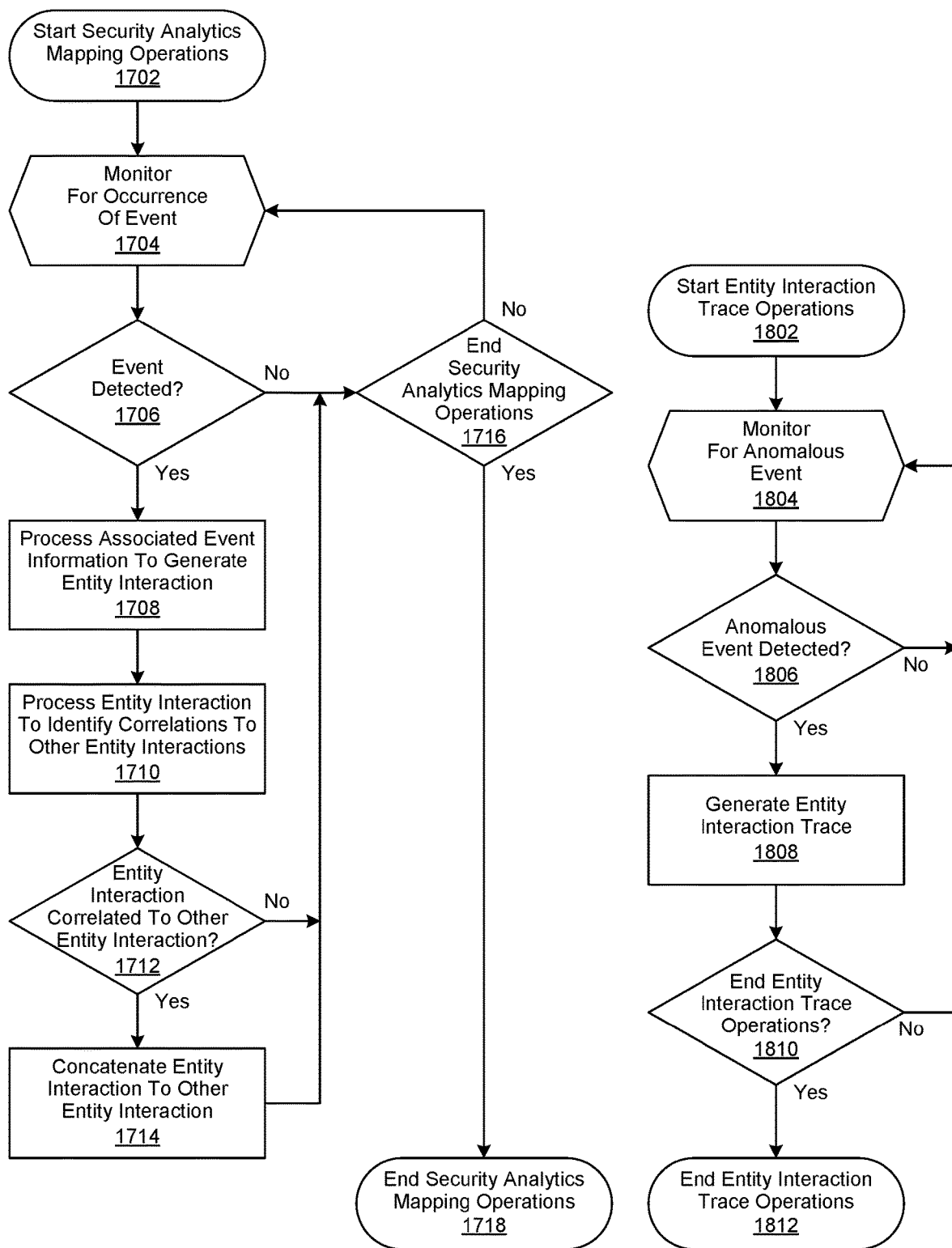
FIG. 17 is a flowchart showing the performance of security analytics mapping operations to generate an entity interaction map.
FIG. 18 is a flowchart showing the performance security analytics mapping operations performed to generate an entity interaction trace.

FIG. 17 is a flowchart showing the performance of security analytics mapping operations performed in accordance with an embodiment of the invention to generate an entity interaction map. In this embodiment, security analytics mapping operations are begun in step 1702, followed by monitoring operations being performed in step 1704 to detect the occurrence of an event. A determination is then made in step 1706 whether an event has been detected. If not, a determination is made in step 1716 whether to end security analytics mapping operations. If not, then the process is continued, proceeding with step 1704. Otherwise, security analytics mapping operations are ended in step 1718.

However, if it was determined in step 1706 that an event was detected, then event information associated with the detected event is processed in step 1708 to generate an associated entity interaction, described in greater detail herein. The resulting entity interaction and associated event information is then processed in step 1710 to identify its correlation to any other entity interaction. A determination is then made in step 1712 whether the newly-generated entity interaction correlates to any other entity interaction. If so, then the newly-generated entity interaction is concatenated to the identified entity interaction in step 1714 to generate a new entity interaction map, or further extend an existing one. Thereafter, or if it was determined in step 1712 that the resulting entity interaction does not correlate to any other entity interaction, then the process is continued, proceeding with step 1716.

FIG. 18 is a flowchart showing the performance security analytics mapping operations performed in accordance with an embodiment of the invention to generate an entity interaction trace. In this embodiment, entity interaction trace operations are begun in step 1802, followed by monitoring operations being performed in step 1804 to detect the occurrence of an anomalous event. A determination is then made in step 1806 whether an anomalous event has been detected. If not, then the process is continued, proceeding with step 1804.

Otherwise an entity interaction trace is generated in step 1808, as described in greater detail herein. A determination is then made in step 1810 whether to end entity interaction trace operations. If not, then the process is continued, proceeding with step 1804. Otherwise entity interaction trace operations are ended in step 1812.

Figure 19:
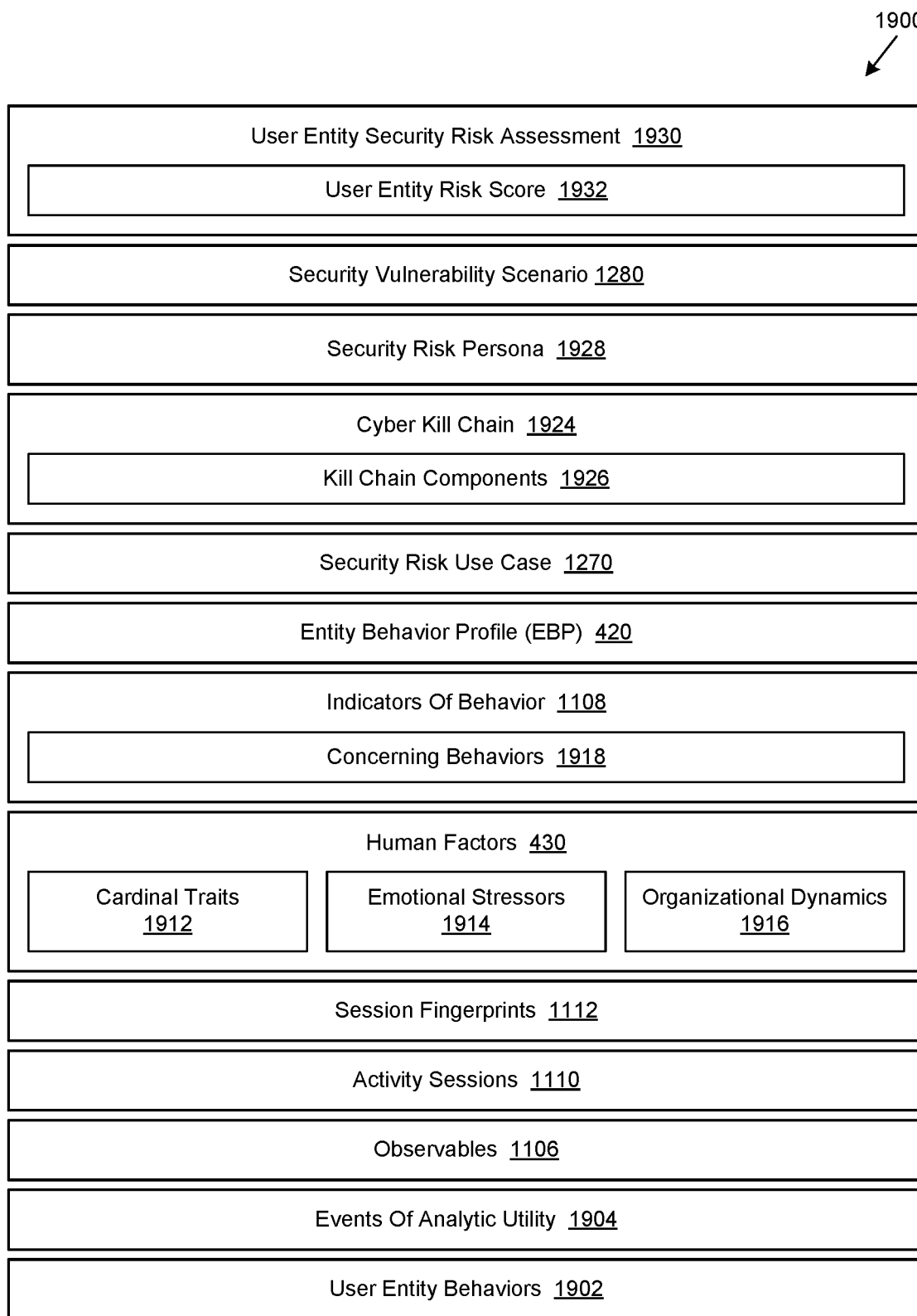
FIG. 19 shows a human-centric risk modeling framework.

FIG. 19 shows a human factors risk modeling framework implemented in accordance with an embodiment of the invention. As used herein, human factors risk broadly refers to any risk associated with the enactment of a behavior by a user entity affected by one or more human factors, as described in greater detail herein. In certain embodiments, the human factors risk modeling framework 1900 shown in FIG. 19 may be used in combination with a human factors framework, described in greater detail herein, to perform a security analytics operation, likewise described in greater detail herein.

In various embodiments, the security analytics operation may be performed independently by the human factors framework, or in combination with certain components of a security analytics system, described in greater detail herein. Various embodiments of the invention reflect an appreciation that known approaches to human factors risk modeling have certain limitations that often pose challenges for security-related implementation. Likewise, various embodiments of the invention reflect an appreciation that implementation of the human factors risk modeling framework 1900 may assist in addressing certain of these limitations.

In certain embodiments, a user entity may enact certain entity behavior associated with a corresponding indicator of behavior (IOB) 1108, described in greater detail herein. In certain embodiments, such user entity behaviors associated with a corresponding IOB 1108 may be determined to be anomalous, abnormal, unexpected, suspicious, or some combination thereof, as described in greater detail herein. In various embodiments, the human factors risk modeling framework 1900 may be implemented as a reference model for correlating certain human factors 430 associated with a particular user entity to certain anomalous, abnormal, unexpected, or suspicious behavior, or some combination thereof, they may enact.

In various embodiments, such correlation may result in the detection of an associated concerning behavior 1918. As used herein, a concerning behavior 1918 broadly refers to an IOB 1108 whose associated enactment of entity behavior may be considered a potential security risk. In certain embodiments, the entity behavior associated with an IOB 1108 may be enacted by a user entity, a non-user entity, or a data entity, or a combination thereof. In certain embodiments, such concerning behaviors 1918 may be detected as a result of the performance of a human factors risk operation, likewise described in greater detail herein. In certain embodiments, the effect of a particular concerning behavior 1918 may be qualitative, quantitative, or a combination of the two.

Referring now to FIG. 19, an observable 1106, described in greater detail herein, may be derived in various embodiments from one or more events of analytic utility 1904 associated with certain user entity behaviors 1902, likewise described in greater detail herein. In certain embodiments, as likewise described in greater detail herein, one or more associated observables 1106 may be processed to generate a corresponding activity session 1110. In various embodiments, certain information associated with a particular activity session 1110, may be processed, as likewise described in greater detail herein, to generate a corresponding session fingerprint 1112.

In various embodiments, certain human factor risk operations, described in greater detail herein, may be performed to identify one or more human factors 430, likewise described in greater detail herein, associated with a particular user entity. In certain embodiments, such human factors 430 may include cardinal traits 1912, emotional stressors 1914, and organizational dynamics 1916, or a combination thereof, as described in greater detail herein. In various embodiments, a security analytics operation, likewise described in greater detail herein, may be performed to identify certain IOBs 1108 associated with a particular user entity. In certain embodiments, one or more human factor risk operations may be performed to correlate certain human factors 430 associated with the user entity to IOBs 1108 they may have enacted. In certain embodiments, the resulting correlation may result in the detection of an associated concerning behavior 1918, described in greater detail herein.

In certain embodiments, information related to certain session fingerprints 1112, human factors 430, IOBs 1108, and concerning behaviors 1918 may then be stored with other information contained in an entity profile (EBP) 420 associated with the user entity. In certain embodiments, the EBP 420 may then be implemented to identify a particular security risk use case 1270 corresponding to the user entity. In certain embodiments, the identified security risk use case 1270 may in turn correspond to a particular cyber kill chain 1924.

Skilled practitioners of the art will be familiar with a kill chain, which was originally used as a military concept related to the structure of an attack. In general, the phases of a military kill chain consisted of target identification, force dispatch to target, decision and order to attack the target, and destruction of the target. Conversely, breaking or disrupting an opponent's kill chain is a method of defense or preemptive action. Those of skill in the art will likewise be familiar with a cyber kill chain 1924, developed by the Lockheed Martin company of Bethesda, Maryland, which is an adaptation of the military kill chain concept that is commonly used to trace the phases of a cyberattack.

In certain embodiments, a cyber kill chain 1924 may be implemented to represent multi-stage, outcome-oriented user entity behaviors. In general, such cyber kill chains 1924 will have at least two defined components. In certain embodiments, the components of a cyber kill chain 1924 may be referred to, or implemented as, steps or phases of a cyber kill chain 1924. In certain embodiments, the components of an cyber kill chain 1924 may be adapted, or otherwise implemented, for a particular type of cyberattack, such as data theft. For example, in certain embodiments, the components of a data theft cyber kill chain 1924 may include data reconnaissance, data access, data collection, data stockpiling, data exfiltration, and so forth.

However, the cyber kill chain 1924 concept is not limited to data theft, which relates to theft of an organization's intellectual property. It can also be implemented to facilitate the anticipation and recognition of insider threats, such as insider sabotage, which includes any act by an insider to direct any kind of harm to an organization or its assets. Other insider threats include insider fraud, which relates to modification, deletion, or theft of an organization's data for personal gain, typically associated with the perpetration of an identity crime (e.g., identity theft, credit card fraud, etc.). Yet other insider threats include unintentional insider threat, which includes any act, or failure to act, by an insider without malicious intent, that causes harm or substantially increases the probability of future harm to an organization or its assets. Likewise, the cyber kill chain 1924 concept can be applied to social engineering, advanced ransomware, and innovative cyberattacks as they evolve.

In certain embodiments, a cyber kill chain 1924 may be implemented to anticipate, recognize, and respond to user entity behaviors associated with a corresponding indicator of behavior (IOB) 1108 that may be determined to be anomalous, abnormal, unexpected, suspicious, or some combination thereof, as described in greater detail herein. In certain embodiments, the response to recognition of a kill chain 1924 may be to perform an associated security operation, likewise described in greater detail herein. In certain embodiments, the performance of the security operation may result in disrupting or otherwise interfering with the performance, or execution, of one or more components 1926, steps, or phases of a cyber kill chain 1924 by affecting the performance, or enactment, of the IOB 1108 by its associated entity.

In certain embodiments, the previously identified IOBs may correspond to a particular component 1926 of the cyber kill chain 1924. In certain embodiments, each component 1926 of the cyber kill chain 1924 may be implemented to have a corresponding security risk persona 1928. As used herein, a security risk persona 1928 broadly refers to a group of user entity behaviors 1902, associated with a common theme, whose enactment is not explicitly related to a malicious objective. In various embodiments, certain user entity behaviors 1902 associated with a particular security risk use case 1270 may be used to define, or otherwise describe or characterize, a particular security risk persona 1928. In these embodiments, the user entity behaviors 1902 selected for use, and the method by which the security risk persona 1908 is defined, or otherwise described or characterized, is a matter of design choice. In these embodiments, the descriptor selected to characterize a particular behavioral pattern exhibited by a user entity is likewise a matter of design choice.

In various embodiments, as described in greater detail herein, certain security risk personas 1928 may be implemented to track dynamic changes in user entity behaviors 1902. In various embodiments, the ability to track dynamic changes in user entity behaviors 1902 may facilitate the identification and management of rapidly developing threats. Accordingly, certain embodiments of the invention reflect an appreciation that such tracking may be indicative of dynamic behavioral change associated with a particular user entity. such as associated IOBs 1108. Likewise, various embodiments of the invention reflect an appreciation that certain security risk personas 1928 may shift, or transition, from one to another, and in doing so, reflect important shifts in user entity behaviors 1902 that are relevant to understanding a user entity's traversal of associated cyber kill chains 1924.

In certain embodiments, a security risk persona 1928 may be used, as described in greater detail herein, to identify an associated security vulnerability scenario 1280, likewise described in greater detail herein. In various embodiments, the identified security vulnerability scenario 1280 may be used in combination with certain other components of the human factors risk modeling framework 1900 to perform a user entity security risk assessment 1930. In certain embodiments, performance of the user entity security risk assessment 1930 may result in the generation of a corresponding user entity risk score 1932. In certain embodiments, the user entity risk score 1932 may be implemented as a numeric value. In certain embodiments, the numeric value of the user entity risk score 1932 may be implemented to quantitatively reflect the security risk associated with a particular concerning behavior 1918.

In various embodiments, the user entity risk score 1932 may be implemented to be within a certain range of numeric values. In certain embodiments, the range of numeric values may be implemented to have a lower and upper bound. As an example, the user entity risk score 1932 for a particular concerning behavior 1918 may be implemented to have a lower bound of '0,' indicating extremely low risk, and an upper bound '100,' indicating extremely high risk. To illustrate the example, a user entity may initiate the detection of a concerning behavior 1918 by accessing a corporate server containing sales data, which in turn may result in the generation of an associated user entity risk score 1932 of '50.' In this example, the user entity risk score 1932 of '50' may indicate moderate risk. However, downloading the same sales data to a laptop computer may result in the generation of a concerning behavior risk score of '75,' indicating high risk. To further illustrate the example, downloading the same sales data to a laptop computer, and then storing the sales data on a flash drive, may result in the generation of a concerning behavior risk score of '90,' indicating very high risk.

In certain embodiments, the numeric value of a user entity risk score 1932, or the upper and lower bounds of its associated range of numeric values, or both, may be implemented to be configurable. In certain embodiments, the selection of a numeric value for a particular user entity risk score 1932, or the selection of the upper and lower bounds of its associated range of numeric values, or both, may be performed manually, automatically, or a combination thereof. In these embodiments, the numeric value selected for a particular user entity risk score 1932, or the upper and lower bounds selected for its associated range of numeric values, or both, is a matter of design choice.

As described in greater detail herein, an EBP 420 may be implemented in certain embodiments to collect certain user entity behavior 1902 and other information associated with a particular user entity. Examples of such information may include user entity attributes, such as their name, position, tenure, office location, working hours, and so forth. In certain embodiments, the EBP 420 may likewise be implemented to collect additional behavioral information associated with the human factors risk model 1900. Examples of such additional information may include certain historical information associated with kill chain components 1926, associated security risk personas 1928, security vulnerability scenarios 1280, indicators of behavior (IOBs) 1108, and user entity risk scores 1932.

As an example, an EBP 420 may contain the following user entity information:

| | |
|---|---|
| User Entity Name: | John Smith |
| User Entity Risk Score: | 50% |
| Current Security Risk Persona: | Wanderer |
| Security Vulnerability Scenarios: | Data Theft (Medium Confidence) |
| | Fraud (Low Confidence) |
| Scenario Risk Score | 55% |

Figure 20:
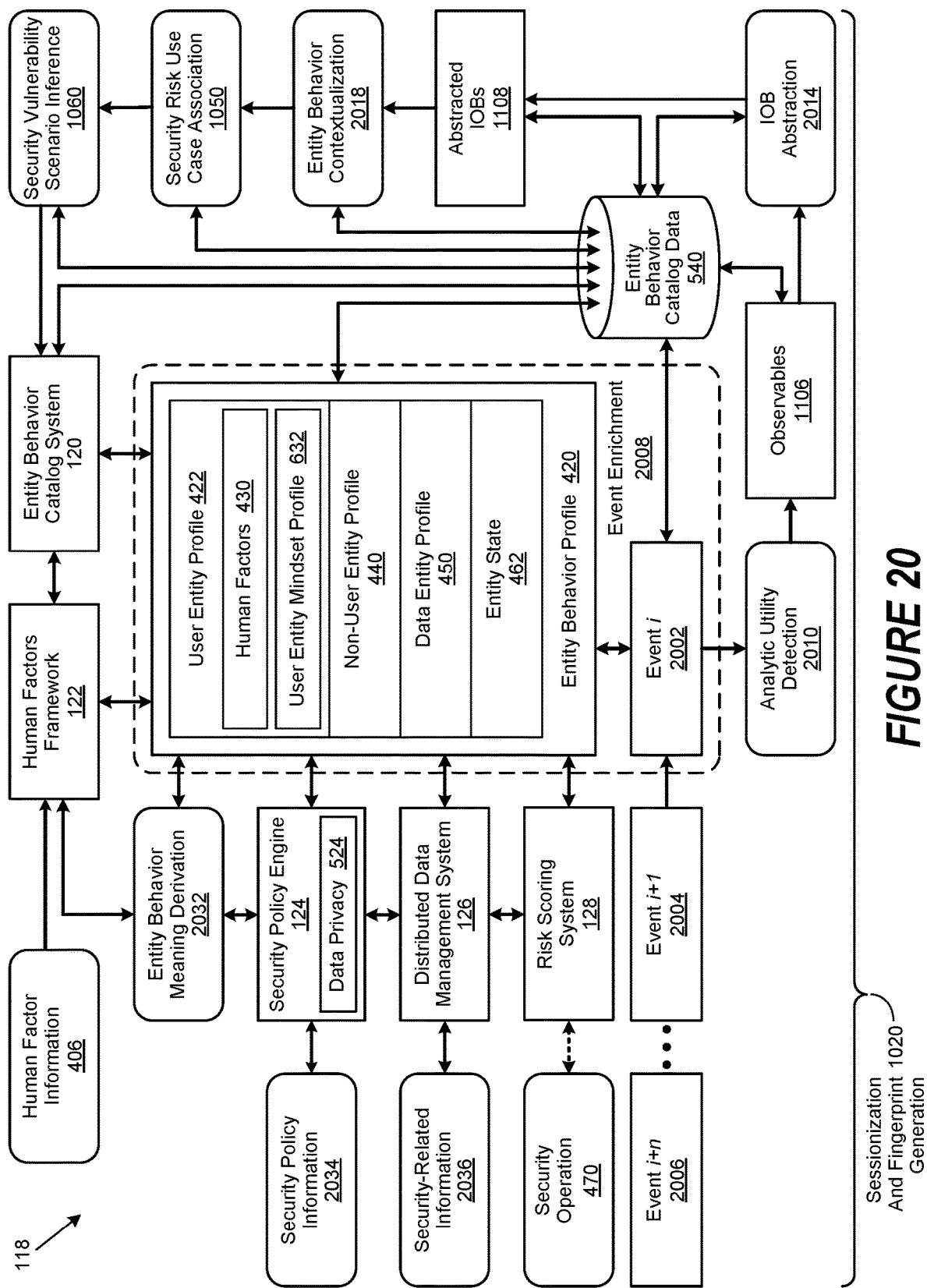
FIG. 20 shows a functional block diagram of process flows associated with the operation of a security analytics system.

FIG. 20 shows a functional block diagram of process flows associated with the operation of a security analytics system implemented in accordance with an embodiment of the invention. In certain embodiments, as described in greater detail herein, a security analytics system 118, described in greater detail herein, may be implemented to include an EBC system 120, a human factors framework 122, a security policy engine 124, a distributed data management system 126, and a risk scoring system 128, or a combination thereof. In various embodiments, the EBC system 120 may be implemented to perform certain EBC operations. In various embodiments, the EBC operations may include the cataloging of certain entity behaviors, described in greater detail herein.

In certain embodiments, the EBC operations may include the definition and management of an entity behavior profile (EBP) 420, as likewise described in greater detail herein. In certain embodiments, the EBP 420 may be implemented to include a user entity profile 422, a non-user entity profile 440, a data entity profile 450, and an entity state 462, or a combination thereof, as likewise described in greater detail herein. In certain embodiments, the user entity profile 422 may be implemented to include certain human factors 430 information, and user entity mindset profile 632 information, as described in greater detail herein.

In certain embodiments, security analytics system 118 operations are begun with the receipt of information associated with an initial event i 2002. In various embodiments, information associated with an initial event i 2002 may include certain user entity profile 422 information, non-user entity profile 440 information, data entity profile 450 information, and entity state 462 information, or a combination thereof. In various embodiments, the information associated with an initial event i 2002 may likewise include certain contextual and temporal information, described in greater detail herein, or a combination thereof. In various embodiments, the user entity profile 422 information may include certain human factors 430 information, or user entity mindset profile 632 information, or both.

In various embodiments, certain user entity profile 422 information, non-user entity profile 440 information, data entity profile 450 information, entity state 462 information, contextual information, and temporal information, or a combination thereof, may be stored in a repository of EBC data 540. In various embodiments, certain information stored in the repository of EBC data 540 may be retrieved and then used to perform event enrichment 2008 operations to enrich the information associated with event i 2002.

In certain embodiments, analytic utility detection 2010 operations may be performed on the resulting enriched event i 2002 to determine whether it is of analytic utility. If so, then it is derived as an observable 1106, described in greater detail herein. In certain embodiments, event i+1 2004 through event i+n 2006, may in turn be received by the EBC system 120 and be enriched 2008. Analytic utility detection 2010 operations may then be performed on the resulting enriched event i+1 2004 through event i+n 2006 to determine whether they are of analytic utility. Observables 1106 may then be derived from those that are.

In various embodiments, certain indicator of behavior (IOB) abstraction 2314 operations may be performed on the resulting observables 1106 corresponding to events i 2002, i+1 2004, and i+n 2006 to generate an associated IOB 1108, described in greater detail herein. In various embodiments, an IOB 1108 may be expressed in a Subject→Action→Object format and associated with observables 1106 resulting from event information provided by various EBC data sources, likewise described in greater detail herein. In certain embodiments, an IOB abstraction 2014 operation may be performed to abstract away EBC data source-specific knowledge and details when expressing an entity behavior. For example, rather than providing the details associated with a "Windows:4624" non-user entity event, its details may be abstracted to a "User Login To Device" IOB 1108.

In various embodiments, sessionization and fingerprint 1020 operations, described in greater detail herein, may be performed on event information corresponding to events i 2002, i+1 2004, i+n 2006, their corresponding observables 1106, and their associated IOBs 1108, or a combination thereof, to generate session information. In various embodiments, the resulting session information may be used to associate certain events i 2002, i+1 2004, i+n 2006, or their corresponding observables 1106, or their corresponding IOBs 1108, or a combination thereof, with a particular session.

In certain embodiments, as likewise described in greater detail herein, one or more IOBs 1108 may in turn be associated with a corresponding EBP element. In various embodiments, the previously-generated session information may be used to associate the one or more IOBs 1108 with a particular EBP element. In certain embodiments, the one or more IOBs 1108 may be associated with its corresponding EBP element through the performance of an EBP management operation performed by the EBC system 120. Likewise, in certain embodiments, one or more EBP elements may in turn be associated with the EBP 420 through the performance of an EBP management operation performed by the EBC system 120.

In various embodiments, certain contextualization information stored in the repository of EBC data 540 may be retrieved and then used to perform entity behavior contextualization 2018 operations to provide entity behavior context, based upon the entity's user entity profile 422, or non-user entity profile 440, or data entity profile 450, and their respectively associated entity state 462, or a combination thereof. In various embodiments, certain security risk use case association 1050 operations may be performed to associate an EBP 420 with a particular security risk use case, described in greater detail herein. In certain embodiments, the results of the previously-performed entity behavior contextualization 2018 operations may be used to perform the security risk use case association 1050 operations.

In various embodiments, security vulnerability scenario inference 1060 operations may be performed to associate a security risk use case with a particular security vulnerability scenario, described in greater detail herein. In various embodiments, certain observables 1106 derived from events of analytic utility may be used to perform the security vulnerability scenario inference 1060 operations. In various embodiments, certain entity behavior contexts resulting from the performance of the entity behavior contextualization 2018 operations may be used to perform the security vulnerability scenario inference 1060 operations.

In certain embodiments, entity behavior meaning derivation 2032 operations may be performed on the security vulnerability behavior scenario selected as a result of the performance of the security vulnerability scenario inference 1060 operations. As used herein, an entity behavior meaning derivation 2032 operation broadly refers to any operation performed to derive context and relevance from a particular behavior of an associated entity. In certain embodiments, the entity behavior meaning derivation 2032 operations may be performed by the human factors framework 122. In certain embodiments, the human factors framework 122 may be implemented to receive a stream of human factors information 406, as described in greater detail herein. In certain embodiments, the human factors framework 122 may be implemented to process the stream of human factors information 406 to derive certain human factors 430, and once derived, store them in an associated user entity profile 422. In certain embodiments, the human factors framework 122 may be implemented to perform the entity behavior meaning derivation 2032 operation in combination with the EBC system 120.

In certain embodiments, the entity behavior meaning derivation 2032 operations may be performed by analyzing the contents of the EBP 420 in the context of the security vulnerability behavior scenario selected as a result of the performance of the security vulnerability scenario inference 1060 operations. In certain embodiments, the human factors framework 122 may be implemented to perform the entity behavior meaning derivation 2032 operations by analyzing certain information contained in the EBP 420. In certain embodiments, the human factors framework 122 may be implemented to perform the entity behavior meaning derivation 2032 operations by analyzing certain human factors 430 and user entity mindset profile 632 information stored in the user entity profile 422 to derive the intent of a particular user entity behavior. In certain embodiments, the derivation of entity behavior meaning may include inferring the intent of an entity associated with event i 2002 and event i+1 2004 through event i+n 2006.

In certain embodiments, the security policy engine 124 may be implemented to perform the entity behavior meaning derivation 2032 operations by analyzing certain security policy information, described in greater detail herein, stored in the entity's associated EBP 420. In certain embodiments, the security policy engine 124 may be implemented to work in combination with the human factors framework 124 to perform the entity behavior meaning derivation 2032 operation. In various embodiments, as described in greater detail herein, the security policy engine 124 may be implemented to include a data privacy module 524. In certain of these embodiments, the data privacy module 524 may be implemented to protect the privacy of a user entity during the performance of an associated entity behavior meaning derivation 2032 operation.

In various embodiments, the security policy engine 124 may be implemented to provide and receive certain security policy information to and from other components of a distributed security analytics framework, described in greater detail herein. In various embodiments, certain security policy information 2034 received from other components of the distributed security analytics framework may be used by the security policy engine 124 in the performance of an entity behavior meaning derivation 2032 operation. In various embodiments, the security policy engine 124 may be implemented to use certain security-related information 2036 to perform the entity behavior meaning derivation 2032 operation. In certain embodiments, the security policy engine 124 may be implemented to receive the security-related information 2036 from the distributed data management system 126. In certain embodiments, the distributed data management system 126 may be implemented to receive the security-related information 2036 from other components of a distributed security analytics framework.

In various embodiments, performance of the entity behavior meaning derivation 2032 operations may result in the performance of a security risk assessment operation, described in greater detail herein. In various embodiments, the risk scoring system 128 may be implemented to perform the security risk assessment operation. In certain embodiments, the security risk assessment operation may be performed to assess the security risk associated with the enactment of a particular entity behavior. In certain embodiments, the security risk assessment operation may be implemented as a human factors 430 risk assessment operation, described in greater detail herein, to assess the risk associated with the enactment of an entity behavior by an associated user entity.

In various embodiments, the risk scoring system 128 may be implemented to use certain security-related information 2036 in the performance of a particular security risk assessment operation. In certain embodiments, the risk scoring system 128 may be implemented to receive the security-related information 2036 from the distributed data management system 126. In various embodiments, the risk scoring system 128 may be implemented to use certain security-related information 2036 and security policy information 2034, in combination with other information stored in an entity's associated EBP 420, to perform the security risk assessment operation.

In certain embodiments, the risk scoring system 128 may be implemented to use certain security risk assessment information resulting from the performance of a security risk assessment operation to generate a security risk score. In certain embodiments, a security risk score meeting certain security risk parameters may result in the performance of an associated security operation 470, described in greater detail herein. In certain embodiments, the security operation 470 may include a cyber kill chain operation, or a risk-adaptive protection operation, or both. In certain embodiments, the cyber kill chain operation may be performed to disrupt the execution of a cyber kill chain, described in greater detail herein. In certain embodiments, the risk-adaptive protection operation may include adaptively responding with an associated risk-adaptive response, as described in greater detail herein.

In various embodiments, the security operation 470 may include certain risk mitigation operations being performed by a security administrator. As an example, performance of the security operation 470 may result in a notification being sent to a security administrator alerting them to the possibility of suspicious behavior. In certain embodiments, the security operation 470 may include certain risk mitigation operations being automatically performed by a security analytics system or service. As an example, performance of the security operation 470 may result in a user's access to a particular system being disabled if an attempted access occurs at an unusual time or from an unknown device.

In certain embodiments, meaning derivation information associated with event i 2002 may be used to update the user entity profile 420, non-user entity profile 440, or data entity profile 450 corresponding to the entity associated with event i 2002. In certain embodiments, the process is iteratively repeated, proceeding with meaning derivation information associated with event i+1 2004 through event i+n 2006. From the foregoing, skilled practitioners of the art will recognize that a user entity profile 420, non-user entity profile 440, or data entity profile 450, or some combination thereof, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 21:
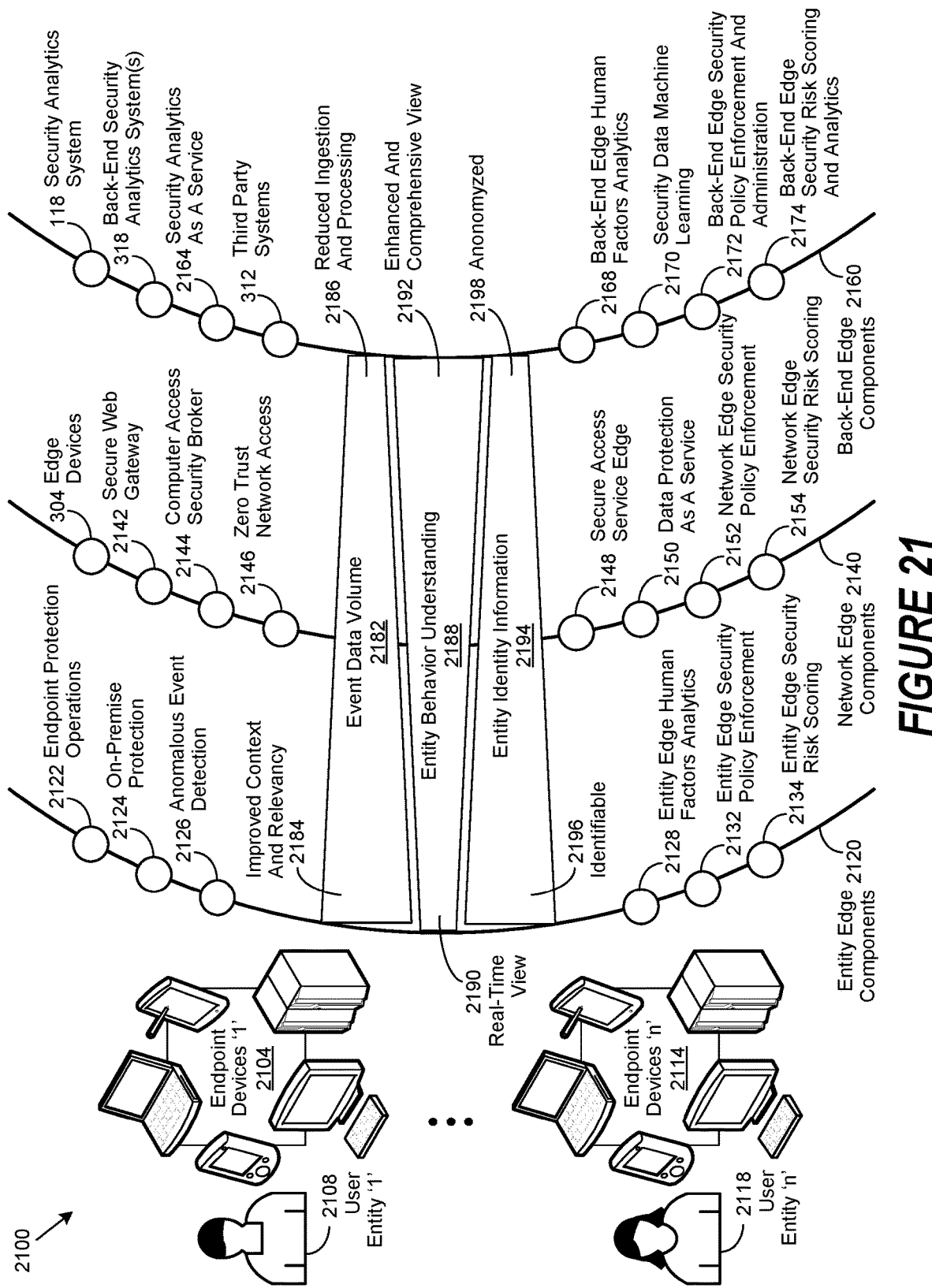
FIG. 21 shows a simplified block diagram of a distributed security analytics framework.

FIG. 21 shows a simplified block diagram of a distributed security analytics framework implemented in accordance with an embodiment of the invention. In certain embodiments, the distributed security analytics framework 2100, described in greater detail herein, may be implemented to perform a distributed security analytics operation, likewise described in greater detail herein. In certain embodiments, the distributed security analytics framework 2100 may include the use of a wide area network (WAN), a local area network (LAN), or a personal area network (PAN), or a combination thereof, to perform the distributed security analytics operation. In certain embodiments, the WAN may be public network, such as the Internet or a cellular network, or a private network, such as a corporate intranet, or a virtual WAN, such as a software-defined WAN (SD-WAN), a virtual private network (VPN), or a combination thereof. In certain embodiments, the LAN may be a physical network, or a wireless network, such as a Wireless Fidelity (WiFi) LAN, or a combination thereof.

In certain embodiments, a distributed security analytics framework 2100 may be implemented to include one or more entity edge components 2120, one or more network edge components 2140, and one or more back-end edge components 2160, or a combination thereof. As used herein, an edge component broadly refers to a point of interaction between an entity and the distributed security analytics framework 2100 during an associated entity interaction, described in greater detail herein. As likewise used herein, an entity edge component 2120 broadly refers to a component of the distributed security analytics framework 2100 that resides outside of a WAN.

In certain embodiments, an entity edge component 2120 may be implemented as an endpoint device, described in greater detail herein. In certain embodiments, a particular endpoint device, such as endpoint device '1' 2104 through 'n' 2114, may respectively be used by user entities '1' 2108 through 'n' 2118. In various embodiments, one or more of the endpoint devices '1' 2104 through 'n' 2114 may be implemented as a non-user entity, likewise described in greater detail herein. In various embodiments, certain such endpoint devices '1' 2104 through 'n' 2114 may be implemented to act autonomously. In various embodiments, certain endpoint devices '1' 2104 through 'n' 2114 may be implemented to operate within a LAN environment, a WiFi environment, a cellular network environment, or a combination thereof.

In various embodiments, a particular entity edge component 2120, such as a protected endpoint, described in greater detail herein, may be implemented to perform certain endpoint protection operations 2122. In various embodiments, an entity edge component 2120, such as a firewall or intrusion protection system (IPS), may be implemented to perform certain on-premise protection operations 2124 known to those of skill in the art. In various embodiments, an entity edge component 2120, such as an event detection system, described in greater detail herein, may be implemented to perform certain anomalous event detection operations 2126.

In various embodiments, an entity edge component, such as a human factors framework, described in greater detail herein, may be implemented to perform certain human factors analytics operations 2128, likewise described in greater detail herein. In various embodiments, an entity edge component 2120, such a security policy engine, described in greater detail herein, may be implemented to perform certain entity edge security policy enforcement operations 2132, likewise described in greater detail herein. In various embodiments, an entity edge component 2120, such a security risk scoring system, described in greater detail herein, may likewise be implemented to perform certain entity edge security risk scoring 2134 operations, likewise described in greater detail herein.

As likewise used herein, a network edge component 2140 broadly refers to a component of the distributed security analytics framework 2100 that resides at a point of access on the periphery of a WAN. In certain embodiments, a network edge component 2140 may be implemented as an edge device 304, described in greater detail herein. In various embodiments, a network edge component 2140 may be implemented to perform certain secure web gateway (SWG) operations 2142. Skilled practitioners of the art will be familiar with the functionality of an SWG, which as typically implemented prevents unsecured traffic from entering the internal network of an organization, and by doing so, assists in protecting users from becoming infected by exposure to malicious web traffic, or malware, or both, as a result of accessing certain websites.

In various embodiments, a network edge component 2140 may be implemented to perform certain cloud access security broker (CASB) operations 2144 familiar to those of skill in the art. In various embodiments, a network edge component 2140 may be implemented to perform certain zero trust network access (ZTNA) operations 2146. Skilled practitioners of the art will be familiar with the concept of ZTNA, also commonly referred to a software-defined perimeter (SDP), which as typically implemented operates on an adaptive trust model, where trust is never implicit, and access to the network is granted on a least-privileged basis defined by granular security policies.

In various embodiments, certain operations performed by an SWG 2142, a CASB 2144, or a ZTNA 2146 implemented as a network edge component 2140, or a combination thereof, may be combined with certain WAN capabilities known to those of skill in the art, to establish a secure access service edge (SASE) 2148. Those of skill in the art will be familiar with the concept of a SASE 2148, which as typically implemented supports the secure network access needs of an organization, primarily based upon the identity of the entity, real-time context, and compliance with security policies. In certain embodiments, a SASE 2148 may be implemented to identify sensitive data, or malware, and decrypt content at line speed while enabling continuous monitoring of sessions, described in greater detail herein, for assessing entity risk and trust levels.

In certain embodiments, a SASE 2148 may be implemented to provide Data Protection as a Service (DPaaS) 2150. In certain embodiments, such DPaaS 2150 may be implemented to dynamically provide network edge protection. In various embodiments, a network edge component

2140, such as a security policy engine, described in greater detail herein, may be implemented to perform certain network edge security policy enforcement operations 2152. In various embodiments, a network edge component 2140, such a security risk scoring system, described in greater detail herein, may likewise be implemented to perform certain network edge security risk scoring operations 2154, likewise described in greater detail herein.

A back-end edge component 2160, as likewise used herein, broadly refers to a component of the distributed security analytics framework 2100 that resides at an internal node of a WAN. In various embodiments, a back-end edge component 2160 may be implemented as a security analytics system 118, described in greater detail herein. In various embodiments, a back-end component 2160 may be implemented as a back-end security analytics system 318, likewise described in greater detail herein. In certain embodiments, the security analytics system 118 and the back-end security analytics system 318 may respectively be implemented to perform a security analytics operation and a back-end security analytics operation, as likewise described in greater detail herein. In certain embodiments, the security analytics system 118 may be implemented to offer the performance of one or more security analytics operations in the form of Security Analytics as a Service (SAaaS) 2164.

In certain embodiments, one or more back-end edge components, individually or in combination, may be implemented to maintain an entity behavior catalog (EBC), described in greater detail herein. In certain embodiments, In certain embodiments, certain EBC data, likewise described in greater detail herein, may be distributed across one or more entity edge components 2120, one or more network edge components 2140, or one or more back-end edge components 2160, or a combination thereof. In certain embodiments, the one or more entity edge components 2120, or the one or more network edge components 2140, or the one or more back-end edge components 2160, or a combination thereof, may be implemented to maintain their respective share of such distributed EBC data.

In certain embodiments, the one or more entity edge components 2120, or the one or more network edge components 2140, or a combination thereof, may be implemented to communicate their respective share of such distributed EBC data to the one or more back-end edge components 2160. In certain embodiments, EBC data communicated by the one or more entity edge components 2120, or the one or more network edge components 2140, or a combination thereof, may be consolidated by a particular back-end edge component 2160 into a single EBC. In various embodiments, one or more back-end edge components may be implemented to logically aggregate certain EBC data distributed across one or more entity edge components 2120, or one or more network edge components 2140, or a combination thereof, into a logically-aggregated EBC.

In various embodiments, a back-end component 2160 may be implemented as a third party system 312, described in greater detail herein. In various embodiments, a back-end edge component 2160 may be implemented to perform certain human factors analytics operations 2166, likewise described in greater detail herein. In various embodiments, a back-end edge component 2160 may be implemented to perform certain security data machine learning operations 2168 familiar to those od skill in the art. In various embodiments, a back-end edge component 2160, such as a security policy engine, described in greater detail herein, may be implemented to perform certain back-end edge security policy administration and enforcement operations 2172. In various embodiments, a back-end edge component 2160, such a security risk scoring system, described in greater detail herein, may be implemented to perform certain network edge security risk scoring and analytics operations 2174, likewise described in greater detail herein.

In various embodiments, one or more components of the distributed security analytics framework 2100, individually or in combination, may be implemented to monitor actions enacted by a particular entity. In certain embodiments, such monitoring may include observing at least one electronically-observable data source, as described in greater detail herein. In these embodiments, the one or more components of the distributed security analytics framework 2100 selected to monitor the actions, in whole or in part, and the at least one electronically-observable data source selected to observe, is a matter of design choice. In various embodiments, the results of such monitoring, in whole or in part, may be processed by certain components of the distributed security analytics framework 2100 to identify an associated event of analytic utility, as described in greater detail herein. In these embodiments, the one or more components of the distributed security analytics framework 2100 selected to process the results of the monitoring, in whole or in part, to identify an associated event of analytic utility is a matter of design choice.

In certain embodiments, as described in greater detail herein, an identified event of analytic utility may be analyzed, in whole or in part, by one or more components of the distributed security analytics framework 2100 to identify an associated entity behavior, likewise described in greater detail herein. In these embodiments, the one or more components of the distributed security analytics framework 2100 selected to analyze an event of analytic utility, in whole or in part, to identify an associated entity behavior is a matter of design choice. In certain embodiments, a security operation, described in greater detail herein, may be performed, in whole or in part, by one or more components of the distributed security analytics framework 2100 as a result of identifying a particular entity behavior. In these embodiments, the one or more components of the distributed security analytics framework 2100 selected to perform a security operation, in whole or in part, as a result of identifying a particular entity behavior is a matter of design choice.

In certain embodiments, an entity edge component 2120, a network edge component 2140, and a back-end edge component 2160, may respectively be implemented to perform an entity edge operation, a network edge operation, and a back-end edge operation. As used herein, an entity edge operation, a network edge operation, and a back-end edge operation broadly refer to any operation that may be directly involved in, or indirectly in support of, the performance of a security analytics operation. In certain embodiments, certain entity edge operations, network edge operations, or back-end operations, or a combination thereof, may be performed, in whole or in part, in support of a particular security operation.

In various embodiments, one or more entity edge components 2120, or one or more network edge components 2140, or a combination thereof, may be implemented to collect event data associated with monitoring the enactment of certain events by an associated entity. Certain embodiments of the invention reflect an appreciation that the collection and analysis of larger volumes 2182 of such event data may lead to an improved understanding of the context and relevancy 2184 of a particular entity behavior exhibited or enacted by an associated entity. Certain embodiments of the invention likewise reflect an appreciation that substantial volumes 2182 of event data may be generated as a result, and will likely increase proportionately as the number of monitored entities, or associated events, grows.

As an example, a security analytics service provider may have a customer base that includes 250,000 monitored entities. In this example, the amount of event data generated from monitoring the entities could be as much as a petabyte per day. Skilled practitioners of the art will appreciate that the conveyance of this volume of data from a multitude of entity edge components 2120 to a corresponding multitude of network edge components 2140, and from there to a particular back-end edge component 2160 for processing could consume significant WAN resources. Furthermore, its subsequent storage and processing by one or more back-end edge components 2160 could likewise consume equally significant amounts of computing resources. Moreover, the useful life of such data may be limited (e.g. ~45 days), and as a result, the cost of its ongoing retention may not be justified.

Accordingly, in various embodiments, certain security analytics operations may be performed by one or more entity edge components 2120, or one or more network edge components 2140, or a combination thereof, to provide improved context and relevancy 2184 for the occurrence of an associated event. Likewise, in various embodiments, certain security analytics operation may be performed by one or more entity edge components 2120, or one or more network edge components 2140, or a combination thereof, to reduce the ingestion and processing 2186 of certain event data used to perform an associated security analytics operation by one or more corresponding back-end edge components 2160. In these embodiments, the security analytics operations respectively performed by a particular entity edge component 2120, network edge component 2140, or back-end edge component 2160, in whole or in part, to provide such improved context and relevancy 2184, or to reduce such ingestion and processing 2186, is a matter of design choice.

In certain embodiments, event data associated with certain security analytics operations performed by one or more entity edge components 2120, or one or more network edge components 2140, may be normalized, combined, correlated, or abstracted, or some combination thereof. In certain embodiments, the resulting normalized, combined, correlated, or abstracted, or some combination thereof, event data may then be provided to one or more back-end edge components 2160. In certain embodiments, the resulting normalized, combined, correlated, or abstracted, or some combination thereof, event data may be provided to one or more back-end edge components in form of security analytics summary data. In certain embodiments, the resulting normalized, combined, and correlated, or some combination thereof, event data may be provided to one or more back-end edge components 2160 for use in the performance of a security analytics operation.

As an example, certain event data associated with the enactment of a particular event enacted by a corresponding entity may be collected by one or more entity edge components 2120. In this example, rather than the event data being communicated to one or more back-end edge components 2160 for use in the performance of a security analytics operation, it is instead used by the one or more entity edge components to perform the same, or an associated, security analytics operation. To continue the example, the event data may be processed by the one or more entity edge components 2120 to generate an indicator of behavior (IOB), described in greater detail herein, which is then communicated to the one or more back-end components 2160 for use in an associated security analytics operation.

From the foregoing, skilled practitioners of the art will recognize the volume of data ingested and processed 2186 by the one or more back-end edge components 2160 for use in the performance of an associated security analytics operation may be reduced by as much as an order of magnitude, or more. In various embodiments, the results of a preliminary security analytics operation performed by one or more back-end edge components 2160 may indicate that additional event data may be needed for a more accurate assessment of risk associated with the enactment of a particular event by an associated entity. In certain of these embodiments, the one or more back-end-edge components 2160 may be implemented to retrieve more detailed event data from the one or more entity edge components 2120, or network edge components 2140, that performed the preliminary security analytics operation.

In certain embodiments, the retrieved event data may then be used by the one or more back-end edge components 2160 to perform more comprehensive security analytics operations to assess the risk associated with the enactment of the event. In certain embodiments, the performance of such security analytics operations by one or more entity edge components 2120, or one or more network edge components 2140, or a combination thereof, may provide a more real-time entity behavior understanding 2188 of an entity's behavior. Likewise, the use of more detailed event information retrieved from the entity edge components 2120, or the network edge components 2140, or both, by the one or more back-end edge components 2160 when performing the more comprehensive security analytics operations may result in an enhanced and comprehensive view 2188 of an entity's behavior.

In various embodiments, a particular entity edge component 2120 may be implemented to maintain certain entity identity information 2194 related to monitoring a plurality of actions corresponding to a plurality of events enacted by an associated entity. As used herein, entity identity information 2194 broadly refers to any information usable to directly, or indirectly, ascertain the identity of an entity. In certain embodiments, entity identity information 2194 associated with a user entity may be sensitive personal information (SPI), also commonly referred to as personally identifiable information (PII), described in greater detail herein.

In various embodiments, certain entity identity information 2194 associated with a non-user entity may be used to determine the identity of another entity. As an example, a mobile phone may have an associated International Mobile Equipment Identity (IMEI) serial number, which is linked to the mobile device's assigned phone number, which in turn is linked to a user's account, which has associated entity identity information 2194 related to the user. In this example, the IMEI serial number is entity identity information 2194 associated with a non-user entity, which can be used to indirectly ascertain entity identity information 2194 associated with a corresponding user entity.

In various embodiments, certain entity identity information 2194 associated with a data entity may be used to determine the identity of another entity. As an example, an email message may contain the names of one or more individuals, each of which has a corresponding Social Security Number (SSN). In this example, the name of each individual within the email message, and their corresponding SSN, is entity identity information 2194 associated with a data entity, which can be used to directly ascertain entity identity information 2194 associated with a corresponding user entity.

In certain embodiments, the amount, and kind of entity identity information 2194 that is maintained, the duration of time it is maintained, and the method by which it is maintained, is a matter of design choice. In certain embodiments, an entity edge component 2120 may be implemented to identify an associated event of analytic utility from the monitored actions performed by the entity, as described in greater detail herein. In various embodiments, the entity edge component 2120 may likewise be implemented to perform certain security analytics operations, described in greater detail herein, to generate a security risk assessment, likewise described in greater detail herein, for a particular identified event of analytic utility. In certain embodiments, the entity edge component 2120 may likewise be implemented to provide the resulting security risk assessment to a particular network edge component.

In various embodiments, an entity edge component 2120 may be implemented to perform an identity information anonymization operation to anonymize certain identifiable 2196 entity identity information 2194 to generate anonymized 2198 entity identity information 2194. In various embodiments, the identity anonymization operation may include pseudomization, redaction, tokenization, or encryption, or a combination thereof, certain elements of an entity's associated entity identity information 2194. In certain embodiments, an entity information anonymization operation may be implemented to pseudomize certain identifiable 2196 entity identity information 2194 such that it conforms to the General Data Protection Regulation (GDPR), which will be familiar to skilled practitioners of the art.

In certain embodiments, the entity edge component 2120 may likewise be implemented to provide the resulting anonymized 2198 entity identity information 2194 to a particular network edge component 2140. In certain embodiments, a particular network edge component 2140 may be implemented to use such anonymized 2198 entity identity information 2194 to perform a security operation. In various embodiments, the network edge component 2140 may be implemented to request certain de-anonymized, or identifiable 2196, entity identity information 2194 from the entity edge component 2120 that provided it if performance of the security operation generates a particular indication of security risk corresponding to the associated entity.

In various embodiments, the request for certain de-anonymized, or identifiable 2196, entity identity information 2194 from the entity edge component 2120 may include a request for conditionally identifiable 2196 entity identity information 2194. As used herein, a conditionally identifiable 2196 entity identity information 2194 broadly refers to a request for certain identifiable 2196 entity identity information 2194 that is warranted by a particular indication of security risk corresponding to an associated entity. In certain embodiments, the identifiable 2196 entity identity information 2194 that is requested from an entity edge component 2120 may correspond to a particular indication of security risk corresponding to the associated entity. As an example, low or moderate indication of security risk may warrant the request of a user's employee number, while a high indication of security risk may warrant additional, or more detailed, identifiable 2196 entity identity information 2194, such as certain human factors information, described in greater detail herein, associated with the user. In certain embodiments, the security operation may include the performance of a meaning derivation operation, described in greater detail herein.

In various embodiments, a network edge component 2140 may be implemented to provide certain anonymized 2198 entity identity information 2194 to a particular back-end edge component 2160. In certain of these embodiments, a particular back-end edge component 2160 may be implemented to use such anonymized 2198 entity identity information 2194 to perform a security operation. In various embodiments, the back-end edge component 2160 may be implemented to request certain de-anonymized, or identifiable 2196, entity identity information 2194 from the entity edge component 2120 that provided it if performance of the security operation generates a particular indication of security risk corresponding to the associated entity. In certain embodiments, the security operation may include the performance of a meaning derivation operation, described in greater detail herein. Those of skill in the art will recognize that many such examples and embodiments are possible. Accordingly, the foregoing is not intended to limit the spirit, scope, or intent of the invention.

Figure 22A:
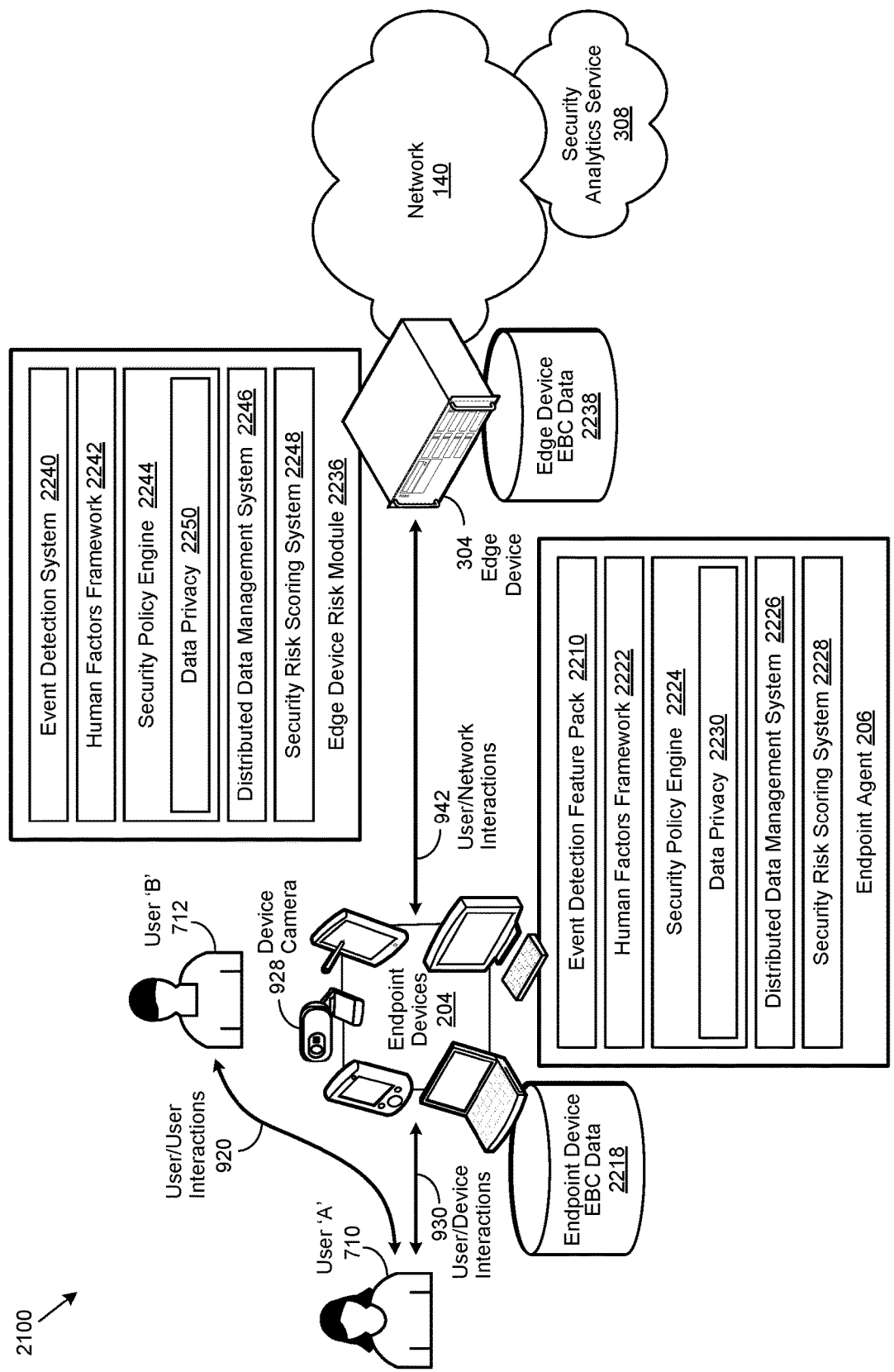
FIGS. 22a and 22b show certain components of a distributed security analytics framework.
Figure 22B:
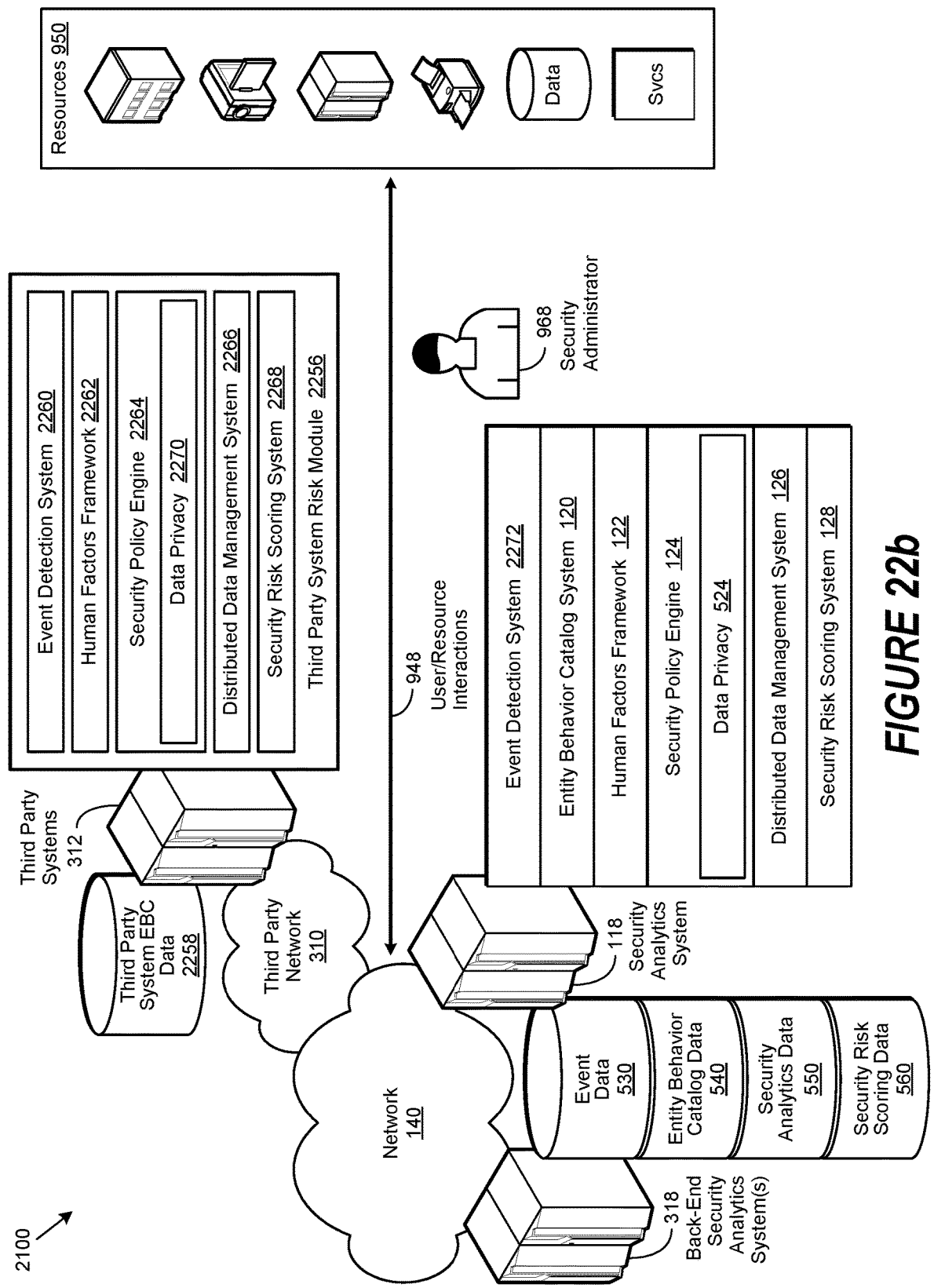

FIGS. 22a and 22b show certain components of a distributed security analytics framework implemented in accordance with an embodiment of the invention. In various embodiments, the distributed security analytics framework 2100 may be implemented to include one or more endpoint devices 204, one or more edge devices 304, one or more networks 140, a security analytics system 118, one or more back-end security analytics systems 318, one or more security analytics services 308, one or more third party networks 310, one or more third party systems 312, and certain resources 950, or a combination thereof, as described in greater detail herein. In various embodiments, certain components of the distributed security analytics framework 2100 may be implemented to perform a security analytics operation, or a security operation, both of which are described in greater detail herein.

In certain embodiments, individual endpoint devices 204, edge devices 304, and third party systems 312 may respectively be implemented to include an associated repository of endpoint device entity behavior catalog (EBC) data 2218, edge device EBC data 2238, and third party system EBC data 2218. In certain embodiments, the security analytics system 118 may be implemented to include an event detection system 2272, an EBC system 120, a human factors framework 122, a security policy engine 124, a distributed data management system 126, and a security risk scoring system 128, or a combination thereof. In certain embodiments, the security policy engine 124 may be implemented to include a data privacy module 524, likewise described in greater detail herein.

In certain embodiments, the security analytics system 118 may be implemented to include a repository of event data 530, a repository of EBC data 540, a repository of security analytics 550 data, or a repository of security risk scoring data 560, or a combination thereof. In certain embodiments, the repository of event data 530, a repository of EBC data 540, a repository of security analytics 550 data, or a repository of security risk scoring data 560, or a combination thereof may be shared with one or more back-end security analytics systems 318. In various embodiments, the security analytics system 118 and the one or more back-end security analytics systems 318 may be implemented to use certain data stored in the repository of event data 530, the repository of EBC data 540, the repository of security analytics 550 data, or the repository of security risk scoring data 560, or a combination thereof, to respectively perform a security analytics operation or a back-end security analytics operation, both of which are described in greater detail herein.

In various embodiments, certain components of the distributed security analytics framework 2100 may be implemented, individually or in combination, to monitor entity behavior associated with a user entity, such as a user 'A' 710 or user 13' 712, a non-user entity, a data entity, or a combination thereof. In certain embodiments, the user, non-user, or data entity behavior, or a combination thereof, may be monitored during user/device 930, user/network 942, user/resource 948, and user/user 920 interactions. In certain embodiments, the user/user 920 interactions may occur between a first user entity, such as user 'A' 710 and a second user entity, such as user 13' 912.

In various embodiments, the event detection system 2272 may be implemented to detect certain event data associated with user/device 930, user/network 942, user/resource 948, and user/user 920 interactions. In certain embodiments, the event detection system 2272 may be implemented to collect certain detected event information. In various embodiments, the security analytics system 118, or the event detection system 2272, or the EBC system 120, individually or in combination, may be implemented as described in greater detail herein to process certain collected event information to generate entity behavior information associated with one or more entities.

In various embodiments, the EBC system 120, as described in greater detail herein, may be implemented to use such entity behavior information, and associated event data, to generate an entity behavior profile (EBP), as described in greater detail herein. In various embodiments, the security analytics system 118 may in turn be implemented to use one or more such EBPs in the performance of security analytics operations to detect certain anomalous user, non-user, or data entity behavior, as likewise described in greater detail herein. In various embodiments, as likewise described in greater detail herein, certain components of the distributed security analytics framework 2100 may be implemented to use such anomalous user, non-user, or data entity behavior information to assess the security risk corresponding to a particular indicator of behavior (JOB).

In various embodiments, the human factors framework 122 may be implemented to provide certain human factors information, described in greater detail herein, to the security analytics system 118 or other components of the distributed security analytics framework 2100. In various embodiments, the security analytics system 118, or other components of the security analytics framework 2100 may be implemented to use such human factors information to perform certain human factors risk operations, likewise described in greater detail herein. In various embodiments, certain human factors risk operations performed by the security analytics system 118 may be used to assess the security risk associated with a corresponding JOB, as described in greater detail herein. In certain embodiments, the security risk corresponding to a particular IOB may be associated with one or more user entities, likewise as described in greater detail herein.

In certain embodiments, as likewise described in greater detail herein, the event detection system 2272, the EBC system 120, the human factors framework 122, the security policy engine 124, the distributed data management system 126, and the security risk scoring system 128, or a combination thereof, may be used in combination with the security analytics system 118 to perform such human factors risk operations. In various embodiments, certain data stored in the repository of event data 530, the repository of EBC data 540, the repository of security analytics 550 data, or the repository of security risk scoring data 560, or a combination thereof, may be used by the security analytics system 118, the EBC system 120, the human factors framework 122, the security policy engine 124, the distributed data management system 126, and the risk scoring system 128, or some combination thereof, to perform the human factors risk operation.

In certain embodiments, the human factors framework 122 may be implemented to perform a human factors risk operation, described in greater detail herein. In various embodiments, as likewise described in greater detail herein, the human factors framework 122 may be implemented to use certain associated event information to perform the human factors risk operation. In certain embodiments, the event information may be stored in the repository of event 530 data. In various embodiments, the security risk scoring system 128 may be implemented to provide certain security risk scoring information stored in the repository of security risk scoring 560 data to the security analytics system 118 for use by the human factors framework 122. In certain embodiments, the data privacy module 524 may be implemented to anonymize certain entity identity information associated with a particular entity, as described in greater detail herein.

In various embodiments, the human factors framework 122 may be implemented, as described in greater detail herein, to manage certain human factors information relevant to the occurrence of an IOB, as described in greater detail herein. In various embodiments, as likewise described in greater detail herein, the human factors framework 122 may be implemented to provide certain human factors information relevant to the occurrence of a particular IOB to the EBC system 120, or the security policy engine 124, or the distributed data management system 126, or the risk scoring system 128, or a combination thereof. In certain embodiments, the human factors information provided by the human factors framework 122 to the EBC system 120, or the security policy engine 124, or the distributed data management system 126, or the security risk scoring system 128, or a combination thereof, may be used to assess the security risk associated with the occurrence of a particular IOB.

In various embodiments, the distributed data management system 126 may be implemented to provide, or receive, certain security-related information to and from other components of the distributed security analytics framework 2100. In these embodiments, the security-related information provided to, or received from, other components of the distributed security analytics framework 2100 is a matter of design choice. In various embodiments, as described in greater detail herein, the distributed data management system 126 may be implemented to receive certain EBC data stored in the repository of endpoint device EBC data 2218, the repository of edge device EBC data 2238, or the repository of third party EBC data 2258, or a combination thereof. In certain embodiments, the distributed data management system 126 may be implemented to provide such EBC data received from the repository of endpoint device EBC data 2218, the repository of edge device EBC data 2238, or the repository of third party EBC data 2258, or a combination thereof to the EBC system 120. In various embodiments, as described in greater detail herein, the security risk scoring system 128 may be implemented to use certain security-related information to generate a security risk score for an associated user, non-user, or data entity.

In certain embodiments, as described in greater detail herein, an endpoint agent 206 may be implemented on an endpoint device 204 to perform user entity, non-user entity, or data entity behavior, or a combination thereof, monitoring. In certain embodiments, the user entity, non-user entity, or data entity behavior, or a combination thereof, may be monitored by the endpoint agent 206 during user/device 930 interactions between a user entity, such as user 'A' 710, and an endpoint device 204. In certain embodiments, the user entity, non-user entity, or data entity behavior, or a combination thereof, may be monitored by the endpoint agent 206 during user/network 942 interactions between user 'A' 710 and a network, such as the network 140 or a third party network 310. In certain embodiments, the user entity, non-user entity, or data entity behavior, or a combination thereof, may be monitored by the endpoint agent 206 during user/resource 948 interactions between user 'A' 710 and a resource 950, such as a facility, printer, surveillance camera, system, datastore, service, and so forth.

In certain embodiments, the monitoring of user entity, non-user entity, or data entity behavior, or a combination thereof, by the endpoint agent 206 may include the monitoring of electronically-observable actions, or associated behavior, respectively enacted by a particular user entity, non-user entity, or data entity, or a combination thereof. In certain embodiments, the endpoint agent 206 may be implemented in combination with the security analytics system 118, the EBC system 120, the human factors framework 122, the security policy engine 124, the distributed data management system 126, and the security risk scoring system 128, or a combination thereof, to detect an IOB, assess its associated risk, or perform an associated security operation to mitigate risk, or a combination thereof.

In certain embodiments, the endpoint agent 206 may be implemented to include an event detection feature pack 2210 module, a human factors framework 2222 module, a security policy engine 2224 module, a distributed data management system 2226 module, and a security risk scoring 2228 module, or a combination thereof. In certain embodiments, the event detection feature pack 2210 may be implemented to detect event data associated with a particular endpoint device 204, as described in greater detail herein, resulting from user/device 930, user/network 942, user/resource 948, and user/user 920 interactions. In various embodiments, the event detection feature pack 2210 may be implemented to collect, or otherwise track, the occurrence of certain events, or classes of events, resulting from user/device 930, user/network 942, user/resource 948, and user/user 920 interactions. In various embodiments, the event detection feature pack 2210 module may be implemented to collect certain event data associated with the user/device 930, user/network 942, user/resource 948, and user/user 920 interactions.

In certain embodiments, the event detection feature pack 2210 module may be implemented to detect an event of analytic utility associated with events corresponding to the user/device 930, user/network 942, user/resource 948, and user/user 920 interactions. In various embodiments, the event detection feature pack 2210 module may be implemented to use certain security policy information provided by the security policy engine 2224 to determine whether a particular event associated with an endpoint device 204 is of analytic utility. In various embodiments, the event detection feature pack 2210 module may be implemented to perform certain IOB detection operations associated with events of analytic utility corresponding to the user/device 930, user/network 942, user/resource 948, and user/user 920 interactions.

In various embodiments, the event detection feature pack 2210 module may be implemented to detect and collect certain information associated with one or more events of analytic utility. In certain embodiments, the event detection feature pack 2210 module may be implemented to determine whether the one or more events of analytic utility are associated with one another. In various embodiments, the event detection feature pack 2210 module may be implemented to use such information in the performance of certain IOB detection operations, which in turn may result in the detection of an JOB. In certain embodiments, the event detection feature pack 2210 may be implemented to store any data it may collect or generate in the repository of endpoint device EBC data 2218.

In various embodiments, the human factors framework 2222 module may be implemented to receive certain human factors information, described in greater detail herein. In various embodiments, certain such human factors information may be provided by the security analytics system 118 or another component of the distributed security analytics framework 2100. In various embodiments, the human factors framework 2222 module may be implemented to provide certain human factors information to the security analytics system 118 or another component of the distributed security analytics framework 2100. In various embodiments, the human factors framework 2222 module may be implemented to use certain human factors information to perform a human factors risk operation, as likewise described in greater detail herein.

In certain embodiments, the security policy engine 2224 module may be implemented to manage security policy information relevant to determining whether a particular event is of analytic utility, anomalous, or both. In certain embodiments, the security policy engine 2224 module may be implemented to include a data privacy module 2230. In certain embodiments, as described in greater detail herein, the data privacy module 2230 may be implemented to protect the privacy of a user entity associated with a particular user entity behavior. In certain embodiments, the data privacy module 2230 may be implemented to perform an identity information anonymization operation, described in greater detail herein, to anonymize certain entity identity information, likewise described in greater detail herein. In certain embodiments, the data privacy module 2230 may be implemented to de-anonymize certain entity identity information prior to it being provided to another component of the distributed security analytics framework 2100. In certain embodiments, the security policy engine 2224 may be implemented to determine which entity identifiable information is permissible for the data privacy module 2230 to anonymize, or de-anonymize, and under what circumstances it may do so.

In various embodiments, the security policy engine 2224 module may be implemented to receive certain security policy information from the security analytics system 118 or another component of the distributed security analytics framework 2100. In various embodiments, the security policy engine 2224 module may be implemented to provide certain security policy information to the security analytics system 118 or another component of the distributed security analytics framework 2100. In certain embodiments, the security policy engine 2224 module may be implemented to determine whether a particular event of analytic utility associated with an endpoint device 204 is anomalous.

In various embodiments, the distributed data management system 2226 may be implemented to provide certain event and associated event counter data, certain data associated with the events of analytic utility, certain information associated with detected IOBs, certain human factors information, certain security policy information, and certain risk scoring information, or a combination thereof, to the security analytics system 118 or another component of the distributed security analytics framework 2100. In various embodiments, the distributed data management system 2226 may likewise be implemented to receive certain event and associated event counter data, certain data associated with the events of analytic utility, certain information associated with detected IOBs, certain human factors information, certain security policy information, and certain security risk scoring information, or a combination thereof, from the security analytics system 118 or another component of the distributed security analytics framework 2100. In certain embodiments, such event and associated event counter data, data associated with certain events of analytic utility, certain information associated with detected IOBs, certain human factors information, certain security policy information, or a combination thereof, received from the security analytics system 118, or another component of the distributed security analytics framework 2100, or both, may be used by the endpoint agent 206 in the performance of a security analytics operation, described in greater detail herein.

In certain embodiments, the security risk scoring system 2228 may be implemented to generate a security risk score, likewise described in greater detail, for an IOB corresponding to one or more events detected by the event detection feature pack 2210 module. In certain embodiments, the security risk scoring system 2228 may be implemented to generate a security risk score corresponding to a particular IOB when it is first detected by the event detection feature pack 2210 module. In certain embodiments, the security risk score corresponding to a particular IOB may be used as a component in the generation of a security risk score for an associated entity. In certain embodiments, the endpoint agent 206 may be implemented to provide one or more security risk scores to the security analytics system 118 or another component of the distributed security analytics framework 2100.

In certain embodiments, an edge device 304 may be implemented to include an edge device risk module 2236. In certain embodiments, the edge device risk module 2236 may be implemented to include an event detection system 2240, a human factors framework 2242 module, a security policy engine 2244 module, a distributed data management system 2246 module, and a security risk scoring system 2248, or a combination thereof. In certain embodiments, the event detection 2240 system may be implemented to collect, or otherwise track, the occurrence of certain events, or classes of events, resulting from user/device 930, user/network 942, user/resource 948, and user/user 920 interactions. In various embodiments, the event detection 2240 system may be implemented to collect certain event data associated with the user/device 930, user/network 942, user/resource 948, and user/user 920 interactions.

In certain embodiments, the event detection 2240 system may be implemented to detect an event of analytic utility associated with events corresponding to the user/device 930, user/network 942, user/resource 948, and user/user 920 interactions. In various embodiments, the event detection 2240 system may be implemented to use certain security policy information provided by the security policy engine 2244 to determine whether a particular event associated with an edge device 304 is of analytic utility. In various embodiments, the event detection 2240 system may be implemented to perform certain IOB detection operations associated with events of analytic utility corresponding to the user/device 930, user/network 942, user/resource 948, and user/user 920 interactions.

In various embodiments, the event detection 2240 system may be implemented to detect and collect certain information associated with one or more events of analytic utility. In certain embodiments, the event detection 2240 system may be implemented to determine whether the one or more events of analytic utility are associated with one another. In various embodiments, the event detection 2240 system module may be implemented to use such information in the performance of certain IOB detection operations, which in turn may result in the detection of an JOB.

In various embodiments, the human factors framework 2242 module may be implemented to receive certain human factors information, described in greater detail herein. In various embodiments, certain such human factors information may be provided by the security analytics system 118 or another component of the distributed security analytics framework 2100. In various embodiments, the human factors framework 2242 module may be implemented to provide certain human factors information to the security analytics system 118 or another component of the distributed security analytics framework 2100. In various embodiments, the human factors framework 2242 module may be implemented to use certain human factors information to perform a human factors risk operation, as likewise described in greater detail herein.

In certain embodiments, the security policy engine 2244 module may be implemented to manage security policy information relevant to determining whether a particular event is of analytic utility, anomalous, or both. In certain embodiments, the security policy engine 2244 module may be implemented to include a data privacy module 2250. In certain embodiments, as described in greater detail herein, the data privacy module 2250 may be implemented to protect the privacy of a user entity associated with a particular user entity behavior. In certain embodiments, the data privacy module 2250 may be implemented to perform an identity information anonymization operation, described in greater detail herein, to anonymize certain entity identity information, likewise described in greater detail herein. In certain embodiments, the data privacy module 2250 may be implemented to de-anonymize certain entity identity information prior to it being provided to another component of the distributed security analytics framework 2100. In certain embodiments, the security policy engine 2244 may be implemented to determine which entity identifiable information is permissible for the data privacy module 2250 to anonymize, or de-anonymize, and under what circumstances it may do so.

In various embodiments, the security policy engine 2244 module may be implemented to receive certain security policy information from the security analytics system 118 or another component of the distributed security analytics framework 2100. In various embodiments, the security policy engine 2244 module may be implemented to provide certain security policy information to the security analytics system 118 or another component of the distributed security analytics framework 2100. In certain embodiments, the security policy engine 2244 module may be implemented to determine whether a particular event of analytic utility associated with an endpoint device 204 is anomalous.

In various embodiments, the distributed data management system 2246 may be implemented to provide certain event and associated event counter data, certain data associated with the events of analytic utility, certain information associated with detected IOBs, certain human factors information, certain security policy information, and certain risk scoring information, or a combination thereof, to the security analytics 118 system or another component of the distributed security analytics framework 2100. In various embodiments, the distributed data management system 2246 may likewise be implemented to receive certain event and associated event counter data, certain data associated with the events of analytic utility, certain information associated with detected IOBs, certain human factors information, certain security policy information, and certain security risk scoring information, or a combination thereof, from the security analytics 118 system or another component of the distributed security analytics framework 2100. In certain embodiments, such event and associated event counter data, data associated with certain events of analytic utility, certain information associated with detected IOBs, certain human factors information, certain security policy information, or a combination thereof, received from the security analytics 118 system, or another component of the distributed security analytics framework 2100, or both, may be used by the edge device 304 in the performance of a security analytics operation, described in greater detail herein.

In certain embodiments, the security risk scoring system 2248 may be implemented to generate a security risk score, likewise described in greater detail, for an IOB corresponding to one or more events detected by the event detection 2240 system. In certain embodiments, the security risk scoring system 2248 may be implemented to generate a security risk score corresponding to a particular IOB when it is first detected by the event detection 2240 system. In certain embodiments, the security risk score corresponding to a particular IOB may be used as a component in the generation of a security risk score for an associated entity. In certain embodiments, the security risk scoring system 2248 may be implemented to provide one or more security risk scores to the security analytics system 118 or another component of the distributed security analytics framework 2100.

In certain embodiments, a third party system 312 may be implemented to include a third party system risk 2256 module. In certain embodiments, the third party system risk 2256 module may be implemented to include an event detection 2260 system, a human factors framework 2262 module, a security policy engine 2264 module, a distributed data management system 2266 module, and a security risk scoring system 2268, or a combination thereof. In certain embodiments, the event detection system 2260 may be implemented to collect, or otherwise track, the occurrence of certain events, or classes of events, resulting from user/device 930, user/network 942, user/resource 948, and user/user 920 interactions. In various embodiments, the event detection 2260 system may be implemented to collect certain event data associated with the user/device 930, user/network 942, user/resource 948, and user/user 920 interactions.

In certain embodiments, the event detection 2260 system may be implemented to detect an event of analytic utility associated with events corresponding to the user/device 930, user/network 942, user/resource 948, and user/user 920 interactions. In various embodiments, the event detection 2260 system may be implemented to use certain security policy information provided by the security policy engine 2264 to determine whether a particular event associated with a third party system 312 is of analytic utility. In various embodiments, the detection 2260 system may be implemented to perform certain IOB detection operations associated with events of analytic utility corresponding to the user/device 930, user/network 942, user/resource 948, and user/user 920 interactions.

In various embodiments, the event detection 2260 system may be implemented to detect and collect certain information associated with one or more events of analytic utility. In certain embodiments, the event detection 2260 system may be implemented to determine whether the one or more events of analytic utility are associated with one another. In various embodiments, the event detection 2260 system module may be implemented to use such information in the performance of certain IOB detection operations, which in turn may result in the detection of an JOB.

In various embodiments, the human factors framework 2262 module may be implemented to receive certain human factors information, described in greater detail herein. In various embodiments, certain such human factors information may be provided by the security analytics system 118 or another component of the distributed security analytics framework 2100. In various embodiments, the human factors framework 2262 module may be implemented to provide certain human factors information to the security analytics system 118 or another component of the distributed security analytics framework 2100. In various embodiments, the human factors framework 2262 module may be implemented to use certain human factors information to perform a human factors risk operation, as likewise described in greater detail herein.

In certain embodiments, the security policy engine 2264 module may be implemented to manage security policy information relevant to determining whether a particular event is of analytic utility, anomalous, or both. In certain embodiments, the security policy engine 2264 module may be implemented to include a data privacy module 2270. In certain embodiments, as described in greater detail herein, the data privacy module 2270 may be implemented to protect the privacy of a user entity associated with a particular user entity behavior. In certain embodiments, the data privacy module 2270 may be implemented to perform an identity information anonymization operation, described in greater detail herein, to anonymize certain entity identity information, likewise described in greater detail herein. In certain embodiments, the data privacy module 2270 may be implemented to de-anonymize certain entity identity information prior to it being provided to another component of the distributed security analytics framework 2100. In certain embodiments, the security policy engine 2264 may be implemented to determine which entity identifiable information is permissible for the data privacy module 2270 to anonymize, or de-anonymize, and under what circumstances it may do so.

In various embodiments, the security policy engine 2264 module may be implemented to receive certain security policy information security analytics system 118 or another component of the distributed security analytics framework 2100. In various embodiments, the security policy engine 2264 module may be implemented to provide certain security policy information to the security analytics system 118 or another component of the distributed security analytics framework 2100. In certain embodiments, the security policy engine 2264 module may be implemented to determine whether a particular event of analytic utility associated with a third party system 312 is anomalous.

In various embodiments, the distributed data management system 2266 may be implemented to provide certain event and associated event counter data, certain data associated with the events of analytic utility, certain information associated with detected IOBs, certain human factors information, certain security policy information, and certain risk scoring information, or a combination thereof, to the security analytics system 118 or another component of the distributed security analytics framework 2100. In various embodiments, the distributed data management system 2266 may likewise be implemented to receive certain event and associated event counter data, certain data associated with the events of analytic utility, certain information associated with detected IOBs, certain human factors information, certain security policy information, and certain security risk scoring information, or a combination thereof, from the security analytics system 118 or another component of the distributed security analytics framework 2100. In certain embodiments, such event and associated event counter data, data associated with certain events of analytic utility, certain information associated with detected IOBs, certain human factors information, certain security policy information, or a combination thereof, received from the security analytics 118 system, or another component of the distributed security analytics framework 2100, or both, may be used by a third party system 312 in the performance of a security analytics operation, described in greater detail herein.

In certain embodiments, the security risk scoring system 2268 may be implemented to generate a security risk score, likewise described in greater detail, for an IOB corresponding to one or more events detected by the event detection 2260 system. In certain embodiments, the security risk scoring system 2268 may be implemented to generate a security risk score corresponding to a particular IOB when it is first detected by the event detection 2260 system. In certain embodiments, the security risk score corresponding to a particular IOB may be used as a component in the generation of a security risk score for an associated entity. In certain embodiments, the security risk scoring system 2268 may be implemented to provide one or more security risk scores to the security analytics system 118 or another component of the distributed security analytics framework 2100.

In various embodiments, the security analytics system 118 may be implemented to receive certain event data, event counter data, data associated with the detected events of analytic utility and IOBs, human factors information, and security policy information, or a combination thereof, provided by the endpoint agent 206, the edge device risk module 2236, and the third party system risk module 2256, or a combination thereof. In certain embodiments, the security analytics system 118 may be implemented to provide the event data, event counter data, data associated with the detected endpoint events of analytic utility and IOBs, human factors information, and security policy information, or a combination thereof, to the EBC system 120, the human factors framework 122, the security policy engine 124, the distributed data management system 126, and the security risk scoring system 128, or a combination thereof, for processing.

In certain embodiments, the event detection 2272 system may be implemented to collect, or otherwise track, the occurrence of certain events, or classes of events, resulting from user/device 930, user/network 942, user/resource 948, and user/user 920 interactions. In various embodiments, the event detection 2272 system may be implemented to collect certain event data associated with the user/device 930, user/network 942, user/resource 948, and user/user 920 interactions. In certain embodiments, the event detection 2272 system may be implemented to detect an event of analytic utility associated with events corresponding to the user/device 930, user/network 942, user/resource 948, and user/user 920 interactions. In various embodiments, the event detection 2272 system may be implemented to use certain security policy information provided by the security policy engine 124 to determine whether a particular event associated with an endpoint device 204, an edge device 304, or a third party system 312, or a combination thereof, is of analytic utility. In various embodiments, the event detection 2272 system may be implemented to perform certain IOB detection operations associated with events of analytic utility corresponding to the user/device 930, user/network 942, user/resource 948, and user/user 920 interactions.

In various embodiments, the event detection 2272 system may be implemented to detect and collect certain information associated with one or more events of analytic utility. In certain embodiments, the event detection 2272 system may be implemented to determine whether the one or more events of analytic utility are associated with one another. In various embodiments, the event detection 2272 system module may be implemented to use such information in the performance of certain IOB detection operations, which in turn may result in the detection of an IOB.

In various embodiments, the EBC system 120 may be implemented to process event and event counter data, along with data associated with events of analytic utility and anomalous events, provided by the endpoint agent 206, the edge device risk module 2236, and the third party system risk module 2256, or a combination thereof, to generate EBP elements, described in greater detail herein. In certain embodiments, the EBC system 120 may be implemented to use the event and endpoint event counter, data associated with events of analytic utility and anomalous events provided by the endpoint agent 206, the edge device risk module 2236, and the third party system risk module 2256, or a combination thereof, to generate session information.

In certain embodiments, the EBC system 120 may be implemented to use the resulting session information to generate an activity session, described in greater detail herein. In various embodiments, as likewise described in greater detail herein, certain EBP management operations may be performed by the EBC system 120 to associate a particular activity session with a particular EBP element. Likewise, the EBC system 120 may be implemented in various embodiments to associate certain EBP elements with a particular EBP In various embodiments, the human factors framework 122 may be implemented to receive certain human factors information, described in greater detail herein. In various embodiments, certain such human factors information may be provided by another component of the distributed security analytics framework 2100. In various embodiments, the human factors framework 122 may be implemented to provide certain human factors information to another component of the distributed security analytics framework 2100. In various embodiments, the human factors framework 122 may be implemented to use certain human factors information to perform a human factors risk operation, as likewise described in greater detail herein.

In certain embodiments, the security policy engine 144 may be implemented to manage security policy information relevant to determining whether a particular event is of analytic utility, anomalous, or both. In certain embodiments, the security policy engine 144 may be implemented to include a data privacy module 524 In certain embodiments, as described in greater detail herein, the data privacy module 524 may be implemented to protect the privacy of a user entity associated with a particular user entity behavior. In certain embodiments, the data privacy module 524 may be implemented to perform an identity information anonymization operation, described in greater detail herein, to anonymize certain entity identity information, likewise described in greater detail herein. In certain embodiments, the data privacy module 524 may be implemented to de-anonymize certain entity identity information prior to it being provided to another component of the distributed security analytics framework 2100. In certain embodiments, the security policy engine 524 may be implemented to determine which entity identifiable information is permissible for the data privacy module 124 to anonymize, or de-anonymize, and under what circumstances it may do so.

In various embodiments, the security policy engine 124 module may be implemented to receive certain security policy information from another component of the distributed security analytics framework 2100. In various embodiments, the security policy engine 124 may be implemented to provide certain security policy information to another component of the distributed security analytics framework 2100. In certain embodiments, the security policy engine 124 may be implemented to determine whether a particular event of analytic utility associated with an endpoint device 204, an edge device 304, or a third party system 312, or a combination thereof, is anomalous.

In various embodiments, the distributed data management system 126 may be implemented to provide certain event and associated event counter data, certain data associated with the events of analytic utility, certain information associated with detected IOBs, certain human factors information, certain security policy information, and certain risk scoring information, or a combination thereof, to another component of the distributed security analytics framework 2100. In various embodiments, the distributed data management system 2246 may likewise be implemented to receive certain event and associated event counter data, certain data associated with the events of analytic utility, certain information associated with detected IOBs, certain human factors information, certain security policy information, and certain security risk scoring information, or a combination thereof, from another component of the distributed security analytics framework 2100. In certain embodiments, such event and associated event counter data, data associated with certain events of analytic utility, certain information associated with detected IOBs, certain human factors information, certain security policy information, or a combination thereof, received from another component of the distributed security analytics framework 2100, may be used by the security analytics system 118 in the performance of a security analytics operation, described in greater detail herein.

In certain embodiments, the security risk scoring system 128 may be implemented to generate a security risk score, likewise described in greater detail, for an IOB corresponding to one or more events detected by the event detection system 2272. In certain embodiments, the security risk scoring system 128 may be implemented to generate a security risk score corresponding to a particular IOB when it is first detected by the event detection system 2272. In certain embodiments, the security risk score corresponding to a particular IOB may be used as a component in the generation of a security risk score for an associated entity. In certain embodiments, the security risk scoring system 128 may be implemented to provide one or more security risk scores to the security analytics system 118 or another component of the distributed security analytics framework 2100. Those of skill in the art will recognize that many such implementations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a security operation, comprising:
    monitoring a plurality of actions of an entity, the plurality of actions of the entity corresponding to a plurality of events enacted by the entity;
    maintaining information relating to the monitoring within a user edge component;
    identifying an event of analytic utility;
    analyzing the event of analytic utility at the user edge component, the analyzing generating a security risk assessment, the analyzing being performed by a hardware processor of the user edge component;
    providing the security risk assessment to a network edge component;
    anonymizing the information relating to the monitoring to provide anonymized information; and,
    providing the anonymized information to the network edge component; and wherein
    the network edge component performs a security operation using the anonymized information relating to the monitoring; and,
    the network edge component requests de-anonymized information from the user edge component when the security operation generates an indication of a security risk of the entity.

2. The method of claim 1, wherein:
    the anonymized information is provided to the network edge component when the security risk indication exceeds a predetermined threshold.

3. The method of claim 1, wherein:
    the security operation comprises a meaning derivation operation, the meaning derivation operation deriving a meaning relating to the event of analytic utility.

4. The method of claim 1, wherein:
    the user edge component comprises a protected endpoint, the protected endpoint comprising an endpoint device and an endpoint agent, the endpoint agent comprising a security policy system and a distributed data management system.

5. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
    monitoring a plurality of actions of an entity, the plurality of actions of the entity corresponding to a plurality of events enacted by the entity;
    maintaining information relating to the monitoring within a user edge component;
    identifying an event of analytic utility;
    analyzing the event of analytic utility at the user edge component, the analyzing generating a security risk assessment, the analyzing being performed by a hardware processor of the user edge component;
    providing the security risk assessment to a network edge component;
    anonymizing the information relating to the monitoring to provide anonymized information; and,
    providing the anonymized information to the network edge component; and wherein
    the network edge component performs a security operation using the anonymized information relating to the monitoring; and,
    the network edge component requests de-anonymized information from the user edge component when the security operation generates an indication of a security risk of the entity.

6. The system of claim 5, wherein
    the anonymized information is provided to the network edge component when the security risk indication exceeds a predetermined threshold.

7. The system of claim 5, wherein:
    the security operation comprises a meaning derivation operation, the meaning derivation operation deriving a meaning relating to the event of analytic utility.

8. The system of claim 5, wherein:
    the user edge component comprises a protected endpoint, the protected endpoint comprising an endpoint device and an endpoint agent, the endpoint agent comprising a security policy system and a distributed data management system.

9. A non-transitory, computer-readable storage medium embodying computer program code, the computer program code comprising computer executable instructions configured for:
    monitoring a plurality of actions of an entity, the plurality of actions of the entity corresponding to a plurality of events enacted by the entity;
    maintaining information relating to the monitoring within a user edge component;
    identifying an event of analytic utility;
    analyzing the event of analytic utility at the user edge component, the analyzing generating a security risk assessment, the analyzing being performed by a hardware processor of the user edge component;
    providing the security risk assessment to a network edge component;

anonymizing the information relating to the monitoring to provide anonymized information; and providing the anonymized information to the network edge component; and wherein the network edge component performs a security operation using the anonymized information relating to the monitoring; and, the network edge component requests de-anonymized information from the user edge component when the security operation generates an indication of a security risk of the entity.

10. The non-transitory, computer-readable storage medium of claim 9, wherein the anonymized information is provided to the network edge component when the security risk indication exceeds a predetermined threshold.

11. The non-transitory, computer-readable storage medium of claim 9, wherein:

the security operation comprises a meaning derivation operation, the meaning derivation operation deriving a meaning relating to the event of analytic utility.

12. The non-transitory, computer-readable storage medium of claim 9, wherein:

the user edge component comprises a protected endpoint, the protected endpoint comprising an endpoint device and an endpoint agent, the endpoint agent comprising a security policy system and a distributed data management system.

13. The non-transitory, computer-readable storage medium of claim 9, wherein:

the computer executable instructions are deployable to a client system from a server system at a remote location.

14. The non-transitory, computer-readable storage medium of claim 9, wherein:

the computer executable instructions are provided by a service provider to a user on an on-demand basis.

* * * * *